(12) United States Patent
Zhou

(10) Patent No.: US 12,476,835 B2
(45) Date of Patent: Nov. 18, 2025

(54) EVENT SUBSCRIPTION METHOD, APPARATUS, AND SYSTEM

(71) Applicant: HUAWEI TECHNOLOGIES CO., LTD., Shenzhen (CN)

(72) Inventor: Xiaoyun Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 453 days.

(21) Appl. No.: 18/177,142

(22) Filed: Mar. 2, 2023

(65) Prior Publication Data

US 2023/0216697 A1    Jul. 6, 2023

Related U.S. Application Data

(63) Continuation of application No. PCT/CN2021/072275, filed on Jan. 15, 2021.

(51) Int. Cl.
H04L 12/14    (2024.01)

(52) U.S. Cl.
CPC ................ H04L 12/1407 (2013.01)

(58) Field of Classification Search
None
See application file for complete search history.

(56) References Cited

U.S. PATENT DOCUMENTS

| | | |
|---|---|---|
| 2020/0404106 A1 | 12/2020 | Belling |
| 2021/0258831 A1* | 8/2021 | Belling ............... H04L 47/2441 |
| 2022/0191665 A1* | 6/2022 | Hong ........................ H04W 4/60 |
| 2023/0056728 A1* | 2/2023 | Wu ........................ H04W 76/19 |

FOREIGN PATENT DOCUMENTS

| | | |
|---|---|---|
| CN | 109951824 A | 6/2019 |
| CN | 110536282 A | 12/2019 |
| WO | 2019137142 A1 | 7/2019 |

OTHER PUBLICATIONS

"DAD at Start of Day 4 for CT3#112e Meeting", 3GPP TSG-CT WG3 Meeting #112e E-Meeting, Nov. 4-13, 2020, C3-205006, total 156 pages.
Huawei et al. "Correction to the downlink data notification with V-SMF and I-SMF", 3GPP TSG-WG SA2 Meeting #141E e-meeting S2-2007205, Elbonia, Oct. 12-23, 2020, total 9 pages.

* cited by examiner

*Primary Examiner* — Benjamin Lamont

(57) ABSTRACT

This disclosure provides an event subscription method. A policy control entity receives information about a first event from a session management entity, where the information about the first event includes subscription indication information of the first event and first data description information of the first event. The policy control entity determines that second data description information of a second policy and charging control (PCC) rule is the same as the first data description information, where the second data description information is data description information of a second event, and the second PCC rule includes second indication second information indicating to detect the second event. The policy control entity, based on the subscription indication information, updates the second PCC rule obtain a first PCC rule, and sends, the first PCC rule comprising the second indication information and first indication information indicating to detect the first event, to the session management entity.

20 Claims, 19 Drawing Sheets

EVENT SUBSCRIPTION METHOD, APPARATUS, AND SYSTEM

CROSS-REFERENCE TO RELATED APPLICATIONS

This is a continuation of International Patent Application No. PCT/CN2021/072275, filed on Jan. 15, 2021, the disclosure of which is hereby incorporated by reference in its entirety.

TECHNICAL FIELD

This relates to the field of communication technologies, and in particular, to an event subscription method, an apparatus, and a system.

BACKGROUND

In the conventional technology, a session management function (SMF) formulates a packet detection rule (PDR) and a forwarding action rule (FAR) based on a policy and charging control (PCC) rule, to configure a user plane function (UPF) to detect a status of a data packet. The PCC rule includes a filter template and a priority, and the PDR includes the filter template and the priority in the PCC rule. When performing matching on a data packet, the UPF performs matching on the data packet based on a filter template and a priority in a PDR. Once a data packet is matched with a PDR, a matching procedure ends. Further, the UPF reports an event notification to the SMF based on a FAR correlated with the matched PDR, so that the SMF performs further event notification based on the event notification of the UPF.

In the conventional technology, one application function (AF) is allowed to subscribe to two events. For example, the AF may subscribe to both an availability after downlink data notification (DDN) failure event and a downlink data delivery (DDD) status (status) event. However, when the AF subscribes to the foregoing two events, provided data description information (traffic descriptors) may be the same or overlap, and further, filter templates including the data description information may be the same or overlap. In this case, one service data flow can match only one PDR, and the SMF can receive only one event notification. Consequently, the SMF can detect only one event.

SUMMARY

Embodiments of this application provide an event subscription method, an apparatus, and a system, so that two subscribed events can still be detected when data description information of the two events is the same or overlaps.

To achieve the foregoing objective, the following technical solutions are used in embodiments of this application.

According to a first aspect, an event subscription method is provided. A communication apparatus that performs the event subscription method may be a policy control entity, or may be a module, for example, a chip or a chip system, used in the policy control entity. The following uses an example in which an execution body is the policy control entity for description. The policy control entity receives information about a first event from a session management entity, where the information about the first event includes subscription indication information of the first event and data description information of the first event. The policy control entity determines that data description information of a second policy and charging control PCC rule is the same as the data description information of the first event, where the data description information of the second PCC rule is data description information of a second event, and the second PCC rule includes indication information indicating to detect the second event. The policy control entity updates the second PCC rule based on the subscription indication information of the first event, to obtain a first PCC rule, where the first PCC rule includes the indication information indicating to detect the second event and indication information indicating to detect the first event. The policy control entity sends the first PCC rule to the session management entity. It should be noted that, in this embodiment of this application, the first PCC rule may be understood as an updated second PCC rule. In other words, in this embodiment of this application, an identifier of the first PCC rule is the same as an identifier of the second PCC rule. This is uniformly described herein, and details are not described below again. It should be understood that, in this embodiment of this application, data description information of the first PCC rule may be the data description information of the second event or the data description information of the first event. This is not specifically limited in this embodiment of this application. According to the event subscription method provided in this embodiment of this application, when the policy control entity determines that the data description information of the second PCC rule (where the data description information of the second PCC rule is the data description information of the second event) is the same as data description information of the first event, the determined first PCC rule includes both the indication information indicating to detect the first event and the indication information indicating to detect the second event. Therefore, after the policy control entity sends the first PCC rule to the session management entity, the session management entity can detect both the first event and the second event based on the first PCC rule. This avoids a problem that when two events with same data description information are subscribed to, a user plane function entity can obtain through matching only a PDR of one event, and consequently, the session management entity can receive only one event notification, and the session management entity can detect only one event in the conventional technology.

According to a second aspect, an event subscription method is provided. A communication apparatus that performs the event subscription method may be a policy control entity, or may be a module, for example, a chip or a chip system, used in the policy control entity. The following uses an example in which an execution body is the policy control entity for description. The policy control entity receives information about a first event from a session management entity, where the information about the first event includes subscription indication information of the first event and data description information of the first event. The policy control entity determines that data description information of a second policy and charging control PCC rule is the same as the data description information of the first event, where the data description information of the second PCC rule is data description information of a second event, and the second PCC rule includes indication information indicating to detect the second event. The policy control entity formulates a first PCC rule based on the subscription indication information of the first event and the second PCC rule, where the first PCC rule includes the indication information indicating to detect the second event and indication information indicating to detect the first event, and the first PCC rule is used to replace the second PCC rule, or a priority of the first PCC rule is higher than a priority of the second PCC rule. The policy control entity sends the first PCC rule to the session management entity. In this embodiment of this application, an identifier of the first PCC rule may be different from an identifier of the second PCC rule. This is uniformly described herein, and details are not described below again. It should be understood that, in this embodiment of this application, data description information of the first PCC rule may be the data description information of the second event or the data description information of the first event. This is not specifically limited in this embodiment of this application. For a technical effect of the second aspect, refer to the first aspect. Details are not described herein again.

With reference to the second aspect, in a possible implementation, the event subscription method provided in this embodiment of this application further includes: The policy control entity sends, to the session management entity, indication information indicating to delete the second PCC rule.

With reference to the first aspect or the second aspect, in a possible implementation, the event subscription method provided in this embodiment of this application further includes: The policy control entity receives the identifier of the first PCC rule and unsubscription indication information of the first event from the session management entity. The policy control entity updates the first PCC rule based on the identifier of the first PCC rule and the unsubscription indication information of the first event, to obtain a fifth PCC rule, where the fifth PCC rule is obtained by deleting the indication information indicating to detect the first event from the first PCC rule. The policy control entity sends the fifth PCC rule to the session management entity. It should be noted that, in this embodiment of this application, the fifth PCC rule may be understood as an updated first PCC rule. In other words, in this embodiment of this application, an identifier of the fifth PCC rule is the same as the identifier of the first PCC rule. This is uniformly described herein, and details are not described below again. Based on this solution, the first event may be unsubscribed from.

With reference to the first aspect or the second aspect, in a possible implementation, the event subscription method provided in this embodiment of this application further includes: The policy control entity receives the identifier of the first PCC rule and unsubscription indication information of the second event from the session management entity. The policy control entity updates the first PCC rule based on the identifier of the first PCC rule and the unsubscription indication information of the second event, to obtain a sixth PCC rule, where the sixth PCC rule is obtained by deleting the indication information indicating to detect the second event from the first PCC rule. The policy control entity sends the sixth PCC rule to the session management entity. It should be noted that, in this embodiment of this application, the sixth PCC rule may be understood as an updated first PCC rule. In other words, in this embodiment of this application, an identifier of the sixth PCC rule is the same as the identifier of the first PCC rule. This is uniformly described herein, and details are not described below again. Based on this solution, the second event may be unsubscribed from.

With reference to the first aspect or the second aspect, in a possible implementation, the first event is a downlink data notification failure event, and the second event is a downlink data delivery status event; or the first event is a downlink data delivery status event, and the second event is a downlink data notification failure event.

According to a third aspect, an event subscription method is provided. A communication apparatus that performs the event subscription method may be a session management entity, or may be a module, for example, a chip or a chip system, used in the session management entity. The following uses an example in which an execution body is the session management entity for description. The session management entity receives an event subscription request for a first event, where the event subscription request for the first event includes an event identifier of the first event and data description information of the first event. The session management entity determines that data description information of a second policy and charging control PCC rule is the same as the data description information of the first event, where the data description information of the second PCC rule is data description information of a second event, and the second PCC rule includes indication information indicating to detect the second event. The session management entity sends an identifier of the second PCC rule and subscription indication information of the first event to a policy control entity, where the subscription indication information of the first event indicates that the session management entity receives the event subscription request for the first event, the identifier of the second PCC rule and the subscription indication information of the first event are used to update the second PCC rule to obtain a first PCC rule, and the first PCC rule includes the indication information indicating to detect the second event and indication information indicating to detect the first event. The session management entity receives the first PCC rule from the policy control entity. It should be noted that, in this embodiment of this application, the first PCC rule may be understood as an updated second PCC rule. In other words, in this embodiment of this application, an identifier of the first PCC rule is the same as the identifier of the second PCC rule. This is uniformly described herein, and details are not described below again. It should be understood that, in this embodiment of this application, data description information of the first PCC rule may be the data description information of the second event or the data description information of the first event. This is not specifically limited in this embodiment of this application. According to the event subscription method provided in this embodiment of this application, when determining that the data description information of the second PCC rule (where the data description information of the second PCC rule is the data description information of the second event) is the same as event description information of the first event, the session management entity sends the identifier of the second PCC rule and the subscription indication information of the first event to the policy control entity, so that the policy control entity can determine, based on the identifier of the second PCC rule and the subscription indication information of the first event, the first PCC rule that includes both the indication information indicating to detect the first event and the indication information indicating to detect the second event. Therefore, after the policy control entity sends the first PCC rule to the session management entity, the session management entity can detect both the first event and the second event based on the first PCC rule. This avoids a problem that when two events with same data description information are subscribed to, a user plane function entity can obtain through matching only a PDR of one event, and consequently, the session management entity can receive only one event notification, and the session management entity can detect only one event in the conventional technology.

With reference to the third aspect, in a possible implementation, the event subscription method provided in this embodiment of this application further includes: The session management entity receives an unsubscription request for the first event, where the unsubscription request for the first event includes an unsubscription indication and an event subscription correlation identifier of the first event. The session management entity sends the identifier of the first PCC rule and unsubscription indication information of the first event to the policy control entity, where the unsubscription indication information of the first event indicates that the session management entity receives the unsubscription request for the first event, the identifier of the first PCC rule is determined based on the event subscription correlation identifier of the first event, the identifier of the first PCC rule and the unsubscription indication information of the first event are used to update the first PCC rule to obtain a fifth PCC rule, and the fifth PCC rule is obtained by deleting the indication information indicating to detect the first event from the first PCC rule. The session management entity receives the fifth PCC rule from the policy control entity. It should be noted that, in this embodiment of this application, the fifth PCC rule may be understood as an updated first PCC rule. In other words, in this embodiment of this application, an identifier of the fifth PCC rule is the same as the identifier of the first PCC rule. This is uniformly described herein, and details are not described below again. Based on this solution, the first event may be unsubscribed from.

With reference to the third aspect, in a possible implementation, the event subscription method provided in this embodiment of this application further includes: The session management entity receives an unsubscription request for the second event, where the unsubscription request for the second event includes an unsubscription indication and an event subscription correlation identifier of the second event. The session management entity sends the identifier of the first PCC rule and unsubscription indication information of the second event to the policy control entity, where the unsubscription indication information of the second event indicates that the session management entity receives the unsubscription request for the second event, the identifier of the first PCC rule is determined based on the event subscription correlation identifier of the second event, the identifier of the first PCC rule and the unsubscription indication information of the second event are used to update the first PCC rule to obtain a sixth PCC rule, and the sixth PCC rule is obtained by deleting the indication information indicating to detect the second event from the first PCC rule. The session management entity receives the sixth PCC rule from the policy control entity. It should be noted that, in this embodiment of this application, the sixth PCC rule may be understood as an updated first PCC rule. In other words, in this embodiment of this application, an identifier of the sixth PCC rule is the same as the identifier of the first PCC rule. This is uniformly described herein, and details are not described below again. Based on this solution, the second event may be unsubscribed from.

According to a fourth aspect, an event subscription method is provided. A communication apparatus that performs the event subscription method may be a policy control entity, or may be a module, for example, a chip or a chip system, used in the policy control entity. The following uses an example in which an execution body is the policy control entity for description. The policy control entity receives an identifier of a second policy and charging control PCC rule and subscription indication information of a first event from a session management entity, where data description information of the second PCC rule is data description information of a second event, and the second PCC rule includes indication information indicating to detect the second event. The policy control entity determines the second PCC rule based on the identifier of the second PCC rule. The policy control entity updates the second PCC rule based on the subscription indication information of the first event, to obtain a first PCC rule, where the first PCC rule includes the indication information indicating to detect the second event and indication information indicating to detect the first event. The policy control entity sends the first PCC rule to the session management entity. It should be noted that, in this embodiment of this application, the first PCC rule may be understood as an updated second PCC rule. In other words, in this embodiment of this application, an identifier of the first PCC rule is the same as the identifier of the second PCC rule. This is uniformly described herein, and details are not described below again. It should be understood that, in this embodiment of this application, data description information of the first PCC rule may be the data description information of the second event or the data description information of the first event. This is not specifically limited in this embodiment of this application. For a technical effect of the fourth aspect, refer to the third aspect. Details are not described herein again.

With reference to the first aspect, the second aspect, or the fourth aspect, in a possible implementation, the event subscription method provided in this embodiment of this application further includes: The policy control entity receives the identifier of the first PCC rule and the subscription indication information of the first event from the session management entity. The policy control entity updates the first PCC rule based on the identifier of the first PCC rule and the subscription indication information of the first event, to obtain a fifth PCC rule, where the fifth PCC rule is obtained by deleting the indication information indicating to detect the first event from the first PCC rule. The policy control entity sends the fifth PCC rule to the session management entity. It should be noted that, in this embodiment of this application, the fifth PCC rule may be understood as an updated first PCC rule. In other words, in this embodiment of this application, an identifier of the fifth PCC rule is the same as the identifier of the first PCC rule. This is uniformly described herein, and details are not described below again. Based on this solution, the first event may be unsubscribed from.

With reference to the first aspect, the second aspect, or the fourth aspect, in a possible implementation, the event subscription method provided in this embodiment of this application further includes: The policy control entity receives the identifier of the first PCC rule and subscription indication information of the second event from the session management entity. The policy control entity updates the first PCC rule based on the identifier of the first PCC rule and the subscription indication information of the second event, to obtain a sixth PCC rule, where the sixth PCC rule is obtained by deleting the indication information indicating to detect the second event from the first PCC rule. The policy control entity sends the sixth PCC rule to the session management entity. It should be noted that, in this embodiment of this application, the sixth PCC rule may be understood as an updated first PCC rule. In other words, in this embodiment of this application, an identifier of the sixth PCC rule is the same as the identifier of the first PCC rule. This is uniformly described herein, and details are not described below again. Based on this solution, the second event may be unsubscribed from.

With reference to the first aspect, the second aspect, the third aspect, or the fourth aspect, in a possible implementation, the first event is a downlink data notification failure event, and the second event is a downlink data delivery status event; or the first event is a downlink data delivery status event, and the second event is a downlink data notification failure event.

According to a fifth aspect, an event subscription method is provided. A communication apparatus that performs the event subscription method may be a policy control entity, or may be a module, for example, a chip or a chip system, used in the policy control entity. The following uses an example in which an execution body is the policy control entity for description. The policy control entity receives information about a first event from a session management entity, where the information about the first event includes subscription indication information of the first event and data description information of the first event. The policy control entity determines that data description information of a second policy and charging control PCC rule overlaps the data description information of the first event, where the data description information of the second PCC rule is data description information of a second event, and the second PCC rule includes indication information indicating to detect the second event. The policy control entity determines a first PCC rule based on the information about the first event and the second PCC rule, where the first PCC rule includes the indication information indicating to detect the second event and indication information indicating to detect the first event, data description information of the first PCC rule is overlapping information in the data description information of the first event and the data description information of the second event. The policy control entity determines a third PCC rule and/or a fourth PCC rule based on the information about the first event and the second PCC rule, where the third PCC rule includes the indication information indicating to detect the second event, data description information of the third PCC rule is information that is in the data description information of the second event and that is other than the overlapping information in the data description information of the first event and the data description information of the second event, the fourth PCC rule includes the indication information indicating to detect the first event, and data description information of the fourth PCC rule is information that is in the data description information of the first event and that is other than the overlapping information in the data description information of the first event and the data description information of the second event. The policy control entity sends the first PCC rule to the session management entity, and the policy control entity sends the third PCC rule and/or the fourth PCC rule to the session management entity. According to the event subscription method provided in this embodiment of this application, when the policy control entity determines that the data description information of the second PCC rule (where the data description information of the second PCC rule is the data description information of the second event) overlaps event description information of the first event, the determined first PCC rule includes both the indication information indicating to detect the first event and the indication information indicating to detect the second event. Therefore, after the policy control entity sends the first PCC rule to the session management entity, the session management entity can detect both the first event and the second event based on the first PCC rule. This avoids a problem that when two events with overlapping data description information are subscribed to, a user plane function entity may obtain through matching only a PDR of one event, and consequently, the session management entity can receive only one event notification, and the session management entity can detect only one event in the conventional technology.

With reference to the fifth aspect, in a possible implementation, the information about the first event further includes a subscription identifier of the first event. That the policy control entity sends the first PCC rule to the session management entity includes: The policy control entity sends, to the session management entity, the first PCC rule, a subscription identifier of the second event corresponding to the first PCC rule, and the subscription identifier of the first event. That the policy control entity sends the third PCC rule and/or the fourth PCC rule to the session management entity includes: The policy control entity sends, to the session management entity, the third PCC rule and the subscription identifier of the second event corresponding to the third PCC rule, and/or the policy control entity sends, to the session management entity, the fourth PCC rule and the subscription identifier of the first event corresponding to the fourth PCC rule. In other words, in this embodiment of this application, a corresponding event may be correlated by using a subscription identifier of the event.

With reference to the fifth aspect, in a possible implementation, the event subscription method provided in this embodiment of this application further includes: The policy control entity receives the subscription identifier of the first event and unsubscription indication information of the first event from the session management entity. The policy control entity updates the first PCC rule based on the subscription identifier of the first event and the unsubscription indication information of the first event, to obtain a fifth PCC rule, where the fifth PCC rule is obtained by deleting the indication information indicating to detect the first event from the first PCC rule. The policy control entity sends the fifth PCC rule to the session management entity. It should be noted that, in this embodiment of this application, the fifth PCC rule may be understood as an updated first PCC rule. In other words, in this embodiment of this application, an identifier of the fifth PCC rule is the same as an identifier of the first PCC rule. This is uniformly described herein, and details are not described below again. Based on this solution, the first event may be unsubscribed from.

With reference to the fifth aspect, in a possible implementation, the event subscription method provided in this embodiment of this application further includes: The policy control entity deletes the fourth PCC rule based on the subscription identifier of the first event and the unsubscription indication information of the first event. The policy control entity sends, to the session management entity, indication information indicating to delete the fourth PCC rule. Based on this solution, the first event may be unsubscribed from.

With reference to the fifth aspect, in a possible implementation, the event subscription method provided in this embodiment of this application further includes: The policy control entity receives the subscription identifier of the second event and unsubscription indication information of the second event from the session management entity. The policy control entity updates the first PCC rule based on the subscription identifier of the second event and indication information indicating to unsubscribe from the second event to obtain a sixth PCC rule, where the sixth PCC rule is obtained by deleting the indication information indicating to detect the second event from the first PCC rule. The policy control entity sends the sixth PCC rule to the session management entity. It should be noted that, in this embodiment of this application, the sixth PCC rule may be understood as an updated first PCC rule. In other words, in this embodiment of this application, an identifier of the sixth PCC rule is the same as an identifier of the first PCC rule. This is uniformly described herein, and details are not described below again. Based on this solution, the second event may be unsubscribed from.

With reference to the fifth aspect, in a possible implementation, the event subscription method provided in this embodiment of this application further includes: The policy control entity deletes the third PCC rule based on the subscription identifier of the second event and the unsubscription indication information of the first event. The policy control entity sends, to the session management entity, indication information indicating to delete the third PCC rule. Based on this solution, the second event may be unsubscribed from.

According to a sixth aspect, an event subscription method is provided. A communication apparatus that performs the event subscription method may be a session management entity, or may be a module, for example, a chip or a chip system, used in the session management entity. The following uses an example in which an execution body is the session management entity for description. The session management entity receives an event subscription request for a first event, where the event subscription request for the first event includes an event identifier of the first event and data description information of the first event. The session management entity determines that data description information of a second policy and charging control PCC rule overlaps the data description information of the first event, where the data description information of the second PCC rule is data description information of a second event, and the second PCC rule includes indication information indicating to detect the second event. The session management entity sends, to a policy control entity, subscription indication information of the first event, an identifier of the second PCC rule, overlapping information in the data description information of the first event and the data description information of the second event, and the indication information indicating to detect the second event, where the subscription indication information of the first event indicates that the session management entity receives the event subscription request for the first event, the subscription indication information of the first event, the identifier of the second PCC rule, the overlapping information in the data description information of the first event and the data description information of the second event, and the indication information indicating to detect the second event are used to determine a first PCC rule, the first PCC rule includes the indication information indicating to detect the second event and indication information indicating to detect the first event, and data description information of the first PCC rule is the overlapping information in the data description information of the first event and the data description information of the second event. The session management entity sends, to the policy control entity, the indication information indicating to detect the second event and information that is in the data description information of the second event and that is other than the overlapping information in the data description information of the first event and the data description information of the second event; and/or the session management entity sends, to the policy control entity, the subscription indication information of the first event and information that is in the data description information of the first event and that is other than the overlapping information in the data description information of the first event and the data description information of the second event, where the indication information indicating to detect the second event and the information that is in the data description information of the second event and that is other than the overlapping information in the data description information of the first event and the data description information of the second event are used to determine a third PCC rule, the third PCC rule includes the indication information indicating to detect the second event, data description information of the third PCC rule is the information that is in the data description information of the second event and that is other than the overlapping information in the data description information of the first event and the data description information of the second event, the subscription indication information of the first event and the information that is in the data description information of the first event and that is other than the overlapping information in the data description information of the first event and the data description information of the second event are used to determine a fourth PCC rule, the fourth PCC rule includes the indication information indicating to detect the first event, and data description information of the fourth PCC rule is the information that is in the data description information of the first event and that is other than the overlapping information in the data description information of the first event and the data description information of the second event. The session management entity receives the first PCC rule from the policy control entity, and the session management entity receives the third PCC rule and/or the fourth PCC rule from the policy control entity. According to the event subscription method provided in this embodiment of this application, when determining that the data description information of the second PCC rule (where the data description information of the second PCC rule is the data description information of the second event) overlaps event description information of the first event, the session management entity sends, to the policy control entity, the subscription indication information of the first event, the identifier of the second PCC rule, the overlapping information in the data description information of the first event and the data description information of the second event, and the indication information indicating to detect the second event, so that the policy control entity can determine, based on the subscription indication information of the first event, the identifier of the second PCC rule, the overlapping information in the data description information of the first event and the data description information of the second event, and the indication information indicating to detect the second event, the first PCC rule that includes both the indication information indicating to detect the first event and the indication information indicating to detect the second event. Therefore, after the policy control entity sends the first PCC rule to the session management entity, the session management entity can detect both the first event and the second event based on the first PCC rule. This avoids a problem that when two events with same data description information are subscribed to, a user plane function entity can obtain through matching only a PDR of one event, and consequently, the session management entity can receive only one event notification, and the session management entity can detect only one event in the conventional technology.

With reference to the sixth aspect, in a possible implementation, the event subscription method provided in this embodiment of this application further includes: The session management entity receives an unsubscription request for the first event, where the unsubscription request for the first event includes an unsubscription indication and an event subscription correlation identifier of the first event. The session management entity sends a first message to the policy control entity, where the first message includes an identifier of the first PCC rule and unsubscription indication information of the first event, the unsubscription indication information of the first event indicates that the session management entity receives the unsubscription request for the first event, the identifier of the first PCC rule is determined based on the event subscription correlation identifier of the first event, the identifier of the first PCC rule and the unsubscription indication information of the first event are used to update the first PCC rule to obtain a fifth PCC rule, and the fifth PCC rule is obtained by deleting the indication information indicating to detect the first event from the first PCC rule. The session management entity receives the fifth PCC rule from the policy control entity. It should be noted that, in this embodiment of this application, the fifth PCC rule may be understood as an updated first PCC rule. In other words, in this embodiment of this application, an identifier of the fifth PCC rule is the same as the identifier of the first PCC rule. This is uniformly described herein, and details are not described below again. Based on this solution, the first event may be unsubscribed from.

With reference to the sixth aspect, in a possible implementation, the first message further includes an identifier of the fourth PCC rule, and the identifier of the fourth PCC rule is determined based on the event subscription correlation identifier of the first event. The event subscription method provided in this embodiment of this application further includes: The session management entity receives, from the policy control entity, indication information indicating to delete the fourth PCC rule. The session management entity deletes the fourth PCC rule based on the indication information indicating to delete the fourth PCC rule. Based on this solution, the first event may be unsubscribed from.

With reference to the sixth aspect, in a possible implementation, the event subscription method provided in this embodiment of this application further includes: The session management entity receives an unsubscription request for the second event, where the unsubscription request for the second event includes an unsubscription indication and an event subscription correlation identifier of the second event. The session management entity sends a second message to the policy control entity, where the second message includes an identifier of the first PCC rule and unsubscription indication information of the second event, the unsubscription indication information of the second event indicates that the session management entity receives the unsubscription request for the second event, the identifier of the first PCC rule is determined based on the event subscription correlation identifier of the second event, the identifier of the first PCC rule and the unsubscription indication information of the second event are used to update the first PCC rule to obtain a sixth PCC rule, and the sixth PCC rule is obtained by deleting the indication information indicating to detect the second event from the first PCC rule. The session management entity receives the sixth PCC rule from the policy control entity. It should be noted that, in this embodiment of this application, the sixth PCC rule may be understood as an updated first PCC rule. In other words, in this embodiment of this application, an identifier of the sixth PCC rule is the same as the identifier of the first PCC rule. This is uniformly described herein, and details are not described below again. Based on this solution, the second event may be unsubscribed from.

With reference to the sixth aspect, in a possible implementation, the first message further includes an identifier of the third PCC rule, and the identifier of the third PCC rule is determined based on the event subscription correlation identifier of the second event. The event subscription method provided in this embodiment of this application further includes: The session management entity receives, from the policy control entity, indication information indicating to delete the third PCC rule. The session management entity deletes the third PCC rule based on the indication information indicating to delete the third PCC rule. Based on this solution, the second event may be unsubscribed from.

According to a seventh aspect, an event subscription method is provided. The method includes: A policy control entity receives, from a session management entity, subscription indication information of a first event, an identifier of a second PCC rule, overlapping information in data description information of the first event and data description information of a second event, and indication information indicating to detect the second event, where data description information of the second PCC rule is the data description information of the second event, and the second PCC rule includes the indication information indicating to detect the second event. The policy control entity receives, from the session management entity, the indication information indicating to detect the second event and information that is in the data description information of the second event and that is other than the overlapping information in the data description information of the first event and the data description information of the second event; and/or the policy control entity receives, from the session management entity, the subscription indication information of the first event and information that is in the data description information of the first event and that is other than the overlapping information in the data description information of the first event and the data description information of the second event. The policy control entity determines a first PCC rule based on the subscription indication information of the first event, the identifier of the second PCC rule, the overlapping information in the data description information of the first event and the data description information of the second event, and the indication information indicating to detect the second event, where the first PCC rule includes the indication information indicating to detect the second event and indication information indicating to detect the first event, and data description information of the first PCC rule is the overlapping information in the data description information of the first event and the data description information of the second event. The policy control entity determines a third PCC rule based on the indication information indicating to detect the second event and the information that is in the data description information of the second event and that is other than the overlapping information in the data description information of the first event and the data description information of the second event, and/or the policy control entity determines a fourth PCC rule based on the subscription indication information of the first event and the information that is in the data description information of the first event and that is other than the overlapping information in the data description information of the first event and the data description information of the second event, where the third PCC rule includes the indication information indicating to detect the second event, data description information of the third PCC rule is the information that is in the data description information of the second event and that is other than the overlapping information in the data description information of the first event and the data description information of the second event, the fourth PCC rule includes the indication information indicating to detect the first event, and data description information of the fourth PCC rule is the information that is in the data description information of the first event and that is other than the overlapping information in the data description information of the first event and the data description information of the second event. The policy control entity sends the first PCC rule to the session management entity, and the policy control entity sends the third PCC rule and/or the fourth PCC rule to the session management entity. For a technical effect of the seventh aspect, refer to the sixth aspect. Details are not described herein again.

With reference to the fifth aspect or the seventh aspect, in a possible implementation, the event subscription method provided in this embodiment of this application further includes: The policy control entity receives a first message from the session management entity, where the first message includes an identifier of the first PCC rule and unsubscription indication information of the first event. The policy control entity updates the first PCC rule based on the identifier of the first PCC rule and the unsubscription indication information of the first event, to obtain a fifth PCC rule, where the fifth PCC rule is obtained by deleting the indication information indicating to detect the first event from the first PCC rule. The policy control entity sends the fifth PCC rule to the session management entity. It should be noted that, in this embodiment of this application, the fifth PCC rule may be understood as an updated first PCC rule. In other words, in this embodiment of this application, an identifier of the fifth PCC rule is the same as the identifier of the first PCC rule. This is uniformly described herein, and details are not described below again. Based on this solution, the first event may be unsubscribed from.

With reference to the fifth aspect or the seventh aspect, in a possible implementation, the first message further includes an identifier of the fourth PCC rule. The event subscription method provided in this embodiment of this application further includes: The policy control entity deletes the fourth PCC rule based on the identifier of the fourth PCC rule and indication information indicating to unsubscribe from the first event. The policy control entity sends, to the session management entity, indication information indicating to delete the fourth PCC rule. Based on this solution, the first event may be unsubscribed from.

With reference to the fifth aspect or the seventh aspect, in a possible implementation, the event subscription method provided in this embodiment of this application further includes: The policy control entity receives a second message from the session management entity, where the second message includes an identifier of the first PCC rule and unsubscription indication information of the second event. The policy control entity updates the first PCC rule based on the identifier of the first PCC rule and the unsubscription indication information of the second event, to obtain a sixth PCC rule, where the sixth PCC rule is obtained by deleting the indication information indicating to detect the second event from the first PCC rule. The policy control entity sends the sixth PCC rule to the session management entity. It should be noted that, in this embodiment of this application, the sixth PCC rule may be understood as an updated first PCC rule. In other words, in this embodiment of this application, an identifier of the sixth PCC rule is the same as the identifier of the first PCC rule. This is uniformly described herein, and details are not described below again. Based on this solution, the second event may be unsubscribed from.

With reference to the fifth aspect or the seventh aspect, in a possible implementation, the second message further includes an identifier of the third PCC rule. The event subscription method provided in this embodiment of this application further includes: The policy control entity deletes the third PCC rule based on the identifier of the third PCC rule and indication information indicating to unsubscribe from the second event. The policy control entity sends, to the session management entity, indication information indicating to delete the third PCC rule. Based on this solution, the second event may be unsubscribed from.

According to an eighth aspect, an event subscription method is provided. The method includes: A session management entity receives a first policy and charging control PCC rule from a policy control entity, where the first PCC rule includes indication information indicating to detect a first event and indication information indicating to detect a second event. The session management entity detects the first event and the second event based on the first PCC rule. For a technical effect of the eighth aspect, refer to the first aspect, the second aspect, the fourth aspect, the fifth aspect, or the seventh aspect. Details are not described herein again.

With reference to the eighth aspect, in a possible implementation, that the session management entity detects the first event and the second event based on the first PCC rule includes: The session management entity determines, based on the first PCC rule, a first packet detection rule PDR and a first forwarding action rule FAR correlated with the first PDR, where the first FAR is determined based on the indication information indicating to detect the first event and/or the indication information indicating to detect the second event. The session management entity sends the first PDR and the first FAR to a user plane function entity. The session management entity receives, from the user plane function entity, an identifier of the first PDR and a downlink data status that is reported based on the first FAR. The session management entity sends a first notification message to a subscription entity of the first event, and/or sends a second notification message to a subscription entity of the second event based on the identifier of the first PDR and the downlink data status that is reported based on the first FAR, where the first notification message is used to notify the first event, and the second notification message is used to notify the second event. Based on this solution, the first event and the second event may be detected.

With reference to the eighth aspect, in a possible implementation, a first flag is set in the first FAR, and the first flag indicates the user plane function entity to notify the session management entity after the user plane function entity discards the first data packet that matches the first PDR; and the downlink data status that is reported based on the first FAR includes: the first data packet that matches the first PDR is discarded. Based on this solution, the user plane function entity may notify the session management entity in time after discarding the first data packet that matches the first PDR.

With reference to the eighth aspect, in a possible implementation, the first event is a downlink data notification failure event. The second event is a downlink data delivery status event, and a notification request type of the downlink data delivery status event includes a discarded type. That the session management entity sends a first notification message to a subscription entity of the first event, and/or sends a second notification message to a subscription entity of the second event based on the identifier of the first PDR and the downlink data status that is reported based on the first FAR includes: The session management entity sends the first notification message to a mobility management entity, and sends the second notification message to a network exposure function entity based on the identifier of the first PDR and the downlink data status that is reported based on the first FAR, where the first notification message is used to notify a downlink data notification failure, and the second notification message is used to notify that downlink data is discarded. Based on this solution, a subscription notification can be implemented.

With reference to the eighth aspect, in a possible implementation, the second event is a downlink data notification failure event. The first event is a downlink data delivery status event, and a notification request type of the downlink data delivery status event includes a discarded type. That the session management entity sends a first notification message to a subscription entity of the first event, and/or sends a second notification message to a subscription entity of the second event based on the identifier of the first PDR and the downlink data status that is reported based on the first FAR includes: The session management entity sends the first notification message to a network exposure function entity, and sends the second notification message to a mobility management entity based on the identifier of the first PDR and the downlink data status that is reported based on the first FAR, where the first notification message is used to notify that downlink data is discarded, and the second notification message is used to notify a downlink data notification failure. Based on this solution, a subscription notification can be implemented.

With reference to the eighth aspect, in a possible implementation, a second flag is set in the first FAR, and the second flag indicates the user plane function entity to notify the session management entity after the user plane function entity buffers the first data packet that matches the first PDR; and the downlink data status that is reported based on the first FAR includes: the first data packet that matches the first PDR is buffered. Based on this solution, the user plane function entity may notify the session management entity in time after buffering the first data packet that matches the first PDR.

With reference to the eighth aspect, in a possible implementation, the first event is a downlink data delivery status event. That the session management entity sends a first notification message to a subscription entity of the first event, and/or sends a second notification message to a subscription entity of the second event based on the identifier of the first PDR and the downlink data status that is reported based on the first FAR includes: The session management entity sends the first notification message to a network exposure function entity based on the identifier of the first PDR and the downlink data status that is reported based on the first FAR, where the first notification message is used to notify that downlink data is buffered.

With reference to the eighth aspect, in a possible implementation, the second event is a downlink data delivery status event. That the session management entity sends a first notification message to a subscription entity of the first event, and/or sends a second notification message to a subscription entity of the second event based on the identifier of the first PDR and the downlink data status that is reported based on the first FAR includes: The session management entity sends the second notification message to a network exposure function entity based on the identifier of the first PDR and the downlink data status that is reported based on the first FAR, where the second notification message is used to notify that downlink data is buffered. Based on this solution, a subscription notification can be implemented.

With reference to the eighth aspect, in a possible implementation, before that the session management entity receives a first PCC rule from a policy control entity, the event subscription method provided in this embodiment of this application further includes: The session management entity receives an event subscription request for the first event, where the event subscription request for the first event includes an event identifier of the first event and data description information of the first event. The session management entity determines that data description information of a second PCC rule is the same as the data description information of the first event, where the data description information of the second PCC rule is data description information of the second event, and the second PCC rule includes the indication information indicating to detect the second event. The session management entity sends an identifier of the second PCC rule and subscription indication information of the first event to the policy control entity, where the subscription indication information of the first event indicates that the session management entity receives the event subscription request for the first event, and the identifier of the second PCC rule and the subscription indication information of the first event are used to update the second PCC rule to obtain the first PCC rule. It should be noted that, in this embodiment of this application, the first PCC rule may be understood as an updated second PCC rule. In other words, in this embodiment of this application, an identifier of the first PCC rule is the same as the identifier of the second PCC rule. This is uniformly described herein, and details are not described below again. It should be understood that, in this embodiment of this application, data description information of the first PCC rule may be the data description information of the second event or the data description information of the first event. This is not specifically limited in this embodiment of this application. Based on this solution, the first event may be subscribed to after the second event is subscribed to.

With reference to the eighth aspect, in a possible implementation, the event subscription method provided in this embodiment of this application further includes: The session management entity receives an unsubscription request for the first event, where the unsubscription request for the first event includes an unsubscription indication and an event subscription correlation identifier of the first event. The session management entity sends an identifier of the first PCC rule and unsubscription indication information of the first event to the policy control entity, where the unsubscription indication information of the first event indicates that the session management entity receives the unsubscription request for the first event, the identifier of the first PCC rule is determined based on the event subscription correlation identifier of the first event, the identifier of the first PCC rule and the unsubscription indication information of the first event are used to update the first PCC rule to obtain a fifth PCC rule, and the fifth PCC rule is obtained by deleting the indication information indicating to detect the first event from the first PCC rule. The session management entity receives the fifth PCC rule from the policy control entity. It should be noted that, in this embodiment of this application, the fifth PCC rule may be understood as an updated first PCC rule. In other words, in this embodiment of this application, an identifier of the fifth PCC rule is the same as the identifier of the first PCC rule. This is uniformly described herein, and details are not described below again. Based on this solution, the first event may be unsubscribed from.

With reference to the eighth aspect, in a possible implementation, the event subscription method provided in this embodiment of this application further includes: The session management entity receives an unsubscription request for the second event, where the unsubscription request for the second event includes an unsubscription indication and an event subscription correlation identifier of the second event. The session management entity sends an identifier of the first PCC rule and unsubscription indication information of the second event to the policy control entity, where the unsubscription indication information of the second event indicates that the session management entity receives the unsubscription request for the second event, the identifier of the first PCC rule is determined based on the event subscription correlation identifier of the second event, the identifier of the first PCC rule and the unsubscription indication information of the second event are used to update the first PCC rule to obtain a sixth PCC rule, and the sixth PCC rule is obtained by deleting the indication information indicating to detect the second event from the first PCC rule. The session management entity receives the sixth PCC rule from the policy control entity. It should be noted that, in this embodiment of this application, the sixth PCC rule may be understood as an updated first PCC rule. In other words, in this embodiment of this application, an identifier of the sixth PCC rule is the same as the identifier of the first PCC rule. This is uniformly described herein, and details are not described below again. Based on this solution, the second event may be unsubscribed from.

With reference to the eighth aspect, in a possible implementation, before that a session management entity receives a first PCC rule from a policy control entity, the event subscription method provided in this embodiment of this application further includes: The session management entity receives an event subscription request for the first event, where the event subscription request for the first event includes an event identifier of the first event and data description information of the first event. The session management entity determines that data description information of a second policy and charging control PCC rule overlaps the data description information of the first event, where the data description information of the second PCC rule is data description information of the second event, and the second PCC rule includes the indication information indicating to detect the second event. The session management entity sends, to the policy control entity, subscription indication information of the first event, an identifier of the second PCC rule, overlapping information in the data description information of the first event and the data description information of the second event, and the indication information indicating to detect the second event, where the subscription indication information of the first event indicates that the session management entity receives the event subscription request for the first event, the subscription indication information of the first event, the identifier of the second PCC rule, the overlapping information in the data description information of the first event and the data description information of the second event, and the indication information indicating to detect the second event are used to determine the first PCC rule, the first PCC rule includes the indication information indicating to detect the second event and the indication information indicating to detect the first event, and data description information of the first PCC rule is the overlapping information in the data description information of the first event and the data description information of the second event. The session management entity sends, to the policy control entity, the indication information indicating to detect the second event and information that is in the data description information of the second event and that is other than the overlapping information in the data description information of the first event and the data description information of the second event; and/or the session management entity sends, to the policy control entity, the subscription indication information of the first event and information that is in the data description information of the first event and that is other than the overlapping information in the data description information of the first event and the data description information of the second event, where the indication information indicating to detect the second event and the information that is in the data description information of the second event and that is other than the overlapping information in the data description information of the first event and the data description information of the second event are used to determine a third PCC rule, the third PCC rule includes the indication information indicating to detect the second event, data description information of the third PCC rule is the information that is in the data description information of the second event and that is other than the overlapping information in the data description information of the first event and the data description information of the second event, the subscription indication information of the first event and the information that is in the data description information of the first event and that is other than the overlapping information in the data description information of the first event and the data description information of the second event are used to determine a fourth PCC rule, the fourth PCC rule includes the indication information indicating to detect the first event, and data description information of the fourth PCC rule is the information that is in the data description information of the first event and that is other than the overlapping information in the data description information of the first event and the data description information of the second event. The session management entity receives the first PCC rule from the policy control entity. The event subscription method provided in this embodiment of this application further includes: The session management entity receives the third PCC rule and/or the fourth PCC rule from the policy control entity. Based on this solution, the first event may be subscribed to after the second event is subscribed to.

With reference to the eighth aspect, in a possible implementation, the event subscription method provided in this embodiment of this application further includes: The session management entity receives an unsubscription request for the first event, where the unsubscription request for the first event includes an unsubscription indication and an event subscription correlation identifier of the first event. The session management entity sends a first message to the policy control entity, where the first message includes an identifier of the first PCC rule and unsubscription indication information of the first event, the unsubscription indication information of the first event indicates that the session management entity receives the unsubscription request for the first event, the identifier of the first PCC rule is determined based on the event subscription correlation identifier of the first event, the identifier of the first PCC rule and indication information indicating to unsubscribe from the first event are used to update the first PCC rule to obtain a fifth PCC rule, and the fifth PCC rule is obtained by deleting the indication information indicating to detect the first event from the first PCC rule. The session management entity receives the fifth PCC rule from the policy control entity. It should be noted that, in this embodiment of this application, the fifth PCC rule may be understood as an updated first PCC rule. In other words, in this embodiment of this application, an identifier of the fifth PCC rule is the same as the identifier of the first PCC rule. This is uniformly described herein, and details are not described below again. Based on this solution, the first event may be unsubscribed from.

With reference to the eighth aspect, in a possible implementation, the first message further includes an identifier of the fourth PCC rule, and the identifier of the fourth PCC rule is determined based on the event subscription correlation identifier of the first event. The event subscription method provided in this embodiment of this application further includes: The session management entity receives, from the policy control entity, indication information indicating to delete the fourth PCC rule. The session management entity deletes the fourth PCC rule based on the indication information indicating to delete the fourth PCC rule. Based on this solution, the first event may be unsubscribed from.

With reference to the eighth aspect, in a possible implementation, the event subscription method provided in this embodiment of this application further includes: The session management entity receives an unsubscription request for the second event, where the unsubscription request for the second event includes an unsubscription indication and an event subscription correlation identifier of the second event. The session management entity sends a second message to the policy control entity, where the first message includes an identifier of the first PCC rule and unsubscription indication information of the second event, the unsubscription indication information of the second event indicates that the session management entity receives the unsubscription request for the second event, the identifier of the first PCC rule is determined based on the event subscription correlation identifier of the second event, the identifier of the first PCC rule and indication information indicating to unsubscribe from the second event are used to update the first PCC rule to obtain a sixth PCC rule, and the sixth PCC rule is obtained by deleting the indication information indicating to detect the second event from the first PCC rule. The session management entity receives the sixth PCC rule from the policy control entity. It should be noted that, in this embodiment of this application, the sixth PCC rule may be understood as an updated first PCC rule. In other words, in this embodiment of this application, an identifier of the sixth PCC rule is the same as the identifier of the first PCC rule. This is uniformly described herein, and details are not described below again. Based on this solution, the second event may be unsubscribed from.

With reference to the eighth aspect, in a possible implementation, the first message further includes an identifier of the third PCC rule, and the identifier of the third PCC rule is determined based on the event subscription correlation identifier of the second event. The event subscription method provided in this embodiment of this application further includes: The session management entity receives, from the policy control entity, indication information indicating to delete the third PCC rule. The session management entity deletes the third PCC rule based on the indication information indicating to delete the third PCC rule. Based on this solution, the second event may be unsubscribed from.

According to a ninth aspect, a communication apparatus is provided, to implement the foregoing method. The communication apparatus may be the policy control entity in the first aspect, the second aspect, the fourth aspect, the fifth aspect, or the seventh aspect, or an apparatus including the policy control entity. Alternatively, the communication apparatus may be the session management entity in the third aspect or the sixth aspect, or an apparatus including the session management entity. The communication apparatus includes a corresponding module, unit, or means for implementing the foregoing method. The module, the unit, or the means may be implemented by hardware or software, or implemented by hardware by executing corresponding software. The hardware or the software includes one or more modules or units corresponding to the foregoing function.

With reference to the ninth aspect, in some possible implementations, the communication apparatus may include a processing module and a transceiver module. The transceiver module may also be referred to as a transceiver unit, and is configured to implement a sending function and/or a receiving function in any one of the foregoing aspects and any one of the possible implementations of the foregoing aspects. The transceiver module may include a transceiver circuit, a transceiver machine, a transceiver, or a communication interface. The processing module may be configured to implement a processing function in any one of the foregoing aspects and any one of the possible implementations of the foregoing aspects. The processing module may be, for example, a processor.

With reference to the ninth aspect, in some possible implementations, the transceiver module includes a sending module and a receiving module, respectively configured to implement the sending function and the receiving function in any one of the foregoing aspects and any one of the possible implementations of the foregoing aspects.

According to a tenth aspect, a communication apparatus is provided. The communication apparatus includes a processor. The processor is configured to: after being coupled to a memory and reading instructions in the memory, perform, according to the instructions, the method according to any one of the foregoing aspects. The communication apparatus may be the policy control entity in the first aspect, the second aspect, the fourth aspect, the fifth aspect, or the seventh aspect, or an apparatus including the policy control entity. Alternatively, the communication apparatus may be the session management entity in the third aspect or the sixth aspect, or an apparatus including the session management entity.

With reference to the tenth aspect, in a possible implementation, the communication apparatus further includes the memory. The memory is configured to store necessary program instructions and data.

With reference to the tenth aspect, in a possible implementation, the communication apparatus is a chip or a chip system. Optionally, when the communication apparatus is the chip system, the communication apparatus may include a chip, or may include a chip and another discrete component.

According to an eleventh aspect, a communication apparatus is provided. The communication apparatus includes a processor and an interface circuit. The interface circuit is configured to receive a computer program or instructions and transmit the computer program or the instructions to a processor. The processor is configured to execute the computer program or the instructions, to enable the communication apparatus to perform the method according to any one of the foregoing aspects.

According to a twelfth aspect, a computer-readable storage medium is provided. The computer-readable storage medium stores instructions. When the instructions are run on a computer, the computer is enabled to perform the method according to any one of the foregoing aspects.

According to a thirteenth aspect, a computer program product including instructions is provided. When the computer program product runs on a computer, the computer is enabled to perform the method according to any one of the foregoing aspects.

For a technical effect achieved by any one of the possible implementations of the ninth aspect to the thirteenth aspect, refer to a technical effect achieved by any one of the first aspect to the eighth aspect or different design manners in any one of the aspects. Details are not described herein again.

According to a fourteenth aspect, a communication system is provided. The communication system includes a policy control entity configured to perform the event subscription method according to the first aspect and a session management entity configured to perform the event subscription method according to the eighth aspect. Alternatively, the communication system includes a policy control entity configured to perform the event subscription method according to the second aspect and a session management entity configured to perform the event subscription method according to the eighth aspect. Alternatively, the communication system includes a policy control entity configured to perform the event subscription method according to the fourth aspect and a session management entity configured to perform the event subscription method according to the third aspect. Alternatively, the communication system includes a policy control entity configured to perform the event subscription method according to the fifth aspect and a session management entity configured to perform the event subscription method according to the eighth aspect. Alternatively, the communication system includes a policy control entity configured to perform the event subscription method according to the seventh aspect and a session management entity configured to perform the event subscription method according to the sixth aspect.

DESCRIPTION OF EMBODIMENTS

The following describes the technical solutions in embodiments of this application with reference to the accompanying drawings in embodiments of this application. In the descriptions of this application, unless otherwise specified, "/" indicates an "or" relationship between correlated objects. For example, A/B may indicate A or B. In this application, "and/or" describes only an association relationship between associated objects and indicates that three relationships may exist. For example, A and/or B may indicate the following three cases: Only A exists, both A and B exist, and only B exists, where A or B may be singular or plural. In addition, in the descriptions of this application, "a plurality of" means two or more than two unless otherwise specified. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a specific manner for ease of understanding.

In addition, a network architecture and a service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

Figure 1:
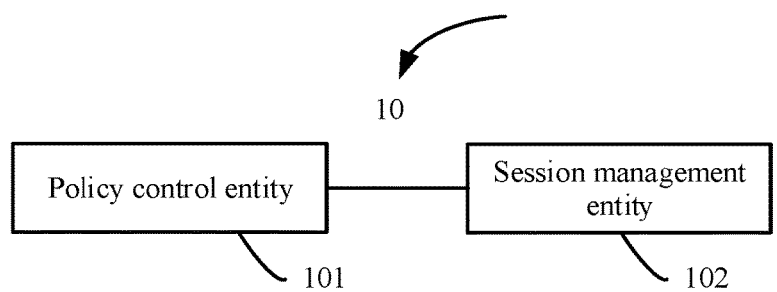
FIG. 1 is a schematic diagram of an architecture of a communication system according to an embodiment of this application.

FIG. 1 shows a communication system 10 according to an embodiment of this application. The communication system 10 includes a policy control entity 101 and a session management entity 102. The policy control entity 101 and the session management entity 102 may directly communicate with each other, or may communicate with each other through forwarding by another device. This is not specifically limited in this embodiment of this application. In addition, for an event subscription method based on the communication system 10 provided in this embodiment of this application, refer to a subsequent method embodiment. Details are not described herein.

Optionally, the communication system 10 shown in FIG. 1 is applicable to a currently discussed 5th generation (5G) network, or is applicable to another future network, or the like. This is not specifically limited in this embodiment of this application.

For example, the communication system 10 shown in FIG. 1 is applicable to the currently discussed 5G network. In this case, a network element or entity corresponding to the session management entity may be an SMF in a 5G network shown in FIG. 2, and a network element or entity corresponding to the policy control entity may be a policy control function (PCF) in the 5G network shown in FIG. 2.

Figure 2:
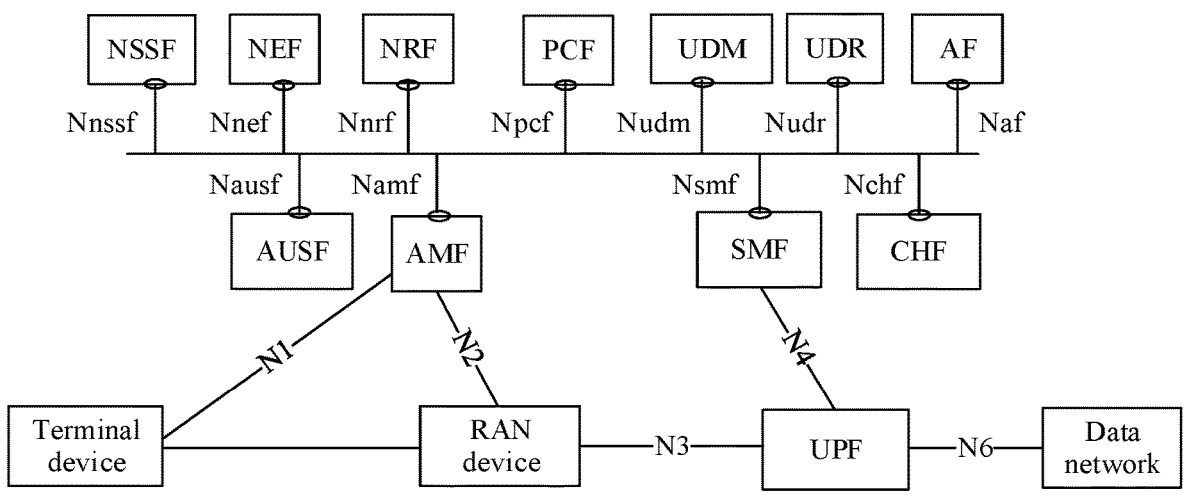
FIG. 2 is a schematic diagram of an application-oriented architecture of a 5G network according to an embodiment of this application.

In addition, as shown in FIG. 2, the 5G network may further include a RAN device, a UPF, an access and mobility management function (AMF), an authentication server function (AUSF), a network slice selection function (NSSF), a network exposure function (NEF), a network repository function (NRF), a unified data management (UDM), a unified data repository (UDR), an AF, a charging function (CHF), or the like.

As shown in FIG. 2, a terminal device accesses the 5G network via the RAN device; the terminal device communicates with the AMF through an N1 interface (N1 for short); the RAN device communicates with the AMF through an N2 interface (N2 for short); the RAN device communicates with the UPF through an N3 interface (N3 for short); the SMF communicates with the UPF through an N4 interface (N4 for short); and the UPF accesses a data network through an N6 interface (N6 for short). In addition, control plane functions such as the AUSF, the AMF, the SMF, the NSSF, the NEF, the NRF, the PCF, the UDM, the UDR, the CHF, and the AF shown in FIG. 2 interact with each other through service-oriented interfaces. For example, a service-oriented interface exhibited by the AUSF is Nausf, a service-oriented interface exhibited by the AMF is Namf, a service-oriented interface exhibited by the SMF is Nsmf, a service-oriented interface exhibited by the NSSF is Nnssf, a service-oriented interface exhibited by the NEF is Nnef, a service-oriented interface exhibited by the NRF is Nnrf, a service-oriented interface exhibited by the PCF is Npcf, a service-oriented interface exhibited by the UDM is Nudm, a service-oriented interface exhibited by the UDR is Nudr, a service-oriented interface exhibited by the CHF is Nchf, and a service-oriented interface exhibited by the AF is Naf. For related function descriptions and interface descriptions, refer to a diagram of a 5G system architecture in the 23.501 standard. Details are not described herein.

Figure 3:
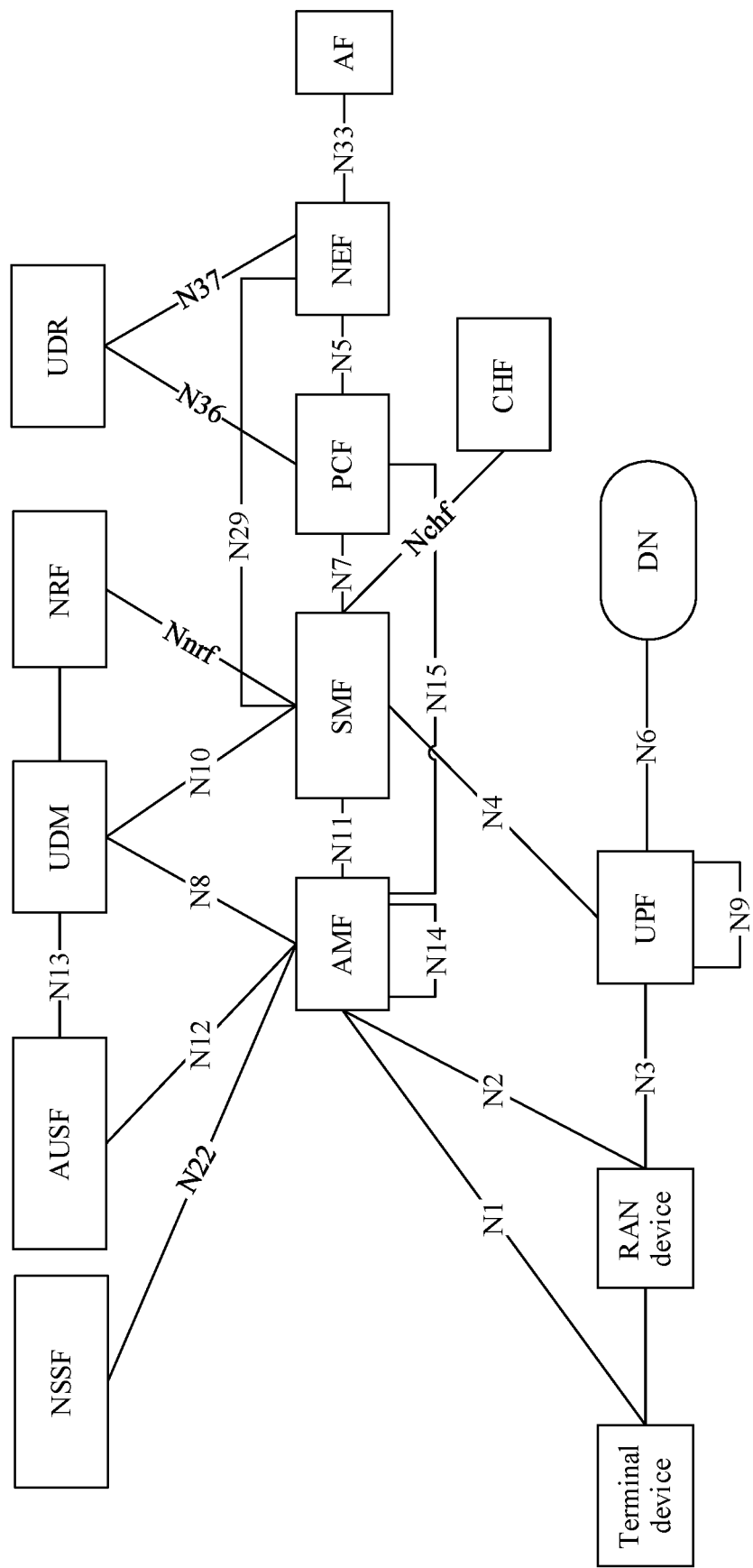
FIG. 3 is a schematic diagram of a reference point-based 5G network architecture corresponding to FIG. 2.

FIG. 2 is a schematic diagram of a service-oriented architecture of an existing 5G network. FIG. 3 is a schematic diagram of a reference point-based 5G network architecture corresponding to FIG. 2. As shown in FIG. 3, a terminal device accesses a 5G network via a RAN device; the terminal device communicates with an AMF through an N1 interface (N1 for short); the RAN device communicates with an AMF through an N2 interface (N2 for short); the RAN device communicates with a UPF through an N3 interface (N3 for short); different UPFs communicate with each other through an N9 interface (N9 for short); and the UPF accesses a data network through an N6 interface (N6 for short). In addition, an SMF communicates with the UPF through an N4 interface (N4 for short); the AMF network element communicates with the SMF through an N11 interface (N11 for short); the AMF communicates with a UDM through an N8 interface (N8 for short); the AMF communicates with an AUSF through an N12 interface (N12 for short); the AMF communicates with a PCF through an N15 interface (N15 for short); the AMF communicates with an NSSF through an N22 interface (N22 for short); different AMFs communicate with each other through an N14 interface (N14 for short); the SMF communicates with the PCF through an N7 interface (N7 for short); the SMF communicates with the UDM through an N10 interface (N10 for short); the SMF communicates with an NEF through an N29 interface (N29 for short); the SMF communicates with an NRF through an Nnrf interface (Nnrf for short); the SMF communicates with a CHF through an Nchf interface (Nchf for short); the PCF communicates with the NEF through an N5 interface (N5 for short); a UDR communicates with the PCF through an N36 interface (N36 for short); the UDR communicates with the NEF through an N37 interface (N37 for short); the UDM communicates with the AUSF through an N13 interface (N13 for short); and the UDM communicates with the NRF through an N29 interface (N29 for short).

Optionally, in embodiments of this application, the session management entity or the policy control entity may also be referred to as a communication apparatus. The communication apparatus may be a general-purpose device or a dedicated device. This is not specifically limited in embodiments of this application.

Optionally, in embodiments of this application, a related function of the session management entity or the policy control entity may be implemented by one device, or may be jointly implemented by a plurality of devices, or may be implemented by one or more functional modules in one device. This is not specifically limited in embodiments of this application. It may be understood that the foregoing function may be a network element in a hardware device, or may be a software function run on dedicated hardware, a combination of hardware and software, or a virtualization function instantiated on a platform (for example, a cloud platform).

Figure 4:
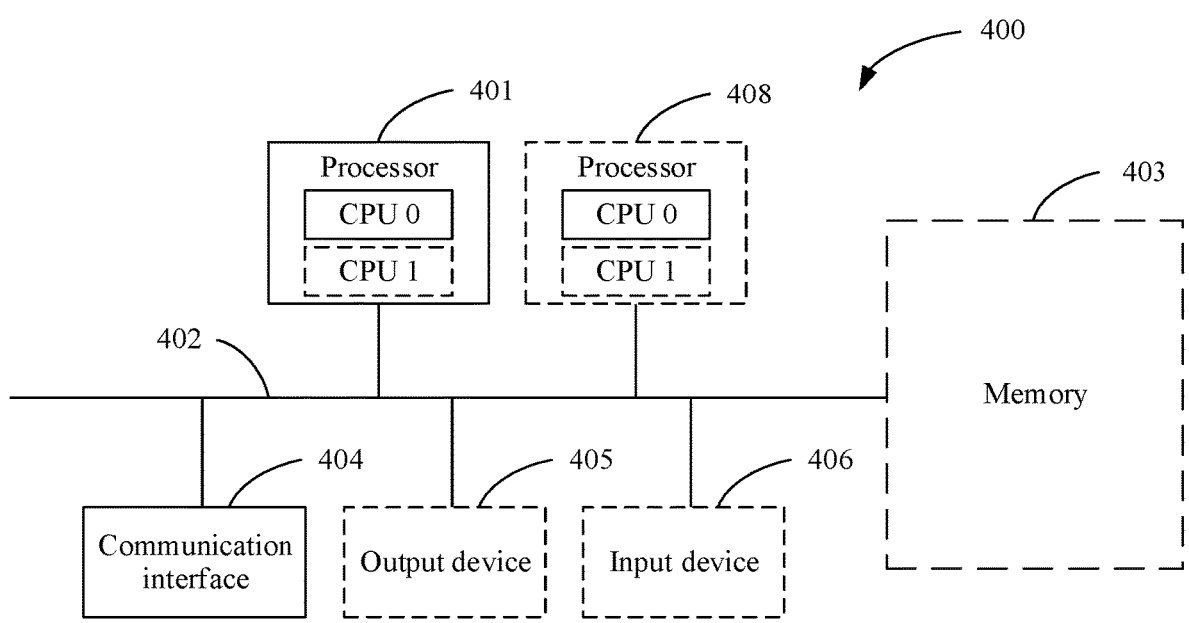
FIG. 4 is a schematic diagram of a structure of a communication apparatus according to an embodiment of this application.

For example, the related function of the session management entity or the policy control entity in embodiments of this application may be implemented by a communication apparatus 400 in FIG. 4. FIG. 4 is a schematic diagram of a structure of the communication apparatus 400 according to an embodiment of this application. The communication apparatus 400 includes one or more processors 401, a communication line 402, and at least one communication interface (where in FIG. 4, only an example in which a communication interface 404 and one processor 401 are included is used for description), and optionally, may further include a memory 403.

The processor 401 may be a general-purpose central processing unit (CPU), a microprocessor, an application-specific integrated circuit (ASIC), or one or more integrated circuits configured to control program execution of the solutions in this application.

The communication line 402 may include a path for connecting different components.

The communication interface 404 may be a transceiver module, configured to communicate with another device or a communication network, such as the Ethernet, a RAN, or a wireless local area network (WLAN). For example, the transceiver module may be an apparatus such as a transceiver machine or a transceiver. Optionally, the communication interface 404 may alternatively be a transceiver circuit located in the processor 401, and is configured to implement signal input and signal output of the processor.

The memory 403 may be an apparatus having a storage function. For example, the memory 403 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 403 is not limited thereto. The memory may exist independently, and is connected to the processor through the communication line 402. The memory may alternatively be integrated with the processor.

The memory 403 is configured to store computer-executable instructions for performing the solutions in this application, and the processor 401 controls the execution. The processor 401 is configured to execute the computer-executable instructions stored in the memory 403, to implement an event subscription method provided in embodiments of this application.

Alternatively, optionally, in this embodiment of this application, the processor 401 may perform a related processing function in an event subscription method provided in the following embodiments of this application. The communication interface 404 is responsible for communicating with another device or a communication network. This is not specifically limited in this embodiment of this application.

Optionally, the computer-executable instructions in this embodiment of this application may also be referred to as application program code. This is not specifically limited in this embodiment of this application.

During specific implementation, in an embodiment, the processor 401 may include one or more CPUs, for example, a CPU 0 and a CPU 1 in FIG. 4.

During specific implementation, in an embodiment, the communication apparatus 400 may include a plurality of processors, for example, the processor 401 and a processor 408 in FIG. 4. Each of the processors may be a single-core processor or a multi-core (multi-core) processor. The processor herein may include but is not limited to at least one of the following various computing devices that run software: a central processing unit (CPU), a microprocessor, a digital signal processor (DSP), a microcontroller unit (MCU), an artificial intelligence processor, or the like. Each computing device may include one or more cores configured to perform an operation or processing by executing software instructions.

During specific implementation, in an embodiment, the communication apparatus 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, or a projector (projector). The input device 406 communicates with the processor 401, and may receive an input of a user in a plurality of manners. For example, the input device 406 may be a mouse, a keyboard, a touchscreen device, or a sensor device.

The communication apparatus 400 may also be referred to as a communication apparatus sometimes, and may be a general-purpose device or a dedicated device. For example, the communication apparatus 400 may be a desktop computer, a portable computer, a network server, a palmtop computer (PDA), a mobile phone, a tablet computer, a wireless terminal device, an embedded device, the foregoing terminal device, the foregoing network device, or a device having a structure similar to that in FIG. 4. A type of the communication apparatus 400 is not limited in this embodiment of this application.

The event subscription method provided in embodiments of this application is described below with reference to the communication system shown in FIG. 1.

It should be noted that, in the following embodiments, a first event may be, for example, a downlink data notification failure (DDN failure) event, and a second event may be, for example, a downlink data delivery status (DDD status) event; or a first event may be, for example, a downlink data delivery status (DDD status) event, and a second event may be, for example, a downlink data notification failure (DDN failure) event; or a first event and a second event may be other events. This is uniformly described herein. This is not specifically limited in embodiments of this application.

Figure 5:
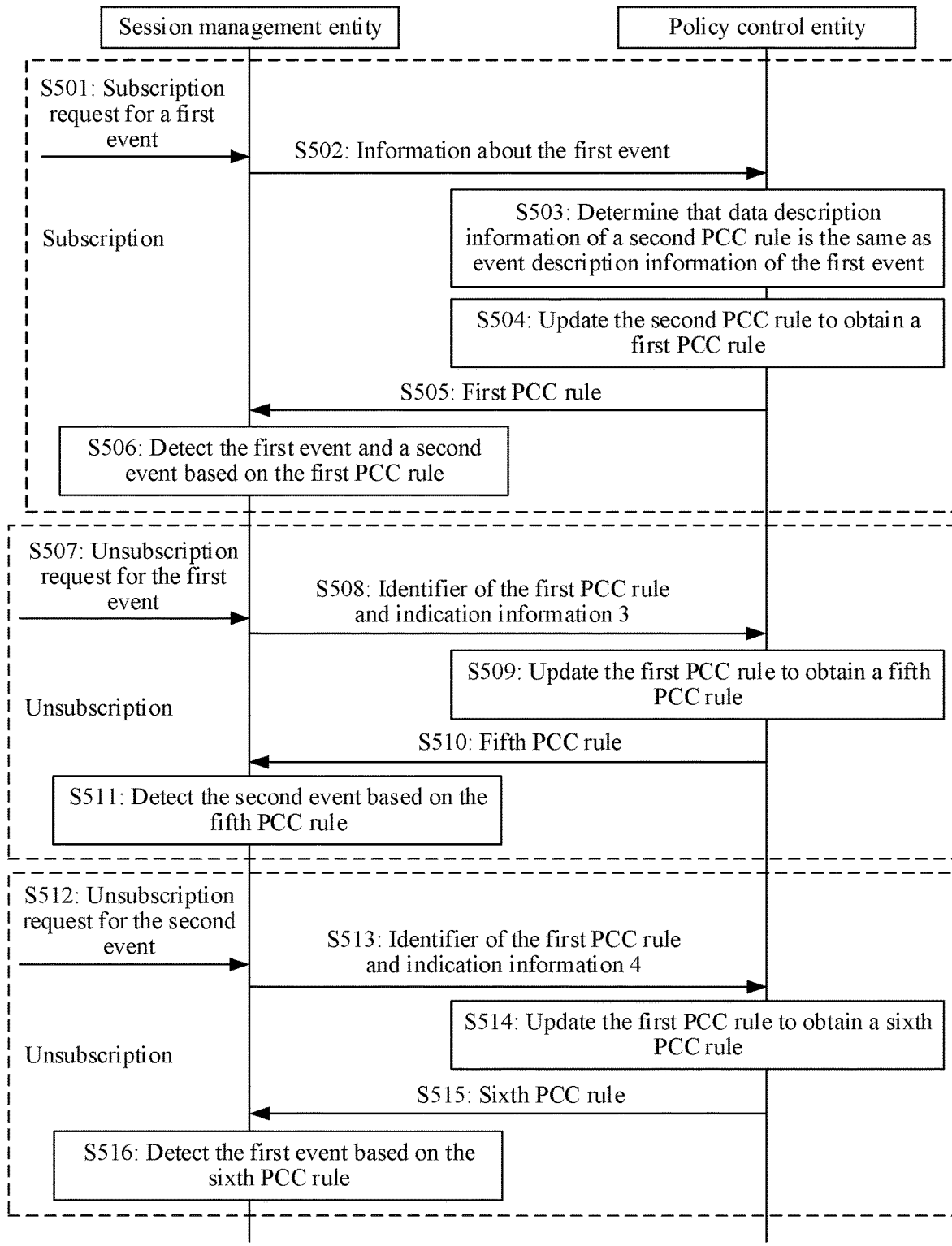
FIG. 5 is a first schematic flowchart of an event subscription method according to an embodiment of this application.

FIG. 5 shows an event subscription method according to an embodiment of this application. Descriptions are provided below.

S501: A session management entity receives an event subscription request for a first event, where the event subscription request for the first event includes an event identifier of the first event and data description information of the first event.

In this embodiment of this application, the event identifier of the first event indicates the first event. For example, the event identifier of the first event is DDD Status or DDN Failure.

In this embodiment of this application, the data description information of the first event is used to identify a source address of downlink data corresponding to the first event. An example is as follows: For internet protocol (IP) data, the data description information of the first event may be, for example, server-side 3-tuple information, including a source IP address, a source port number, and a transport layer protocol.

In this embodiment of this application, after receiving the subscription request for the first event from a subscription entity of the first event, the session management entity may allocate an event subscription correlation identifier to event subscription for the first event, and send the event subscription correlation identifier to the subscription entity of the first event, or the subscription request for the first event includes an event subscription correlation identifier. This is not specifically limited in this embodiment of this application.

S502: The session management entity sends information about the first event to a policy control entity. Correspondingly, the policy control entity receives the information about the first event from the session management entity. The information about the first event includes subscription indication information of the first event and the data description information of the first event.

In this embodiment of this application, after receiving the event subscription request for the first event, the session management entity may obtain the subscription indication information of the first event and the data description information of the first event based on the event subscription request for the first event. The subscription indication information of the first event indicates that the session management entity receives the event subscription request for the first event.

For example, when the first event is a downlink data notification failure event, the subscription indication information of the first event may be, for example, a policy control request trigger of DDN_FAILURE; or when the first event is a downlink data delivery status event, the subscription indication information of the first event may be, for example, a policy control request trigger of DDN_DELIVERY_STATUS (which may also be represented as DDD_STATUS).

Optionally, in this embodiment of this application, the information about the first event may further include a subscription identifier of the first event, and the subscription identifier of the first event is used to correlate with the event subscription for the first event. This is not specifically limited in this embodiment of this application.

S503: The policy control entity determines that data description information of a second PCC rule is the same as event description information of the first event. The data description information of the second PCC rule is data description information of a second event, and the second PCC rule includes indication information indicating to detect the second event (which is referred to as indication information 1 for short below).

In this embodiment of this application, the data description information of the second event is used to identify a source address of downlink data corresponding to the second event. For a related example of the data description information of the second event, refer to the foregoing example of the data description information of the first event. Details are not described herein again.

In this embodiment of this application, the indication information 1 is determined based on subscription indication information of the second event. For example, when the second event is a downlink data notification failure event, the indication information 1 may be, for example, DDN failure notification control indication information; or when the second event is a downlink data delivery status event, the indication information 1 may be, for example, downlink data delivery status control indication information.

S504: The policy control entity updates the second PCC rule based on the subscription indication information of the first event, to obtain a first PCC rule. The first PCC rule includes the indication information 1 and indication information indicating to detect the first event (which is referred to as indication information 2 for short below).

In this embodiment of this application, the indication information 2 is determined based on the subscription indication information of the first event. For example, when the first event is a downlink data notification failure event, the indication information 2 may be, for example, DDN failure notification control indication information; or when the first event is a downlink data delivery status event, the indication information 2 may be, for example, downlink data delivery status control indication information.

It should be noted that, in this embodiment of this application, the first PCC rule may be understood as an updated second PCC rule. In other words, in this embodiment of this application, an identifier of the first PCC rule is the same as an identifier of the second PCC rule. This is uniformly described herein, and details are not described below again. It should be understood that, in this embodiment of this application, data description information of the first PCC rule may be the data description information of the second event or the data description information of the first event. This is not specifically limited in this embodiment of this application.

S505: The policy control entity sends the first PCC rule to the session management entity. Correspondingly, the session management entity receives the first PCC rule from the policy control entity.

S506: The session management entity detects the first event and the second event based on the first PCC rule.

In a possible implementation, step S506 includes: The session management entity determines, based on the first PCC rule, a first PDR and a first FAR correlated with the first PDR, where the first FAR is determined based on the indication information 1 and/or the indication information 2. The session management entity sends the first PDR and the first FAR to a user plane function entity. The session management entity receives, from the user plane function entity, an identifier of the first PDR and a downlink data status that is reported based on the first FAR. The session management entity sends a first notification message to the subscription entity of the first event, and/or sends a second notification message to a subscription entity of the second event based on the identifier of the first PDR and the downlink data status that is reported based on the first FAR, where the first notification message is used to notify the first event, and the second notification message is used to notify the second event.

Optionally, a first flag is set in the first FAR, and the first flag indicates the user plane function entity to notify the session management entity after the user plane function entity discards the first data packet that matches the first PDR. Correspondingly, the downlink data status that is reported based on the first FAR includes: the first data packet that matches the first PDR is discarded. It should be noted that, in this embodiment of this application, the session management entity usually sends the first PDR and the first FAR to the user plane function entity after perceiving that downlink data of a terminal device is unavailable. This is uniformly described herein, and details are not described below again.

Further, the first event is a downlink data notification failure event. The second event is a downlink data delivery status event, and a notification request type of the downlink data delivery status event includes a discarded type. That the session management entity sends a first notification message to the subscription entity of the first event, and/or sends a second notification message to a subscription entity of the second event based on the identifier of the first PDR and the downlink data status that is reported based on the first FAR includes: The session management entity sends the first notification message to a mobility management entity, and sends the second notification message to a network exposure function entity based on the identifier of the first PDR and the downlink data status that is reported based on the first FAR, where the first notification message is used to notify a downlink data notification failure, and the second notification message is used to notify that downlink data is discarded.

Alternatively, further, the second event is a downlink data notification failure event. The first event is a downlink data delivery status event, and a notification request type of the downlink data delivery status event includes a discarded type. That the session management entity sends a first notification message to the subscription entity of the first event, and/or sends a second notification message to a subscription entity of the second event based on the identifier of the first PDR and the downlink data status that is reported based on the first FAR includes: The session management entity sends the first notification message to a network exposure function entity, and sends the second notification message to a mobility management entity based on the identifier of the first PDR and the downlink data status that is reported based on the first FAR, where the first notification message is used to notify that downlink data is discarded, and the second notification message is used to notify a downlink data notification failure.

Optionally, a second flag is set in the first FAR, and the second flag indicates the user plane function entity to notify the session management entity after the user plane function entity buffers the first data packet that matches the first PDR. Correspondingly, the downlink data status that is reported based on the first FAR includes: the first data packet that matches the first PDR is buffered. It should be noted that, in this embodiment of this application, the session management entity usually sends the first PDR and the first FAR to the user plane function entity after perceiving that a terminal device is idle. This is uniformly described herein, and details are not described below again.

Further, the first event is a downlink data delivery status event. That the session management entity sends a first notification message to the subscription entity of the first event, and/or sends a second notification message to a subscription entity of the second event based on the identifier of the first PDR and the downlink data status that is reported based on the first FAR includes: The session management entity sends the first notification message to a network exposure function entity based on the identifier of the first PDR and the downlink data status that is reported based on the first FAR, where the first notification message is used to notify that downlink data is buffered.

Alternatively, further, the second event is a downlink data delivery status event. That the session management entity sends a first notification message to the subscription entity of the first event, and/or sends a second notification message to a subscription entity of the second event based on the identifier of the first PDR and the downlink data status that is reported based on the first FAR includes: The session management entity sends the second notification message to a network exposure function entity based on the identifier of the first PDR and the downlink data status that is reported based on the first FAR, where the second notification message is used to notify that downlink data is buffered.

Optionally, as shown in FIG. 5, the event subscription method provided in this embodiment of this application further includes an unsubscription procedure. Descriptions are provided below.

In a possible implementation, unsubscription from the first event is used as an example, and the following steps are included.

S507: The session management entity receives an unsubscription request for the first event.

In this embodiment of this application, the unsubscription request for the first event includes an unsubscription indication and the event subscription correlation identifier of the first event.

S508: The session management entity sends the identifier of the first PCC rule and unsubscription indication information of the first event (which is referred to as indication information 3 for short below) to the policy control entity. Correspondingly, the policy control entity receives the identifier of the first PCC rule and the indication information 3 from the session management entity. The indication information 3 indicates that the session management entity receives the unsubscription request for the first event.

In this embodiment of this application, the session management entity determines the identifier of the first PCC rule based on the event subscription correlation identifier of the first event. This is uniformly described herein, and details are not described below again.

For example, when the first event is the downlink data notification failure event, the unsubscription indication information of the first event may be, for example, a policy control request trigger of UNSUBSCRIBED_DDN_FAILURE; or when the first event is the downlink data delivery status event, the unsubscription indication information of the first event may be, for example, a policy control request trigger of UNSUBSCRIBED_DDN_DELIVERY_STATUS (which may also be represented as UNSUBSCRIBED_DDD_STATUS).

S509: The policy control entity updates the first PCC rule based on the identifier of the first PCC rule and the indication information 3, to obtain a fifth PCC rule.

The fifth PCC rule is obtained by deleting the indication information 2 from the first PCC rule. In other words, compared with the first PCC rule, the fifth PCC rule does not include the indication information 2, but still includes the indication information 1.

It should be noted that, in this embodiment of this application, the fifth PCC rule may be understood as an updated first PCC rule. In other words, in this embodiment of this application, an identifier of the fifth PCC rule is the same as the identifier of the first PCC rule. This is uniformly described herein, and details are not described below again.

S510: The policy control entity sends the fifth PCC rule to the session management entity. Correspondingly, the session management entity receives the fifth PCC rule from the policy control entity.

S511: The session management entity detects the second event based on the fifth PCC rule.

As an example, for a specific implementation in which the session management entity detects a single event based on a PCC rule, refer to the conventional technology. Details are not described herein.

In another possible implementation, unsubscription from the second event is used as an example, and the following steps are included.

S512: The session management entity receives an unsubscription request for the second event.

In this embodiment of this application, the unsubscription request for the second event includes an unsubscription indication and an event subscription correlation identifier of the second event.

S513: The session management entity sends the identifier of the first PCC rule and unsubscription indication information of the second event (which is referred to as indication information 4 for short below) to the policy control entity. Correspondingly, the policy control entity receives the identifier of the first PCC rule and the indication information 4 from the session management entity. The indication information 4 indicates that the session management entity receives the unsubscription request for the second event.

In this embodiment of this application, the session management entity determines the identifier of the first PCC rule based on the event subscription correlation identifier of the second event. This is uniformly described herein, and details are not described below again.

For example, when the second event is the downlink data notification failure event, the unsubscription indication information of the second event may be, for example, a policy control request trigger of UNSUBSCRIBED_DDN_FAILURE; or when the second event is the downlink data delivery status event, the subscription indication information of the second event may be, for example, a policy control request trigger of UNSUBSCRIBED_DDN_DELIVERY_STATUS (which may also be represented as UNSUBSCRIBED_DDD_STATUS).

S514: The policy control entity updates the first PCC rule based on the identifier of the first PCC rule and the indication information 4, to obtain a sixth PCC rule.

The sixth PCC rule is obtained by deleting the indication information 1 from the first PCC rule. In other words, compared with the first PCC rule, the sixth PCC rule does not include the indication information 1, but still includes the indication information 2.

It should be noted that, in this embodiment of this application, the sixth PCC rule may be understood as an updated first PCC rule. In other words, in this embodiment of this application, an identifier of the sixth PCC rule is the same as the identifier of the first PCC rule. This is uniformly described herein, and details are not described below again.

S515: The policy control entity sends the sixth PCC rule to the session management entity. Correspondingly, the session management entity receives the sixth PCC rule from the policy control entity.

S516: The session management entity detects the first event based on the sixth PCC rule.

As an example, for a specific implementation in which the session management entity detects a single event based on a PCC rule, refer to the conventional technology. Details are not described herein.

According to the event subscription method provided in this embodiment of this application, after the policy control entity sends the first PCC rule to the session management entity, the session management entity can detect both the first event and the second event based on the first PCC rule. This avoids a problem that when two events with same data description information are subscribed to, a user plane function entity can obtain through matching only a PDR of one event, and consequently, the session management entity can receive only one event notification, and the session management entity can detect only one event in the conventional technology. Further, this embodiment of this application further provides unsubscription procedures of two events after the events are subscribed to.

The actions of the session management entity in steps S501 to S516 may be performed by the processor 401 in the communication apparatus 400 shown in FIG. 4 by invoking the application program code stored in the memory 403, to instruct the session management entity to perform the actions. The actions of the policy control entity in steps S501 to S516 may be performed by the processor 401 in the communication apparatus 400 shown in FIG. 4 by invoking the application program code stored in the memory 403, to instruct the policy control entity to perform the actions. This is not limited in this embodiment.

Figure 6:
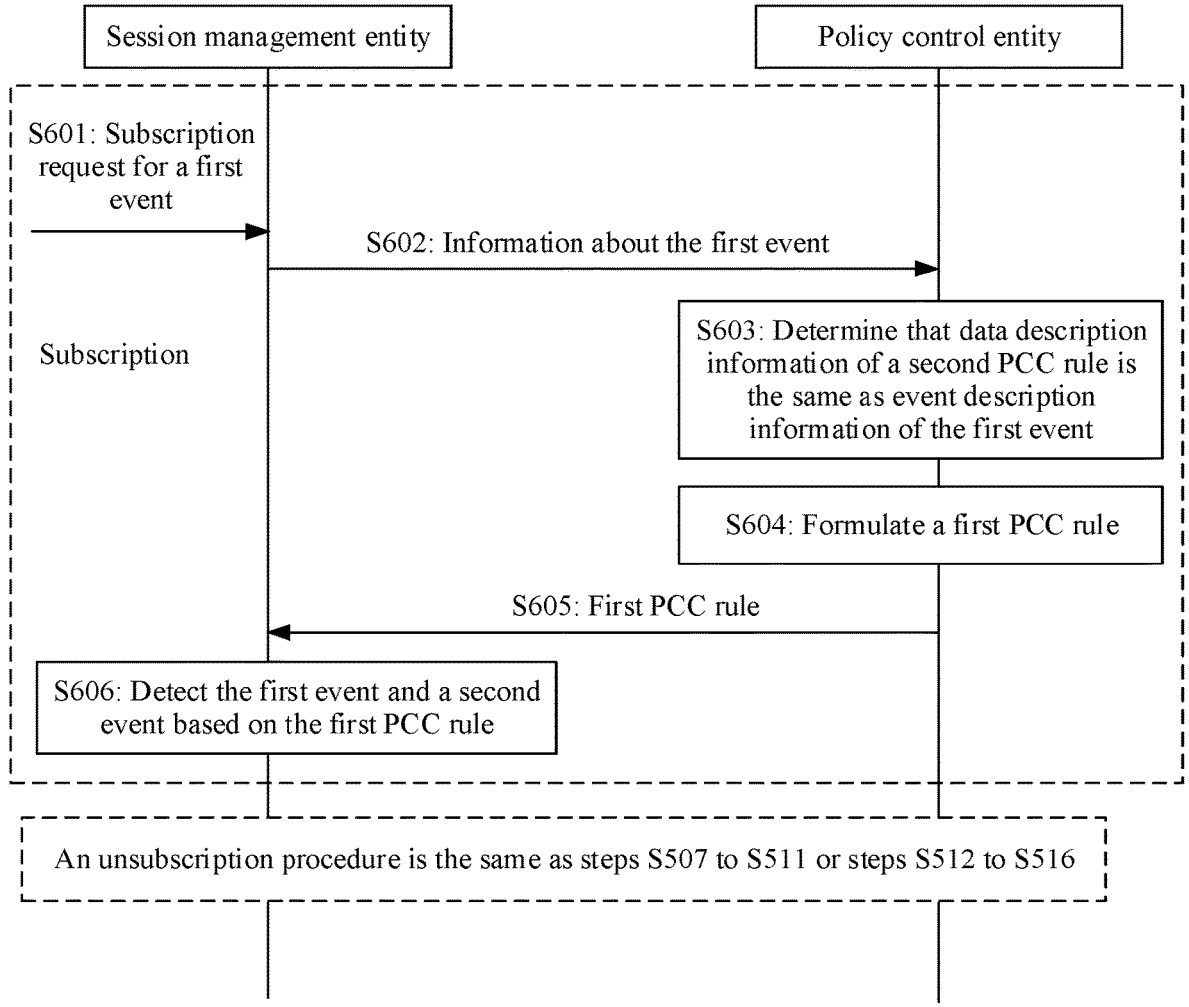
FIG. 6 is a second schematic flowchart of an event subscription method according to an embodiment of this application.

FIG. 6 shows an event subscription method according to an embodiment of this application. Descriptions are provided below.

S601: A session management entity receives an event subscription request for a first event, where the event subscription request for the first event includes an event identifier of the first event and data description information of the first event.

S602: The session management entity sends information about the first event to a policy control entity. Correspondingly, the policy control entity receives the information about the first event from the session management entity.

S603: The policy control entity determines that data description information of a second PCC rule is the same as event description information of the first event. The data description information of the second PCC rule is data description information of a second event, and the second PCC rule includes indication information indicating to detect the second event.

For a specific implementation of steps S601 to S603, refer to steps S501 to S503 in the embodiment shown in FIG. 5. Details are not described herein again.

S604: The policy control entity formulates a first PCC rule based on subscription indication information of the first event. For related descriptions of the first PCC rule, refer to step S504 in the embodiment shown in FIG. 5. Details are not described herein again.

It should be noted that, in this embodiment of this application, an identifier of the first PCC rule may be different from an identifier of the second PCC rule. This is uniformly described herein, and details are not described below again. It should be understood that, in this embodiment of this application, data description information of the first PCC rule may be the data description information of the second event or the data description information of the first event. This is not specifically limited in this embodiment of this application.

Optionally, in this embodiment of this application, the first PCC rule is used to replace the second PCC rule, or a priority of the first PCC rule is higher than a priority of the second PCC rule.

S605: The policy control entity sends the first PCC rule to the session management entity. Correspondingly, the session management entity receives the first PCC rule from the policy control entity.

S606: The session management entity detects the first event and the second event based on the first PCC rule.

For a specific implementation of step S606, refer to step S506 in the embodiment shown in FIG. 5. Details are not described herein again.

Optionally, the event subscription method provided in this embodiment of this application further includes: The policy control entity sends, to the session management entity, indication information indicating to delete the second PCC rule. After receiving the indication information indicating to delete the second PCC rule, the session management entity deletes the second PCC rule stored on the session management entity, and indicates a user plane function entity to delete a PDR and a FAR that are determined by the session management entity based on the second PCC rule. This is not specifically limited in this embodiment of this application.

Optionally, the event subscription method provided in this embodiment of this application further includes an unsubscription procedure. For related descriptions, refer to steps S507 to S511 or steps S512 to S515 in the embodiment shown in FIG. 5. Details are not described herein again.

For a technical effect of the embodiment shown in FIG. 6, refer to the technical effect of the embodiment shown in FIG. 5. Details are not described herein again.

The actions of the session management entity in steps S601 to S606 may be performed by the processor 401 in the communication apparatus 400 shown in FIG. 4 by invoking the application program code stored in the memory 403, to instruct the session management entity to perform the actions. The actions of the policy control entity in steps S601 to S606 may be performed by the processor 401 in the communication apparatus 400 shown in FIG. 4 by invoking the application program code stored in the memory 403, to instruct the policy control entity to perform the actions. This is not limited in this embodiment.

Figure 7:
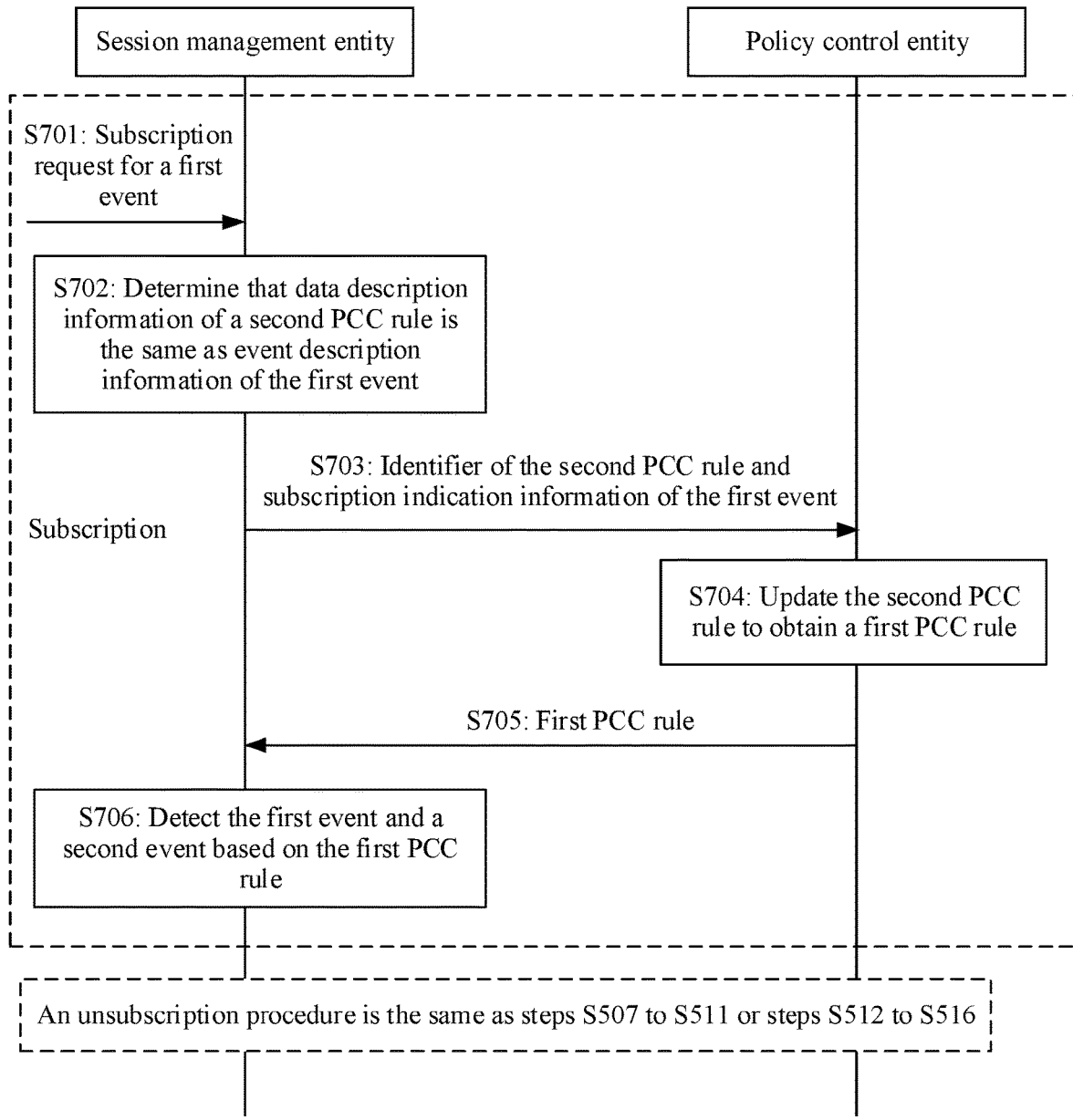
FIG. 7 is a third schematic flowchart of an event subscription method according to an embodiment of this application.

FIG. 7 shows an event subscription method according to an embodiment of this application. Descriptions are provided below.

S701: A session management entity receives an event subscription request for a first event, where the event subscription request for the first event includes an event identifier of the first event and data description information of the first event.

For a specific implementation of step S701, refer to step S501 in the embodiment shown in FIG. 5. Details are not described herein again.

S702: The session management entity determines that data description information of a second PCC rule is the same as the data description information of the first event. The data description information of the second PCC rule is data description information of a second event, and the second PCC rule includes indication information indicating to detect the second event (which is referred to as indication information 1 for short below).

For descriptions in which the session management entity determines that the data description information of the second PCC rule is the same as the data description information of the first event, refer to step S503 in the embodiment shown in FIG. 5. Details are not described herein again.

S703: The session management entity sends an identifier of the second PCC rule and subscription indication information of the first event to a policy control entity. Correspondingly, the policy control entity receives the identifier of the second PCC rule and the subscription indication information of the first event from the session management entity.

S704: The policy control entity updates, based on the subscription indication information of the first event, the second PCC rule corresponding to the identifier of the second PCC rule, to obtain a first PCC rule, where the first PCC rule includes the indication information indicating to detect the second event and indication information indicating to detect the first event (which is referred to as indication information 2 for short below).

S705: The policy control entity sends the first PCC rule to the session management entity. Correspondingly, the session management entity receives the first PCC rule from the policy control entity.

S706: The session management entity detects the first event and the second event based on the first PCC rule.

For a specific implementation of steps S704 to S706, refer to steps S504 to S506 in the embodiment shown in FIG. 5. Details are not described herein again.

It should be noted that, in this embodiment of this application, an example in which the policy control entity updates the second PCC rule based on the subscription indication information of the first event, to obtain the first PCC rule is used for description. Certainly, the policy control entity may formulate the first PCC rule based on the subscription indication information of the first event. In this solution, an identifier of the first PCC rule may be different from the identifier of the second PCC rule. The first PCC rule is used to replace the second PCC rule, or a priority of the first PCC rule is higher than a priority of the second PCC rule. Further, optionally, the policy control entity sends, to the session management entity, indication information indicating to delete the second PCC rule. After receiving the indication information indicating to delete the second PCC rule, the session management entity deletes the second PCC rule stored on the session management entity, and indicates a user plane function entity to delete a PDR and a FAR that are determined by the session management entity based on the second PCC rule. This is not specifically limited in this embodiment of this application.

Optionally, the event subscription method provided in this embodiment of this application further includes an unsubscription procedure. For related descriptions, refer to steps S507 to S511 or steps S512 to S515 in the embodiment shown in FIG. 5. Details are not described herein again.

According to the event subscription method provided in this embodiment of this application, after the policy control entity sends the first PCC rule to the session management entity, the session management entity can detect both the first event and the second event based on the first PCC rule. This avoids a problem that when two events with same data description information are subscribed to, a user plane function entity can obtain through matching only a PDR of one event, and consequently, the session management entity can receive only one event notification, and the session management entity can detect only one event in the conventional technology. Further, this embodiment of this application further provides unsubscription procedures of two events after the events are subscribed to.

The actions of the session management entity in steps S701 to S707 may be performed by the processor 401 in the communication apparatus 400 shown in FIG. 4 by invoking the application program code stored in the memory 403, to instruct the session management entity to perform the actions. The actions of the policy control entity in steps S701 to S707 may be performed by the processor 401 in the communication apparatus 400 shown in FIG. 4 by invoking the application program code stored in the memory 403, to instruct the policy control entity to perform the actions. This is not limited in this embodiment.

Figure 8A:
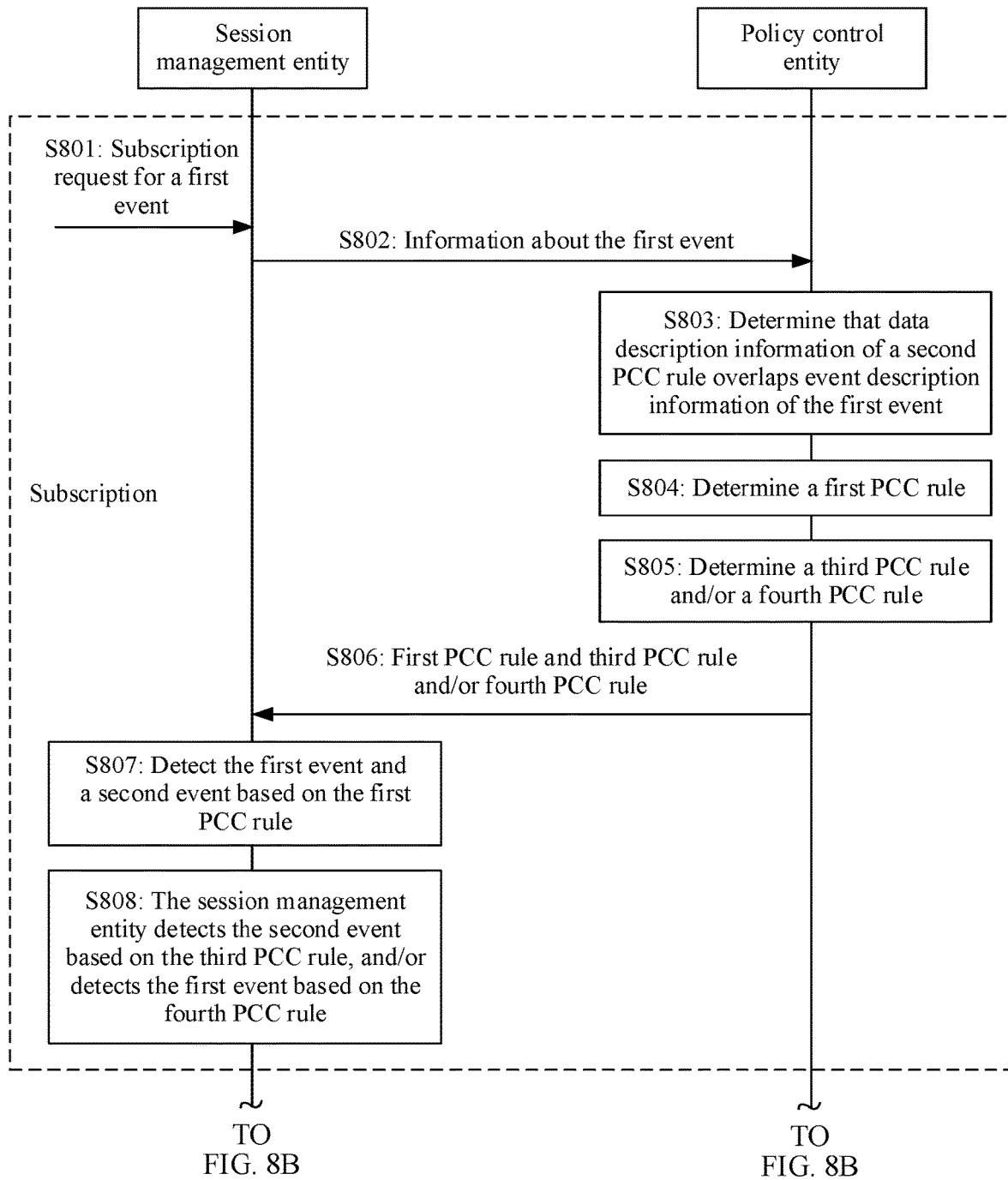
FIG. 8A and FIG. 8B are a fourth schematic flowchart of an event subscription method according to an embodiment of this application.
Figure 8B:
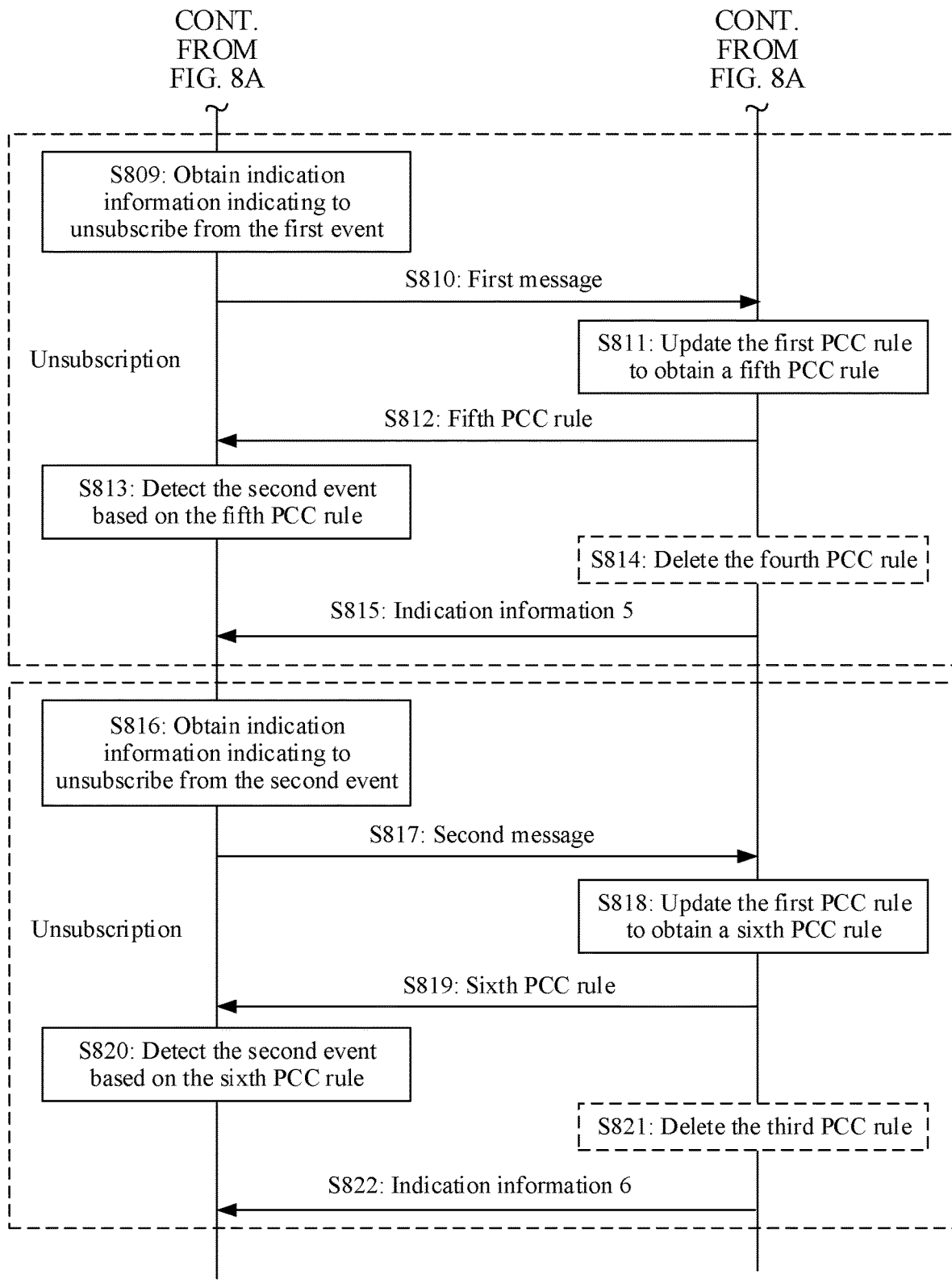

FIG. 8A and FIG. 8B show an event subscription method according to an embodiment of this application. Descriptions are provided below.

S801: A session management entity receives an event subscription request for a first event, where the event subscription request for the first event includes an event identifier of the first event and data description information of the first event.

S802: The session management entity sends information about the first event to a policy control entity. Correspondingly, the policy control entity receives the information about the first event from the session management entity.

For a specific implementation of steps S801 and S802, refer to steps S501 and S502 in the embodiment shown in FIG. 5. Details are not described herein again.

S803: The policy control entity determines that data description information of a second PCC rule overlaps event description information of the first event. The data description information of the second PCC rule is data description information of a second event, and the second PCC rule includes indication information indicating to detect the second event (which is referred to as indication information 1 for short below). For related descriptions of the data description information of the second event and the indication information 1, refer to the embodiment shown in FIG. 5. Details are not described herein again.

Figure 9A:
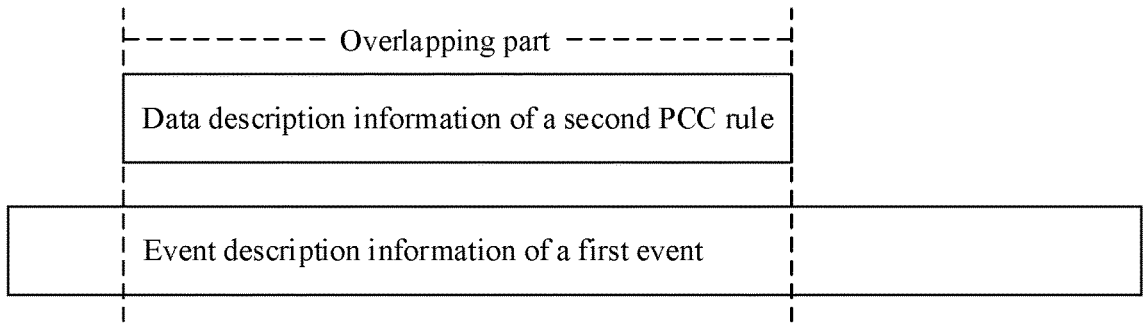
FIG. 9a is a first schematic diagram of a relationship between data description information of a second PCC rule and event description information of a first event according to an embodiment of this application.
Figure 9B:
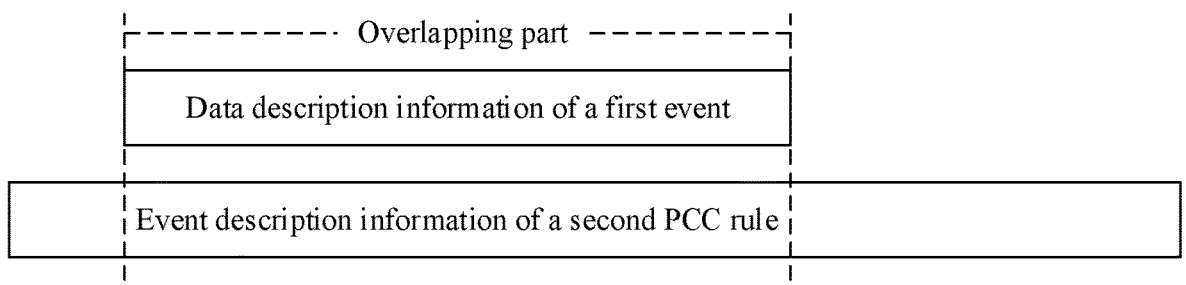
FIG. 9b is a second schematic diagram of a relationship between data description information of a second PCC rule and event description information of a first event according to an embodiment of this application.

In this embodiment of this application, that data description information of a second PCC rule overlaps event description information of the first event includes: The data description information of the second PCC rule is included in the event description information of the first event, as shown in FIG. 9a. Alternatively, the event description information of the first event is included in the data description information of the second PCC rule, as shown in FIG. 9b. Alternatively, some information in the data description information of the second PCC rule overlaps some information in the event description information of the first event, as shown in FIG. 9c.

S804: The policy control entity determines a first PCC rule based on the information about the first event and the second PCC rule.

The first PCC rule includes the indication information 1 and indication information indicating to detect the first event (which is referred to as indication information 2 for short below). Data description information of the first PCC rule is overlapping information in the data description information of the first event and the data description information of the second event (which is referred to as data description information 1 for short below). For related descriptions of the indication information 2, refer to the embodiment shown in FIG. 5. Details are not described herein again.

Figure 9C:
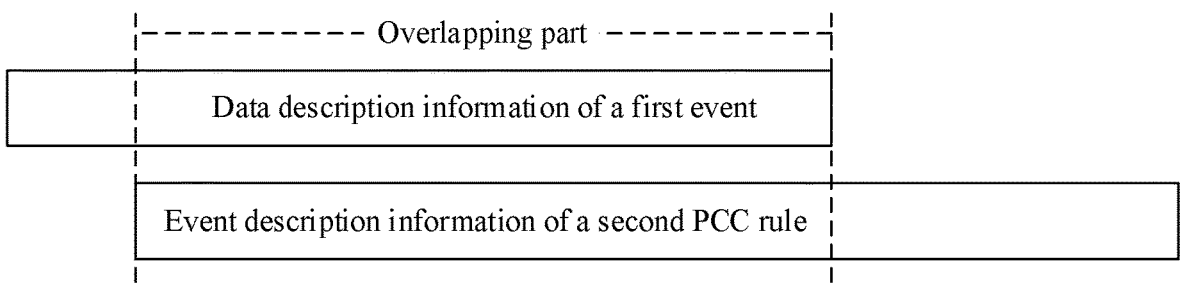
FIG. 9c is a third schematic diagram of a relationship between data description information of a second PCC rule and event description information of a first event according to an embodiment of this application.

For example, the data description information 1 may be an overlapping part in FIG. 9a, FIG. 9b, or FIG. 9c.

In a possible implementation, step S804 includes: The policy control entity updates the second PCC rule based on the information about the first event, to obtain the first PCC rule. In this solution, in this embodiment of this application, the first PCC rule may be understood as an updated second PCC rule. In other words, in this embodiment of this application, an identifier of the first PCC rule is the same as an identifier of the second PCC rule. This is uniformly described herein, and details are not described below again.

In another possible implementation, step S804 includes: The policy control entity formulates the first PCC rule based on the information about the first event and the second PCC rule. In this solution, an identifier of the first PCC rule may be different from an identifier of the second PCC rule.

S805: The policy control entity determines a third PCC rule and/or a fourth PCC rule based on the information about the first event and the second PCC rule.

The third PCC rule includes the indication information 1, and data description information of the third PCC rule is information that is in the data description information of the second event and that is other than the overlapping information in the data description information of the first event and the data description information of the second event (which is referred to as data description information 2 for short below).

The fourth PCC rule includes the indication information 2, and data description information of the fourth PCC rule is information that is in the data description information of the first event and that is other than the overlapping information in the data description information of the first event and the data description information of the second event (which is referred to as data description information 3 for short below).

For example, if a relationship between the data description information of the second PCC rule and the event description information of the first event is shown in FIG. 9a, the policy control entity determines the fourth PCC rule based on the information about the first event and the second PCC rule. Alternatively, if a relationship between the data description information of the second PCC rule and the event description information of the first event is shown in FIG. 9b, the policy control entity determines the third PCC rule based on the information about the first event and the second PCC rule. Alternatively, if a relationship between the data description information of the second PCC rule and the event description information of the first event is shown in FIG. 9c, the policy control entity determines the third PCC rule and the fourth PCC rule based on the information about the first event and the second PCC rule.

In a possible implementation, that the policy control entity determines a third PCC rule based on the information about the first event and the second PCC rule includes: The policy control entity updates the second PCC rule based on the information about the first event, to obtain the third PCC rule. In this solution, in this embodiment of this application, the third PCC rule may be understood as an updated second PCC rule. In other words, in this embodiment of this application, an identifier of the third PCC rule is the same as the identifier of the second PCC rule. This is uniformly described herein, and details are not described below again.

In another possible implementation, that the policy control entity determines a third PCC rule based on the information about the first event and the second PCC rule includes: The policy control entity formulates the third PCC rule based on the information about the first event and the second PCC rule. In this solution, an identifier of the third PCC rule may be different from the identifier of the second PCC rule.

In a possible implementation, that the policy control entity determines a fourth PCC rule based on the information about the first event and the second PCC rule includes: The policy control entity updates the second PCC rule based on the information about the first event, to obtain the fourth PCC rule. In this solution, in this embodiment of this application, the fourth PCC rule may be understood as an updated second PCC rule. In other words, in this embodiment of this application, an identifier of the fourth PCC rule is the same as the identifier of the second PCC rule. This is uniformly described herein, and details are not described below again.

In another possible implementation, that the policy control entity determines a fourth PCC rule based on the information about the first event and the second PCC rule includes: The policy control entity formulates the fourth PCC rule based on the information about the first event and the second PCC rule. In this solution, an identifier of the fourth PCC rule may be different from the identifier of the second PCC rule.

It should be noted that, in this embodiment of this application, if the first PCC rule and the third PCC rule and/or the fourth PCC rule are not obtained by updating the second PCC rule, the first PCC rule and the third PCC rule and/or the fourth PCC rule are used to replace the second PCC rule, or priorities of the first PCC rule and the third PCC rule and/or the fourth PCC rule are higher than a priority of the second PCC rule. Further, optionally, the policy control entity sends, to the session management entity, indication information indicating to delete the second PCC rule. After receiving the indication information indicating to delete the second PCC rule, the session management entity deletes the second PCC rule stored on the session management entity, and indicates a user plane function entity to delete a PDR and a FAR that are determined by the session management entity based on the second PCC rule. This is not specifically limited in this embodiment of this application.

S806: The policy control entity sends the first PCC rule to the session management entity, and the policy control entity sends the third PCC rule and/or the fourth PCC rule to the session management entity. Correspondingly, the session management entity receives the first PCC rule from the policy control entity, and the session management entity receives the third PCC rule and/or the fourth PCC rule from the policy control entity.

S807: The session management entity detects the first event and the second event based on the first PCC rule.

For a specific implementation of step S807, refer to step S506 in the embodiment shown in FIG. 5. Details are not described herein again.

S808: The session management entity detects the second event based on the third PCC rule, and/or the session management entity detects the first event based on the fourth PCC rule.

In an embodiment, the session management entity detects a single event based on a PCC rule, refer to the conventional technology. Details are not described herein.

Optionally, as shown in FIG. 8A and FIG. 8B, the event subscription method provided in this embodiment of this application further includes an unsubscription procedure. Descriptions are provided below.

In a possible implementation, unsubscription from the first event is used as an example, and the following steps are included.

S809: The session management entity receives an unsubscription request for the first event.

In this embodiment of this application, the unsubscription request for the first event includes an unsubscription indication and an event subscription correlation identifier of the first event.

S810: The session management entity sends a first message to the policy control entity. Correspondingly, the policy control entity receives the first message from the session management entity.

The first message includes the identifier of the first PCC rule and the unsubscription indication information of the first event (which is referred to as indication information 3 for short below). For related descriptions of the unsubscription indication information of the first event, refer to step S508 in the embodiment shown in FIG. 5. Details are not described herein again.

Optionally, if the relationship between the data description information of the second PCC rule and the event description information of the first event is shown in FIG. 9a, the first message further includes the identifier of the fourth PCC rule.

In this embodiment of this application, the session management entity determines the identifier of the first PCC rule and optionally determines the identifier of the fourth PCC rule based on the event subscription correlation identifier of the first event. This is uniformly described herein, and details are not described below again.

S811: The policy control entity updates the first PCC rule based on the identifier of the first PCC rule and the indication information 3, to obtain a fifth PCC rule.

S812: The policy control entity sends the fifth PCC rule to the session management entity. Correspondingly, the session management entity receives the fifth PCC rule from the policy control entity.

S813: The session management entity detects the second event based on the fifth PCC rule.

For a specific implementation of steps S811 to S813, refer to steps S509 to S511 in the embodiment shown in FIG. 5. Details are not described herein again.

Optionally, if the first message further includes the identifier of the fourth PCC rule, the unsubscription from the first event further includes the following steps:

S814: The policy control entity deletes the fourth PCC rule based on the identifier of the fourth PCC rule and the indication information 3.

S815: The policy control entity sends, to the session management entity, indication information indicating to delete the fourth PCC rule (which is referred to as indication information 5 for short below). Correspondingly, the session management entity receives the indication information 5 from the policy control entity.

After receiving the indication information 5 from the policy control entity, the session management entity may delete, based on the indication information 5, the fourth PCC rule stored on the session management entity, and indicate the user plane function entity to delete a PDR and a FAR that are determined by the session management entity based on the fourth PCC rule. This is not specifically limited in this embodiment of this application.

In another possible implementation, unsubscription from the second event is used as an example, and the following steps are included.

S816: The session management entity obtains and receives an unsubscription request for the second event.

In this embodiment of this application, the unsubscription request for the second event includes an unsubscription indication and an event subscription correlation identifier of the second event.

S817: The session management entity sends a second message to the policy control entity. Correspondingly, the policy control entity receives the second message from the session management entity.

The second message includes the identifier of the first PCC rule and the unsubscription indication information of the second event (which is referred to as indication information 4 for short below). For related descriptions of the unsubscription indication information of the second event, refer to step S513 in the embodiment shown in FIG. 5. Details are not described herein again.

Optionally, if the relationship between the data description information of the second PCC rule and the event description information of the first event is shown in FIG. 9b, the second message further includes the identifier of the third PCC rule.

In this embodiment of this application, the session management entity determines the identifier of the first PCC rule and optionally determines the identifier of the third PCC rule based on the event subscription correlation identifier of the second event. This is uniformly described herein, and details are not described below again.

S818: The policy control entity updates the first PCC rule based on the identifier of the first PCC rule and the indication information 4, to obtain a sixth PCC rule.

S819: The policy control entity sends the sixth PCC rule to the session management entity. Correspondingly, the session management entity receives the sixth PCC rule from the policy control entity.

S820: The session management entity detects the first event based on the sixth PCC rule.

For a specific implementation of steps S818 to S820, refer to steps S514 to S516 in the embodiment shown in FIG. 5. Details are not described herein again.

Optionally, if the second message further includes the identifier of the third PCC rule, the unsubscription from the second event further includes the following steps:

S821: The policy control entity deletes the third PCC rule based on the identifier of the third PCC rule and the indication information 4.

S822: The policy control entity sends, to the session management entity, indication information indicating to delete the third PCC rule (which is referred to as indication information 6 for short below). Correspondingly, the session management entity receives the indication information 6 from the policy control entity.

After receiving the indication information 6 from the policy control entity, the session management entity may delete, based on the indication information 6, the third PCC rule stored on the session management entity, and indicate the user plane function entity to delete a PDR and a FAR that are determined by the session management entity based on the third PCC rule. This is not specifically limited in this embodiment of this application.

According to the event subscription method provided in this embodiment of this application, after the policy control entity sends the first PCC rule to the session management entity, the session management entity can detect both the first event and the second event based on the first PCC rule. This avoids a problem that when two events with overlapping data description information are subscribed to, a user plane function entity may obtain through matching only a PDR of one event, and consequently, the session management entity can receive only one event notification, and the session management entity can detect only one event in the conventional technology. Further, this embodiment of this application further provides unsubscription procedures of two events after the events are subscribed to.

The actions of the session management entity in steps S801 to S822 may be performed by the processor 401 in the communication apparatus 400 shown in FIG. 4 by invoking the application program code stored in the memory 403, to instruct the session management entity to perform the actions. The actions of the policy control entity in steps S801 to S822 may be performed by the processor 401 in the communication apparatus 400 shown in FIG. 4 by invoking the application program code stored in the memory 403, to instruct the policy control entity to perform the actions. This is not limited in this embodiment.

Figure 10:
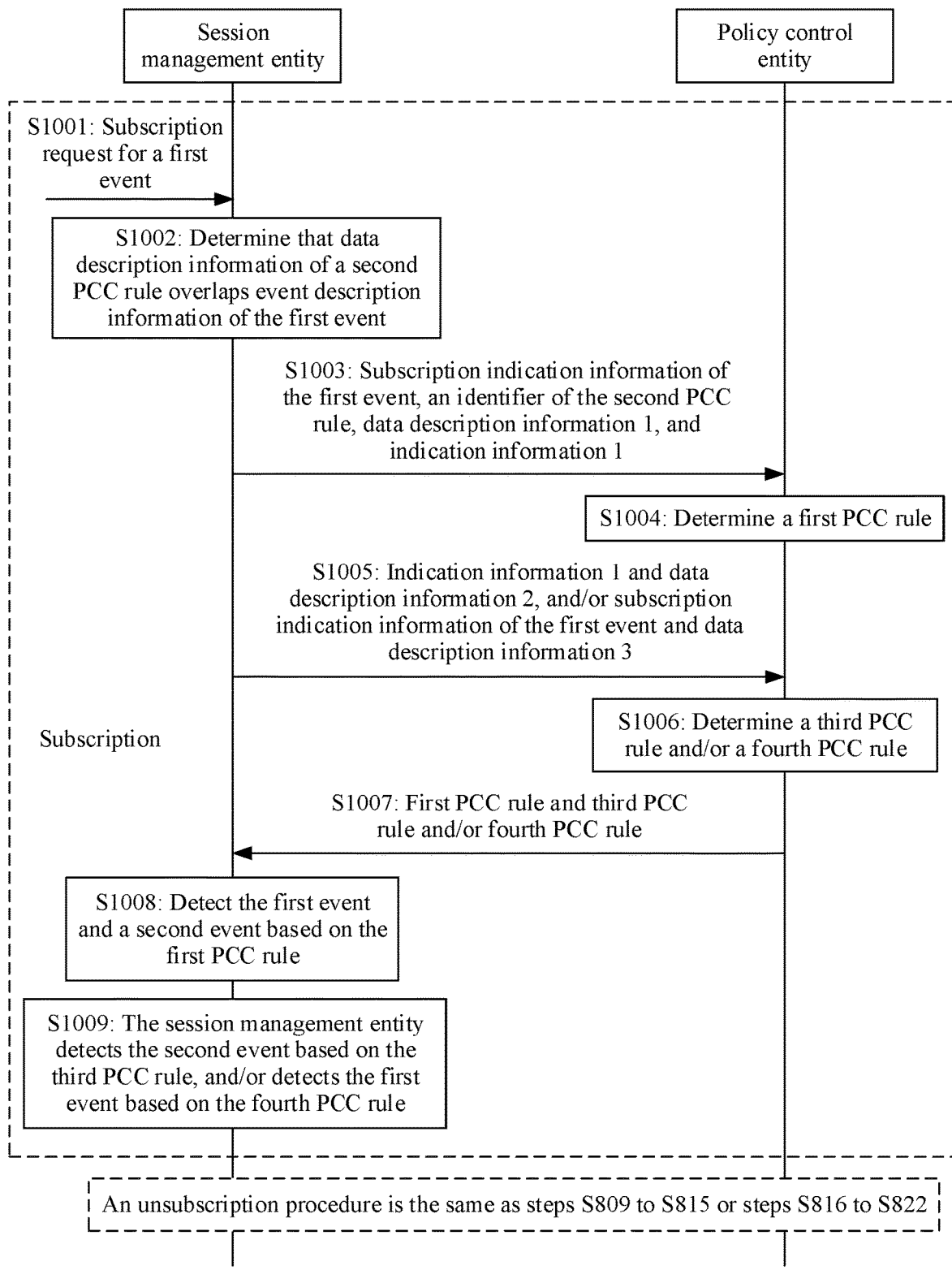
FIG. 10 is a fifth schematic flowchart of an event subscription method according to an embodiment of this application.

FIG. 10 shows an event subscription method according to an embodiment of this application. Descriptions are provided below.

S1001: A session management entity receives an event subscription request for a first event, to obtain information about the first event, where the event subscription request for the first event includes an event identifier of the first event and data description information of the first event.

For a specific implementation of step S1001, refer to step S501 in the embodiment shown in FIG. 5. Details are not described herein again.

S1002: The session management entity determines that data description information of a second PCC rule overlaps the data description information of the first event. The data description information of the second PCC rule is data description information of a second event, and the second PCC rule includes indication information indicating to detect the second event (which is referred to as indication information 1 for short below).

For descriptions in which the session management entity determines that the data description information of the second PCC rule overlaps the data description information of the first event, refer to step S803 in the embodiment shown in FIG. 8A and FIG. 8B. Details are not described herein again.

S1003: The session management entity sends subscription indication information of the first event, an identifier of the second PCC rule, overlapping information in the data description information of the first event and the data description information of the second event (which is referred to as data description information 1 for short below), and the indication information 1 to a policy control entity. Correspondingly, the policy control entity receives the subscription indication information of the first event, the identifier of the second PCC rule, the data description information 1, and the indication information 1 from the session management entity.

For example, the data description information 1 may be an overlapping part in FIG. 9a, FIG. 9b, or FIG. 9c.

S1004: The policy control entity determines a first PCC rule based on the subscription indication information of the first event, the identifier of the second PCC rule, the data description information 1, and the indication information 1.

The first PCC rule includes the indication information 1 and indication information indicating to detect the first event (which is referred to as indication information 2 for short below), and data description information of the first PCC rule is the data description information 1. For related descriptions of the indication information 2, refer to the embodiment shown in FIG. 5. Details are not described herein again.

In a possible implementation, step S1004 includes: The policy control entity updates the second PCC rule based on the subscription indication information of the first event and the data description information 1, to obtain the first PCC rule. In this solution, in this embodiment of this application, the first PCC rule may be understood as an updated second PCC rule. In other words, in this embodiment of this application, an identifier of the first PCC rule is the same as the identifier of the second PCC rule. This is uniformly described herein, and details are not described below again.

In another possible implementation, step S1004 includes: The policy control entity formulates the first PCC rule based on the subscription indication information of the first event, the data description information 1, and the indication information 1. In this solution, an identifier of the first PCC rule may be different from the identifier of the second PCC rule. The first PCC rule is used to replace the second PCC rule.

S1005: The session management entity sends, to the policy control entity, the indication information 1 and information that is in the data description information of the second event and that is other than the overlapping information in the data description information of the first event and the data description information of the second event (which is referred to as data description information 2 for short below), and/or the session management entity sends the subscription indication information of the first event and information that is in the data description information of the first event and that is other than the overlapping information in the data description information of the first event and the data description information of the second event to the policy control entity (which is referred to as data description information 3 for short below). Correspondingly, the policy control entity receives the indication information 1 and the data description information 2 from the session management entity, and/or the policy control entity receives the subscription indication information of the first event and the data description information 3 from the session management entity.

For example, if a relationship between the data description information of the second PCC rule and event description information of the first event is shown in FIG. 9a, the policy control entity sends the subscription indication information of the first event and the data description information 3 to the policy control entity. Alternatively, if a relationship between the data description information of the second PCC rule and event description information of the first event is shown in FIG. 9b, the policy control entity sends the indication information 1 and the data description information 2 to the policy control entity. Alternatively, if a relationship between the data description information of the second PCC rule and event description information of the first event is shown in FIG. 9c, the policy control entity sends the indication information 1 and the data description information 2 to the policy control entity, and the policy control entity sends the subscription indication information of the first event and the data description information 3 to the policy control entity.

S1006: The policy control entity determines a third PCC rule based on the indication information 1 and the data description information 2, and/or the policy control entity determines a fourth PCC rule based on the subscription indication information of the first event and the data description information 3.

The third PCC rule includes the indication information 1, and data description information of the third PCC rule is the data description information 2. The fourth PCC rule includes the indication information 2, and data description information of the fourth PCC rule is the data description information 3. For related descriptions of the indication information 2, refer to the embodiment shown in FIG. 5. Details are not described herein again.

In a possible implementation, that the policy control entity determines a third PCC rule based on the indication information 1 and the data description information 2 includes: The policy control entity updates the second PCC rule based on the indication information 1 and the data description information 2, to obtain the third PCC rule. In this solution, in this embodiment of this application, the third PCC rule may be understood as an updated second PCC rule. In other words, in this embodiment of this application, an identifier of the third PCC rule is the same as the identifier of the second PCC rule. This is uniformly described herein, and details are not described below again.

In another possible implementation, that the policy control entity determines a third PCC rule based on the indication information 1 and the data description information 2 includes: The policy control entity formulates the third PCC rule based on the indication information 1 and the data description information 2. In this solution, an identifier of the third PCC rule may be different from the identifier of the second PCC rule. The first PCC rule is used to replace the second PCC rule.

In a possible implementation, that the policy control entity determines a fourth PCC rule based on the subscription indication information of the first event and the data description information 3 includes: The policy control entity updates the second PCC rule based on the subscription indication information of the first event and the data description information 3, to obtain the fourth PCC rule. In this solution, in this embodiment of this application, the fourth PCC rule may be understood as an updated second PCC rule. In other words, in this embodiment of this application, an identifier of the fourth PCC rule is the same as the identifier of the second PCC rule. This is uniformly described herein, and details are not described below again.

In another possible implementation, that the policy control entity determines a fourth PCC rule based on the subscription indication information of the first event and the data description information 3 includes: The policy control entity formulates the fourth PCC rule based on the subscription indication information of the first event and the data description information 3. In this solution, an identifier of the fourth PCC rule may be different from the identifier of the second PCC rule. The first PCC rule is used to replace the second PCC rule.

It should be noted that, in this embodiment of this application, if the first PCC rule and the third PCC rule and/or the fourth PCC rule are not obtained by updating the second PCC rule, the first PCC rule and the third PCC rule and/or the fourth PCC rule are used to replace the second PCC rule, or priorities of the first PCC rule and the third PCC rule and/or the fourth PCC rule are higher than a priority of the second PCC rule. Further, optionally, the policy control entity sends, to the session management entity, indication information indicating to delete the second PCC rule. After receiving the indication information indicating to delete the second PCC rule, the session management entity deletes the second PCC rule stored on the session management entity, and indicates a user plane function entity to delete a PDR and a FAR that are determined by the session management entity based on the second PCC rule. This is not specifically limited in this embodiment of this application.

S1007: The policy control entity sends the first PCC rule to the session management entity, and the policy control entity sends the third PCC rule and/or the fourth PCC rule to the session management entity. Correspondingly, the session management entity receives the first PCC rule from the policy control entity, and the session management entity receives the third PCC rule and/or the fourth PCC rule from the policy control entity.

S1008: The session management entity detects the first event and the second event based on the first PCC rule.

S1009: The session management entity detects the second event based on the third PCC rule, and/or the session management entity detects the first event based on the fourth PCC rule.

For a specific implementation of step S1007 to S1009, refer to step S806 to S809 in the embodiment shown in FIG. 8A and FIG. 8B. Details are not described herein again.

Optionally, the event subscription method provided in this embodiment of this application further includes an unsubscription procedure. For related descriptions, refer to steps S809 to S815 or steps S816 to S822 in the embodiment shown in FIG. 8A and FIG. 8B. Details are not described herein again.

According to the event subscription method provided in this embodiment of this application, after the policy control entity sends the first PCC rule to the session management entity, the session management entity can detect both the first event and the second event based on the first PCC rule. This avoids a problem that when two events with same data description information are subscribed to, a user plane function entity can obtain through matching only a PDR of one event, and consequently, the session management entity can receive only one event notification, and the session management entity can detect only one event in the conventional technology. Further, this embodiment of this application further provides unsubscription procedures of two events after the events are subscribed to.

The actions of the session management entity in steps S1001 to S1009 may be performed by the processor 401 in the communication apparatus 400 shown in FIG. 4 by invoking the application program code stored in the memory 403, to instruct the session management entity to perform the actions. The actions of the policy control entity in steps S1001 to S1009 may be performed by the processor 401 in the communication apparatus 400 shown in FIG. 4 by invoking the application program code stored in the memory 403, to instruct the policy control entity to perform the actions. This is not limited in this embodiment.

Optionally, in an alternative solution of the embodiments shown in FIG. 5 to FIG. 9, in this embodiment of this application, a specific event may alternatively be correlated by using a subscription identifier of the event. For example, the embodiment shown in FIG. 8A and FIG. 8B is used as an example. The information about the first event further includes a subscription identifier of the first event. That the policy control entity sends the first PCC rule to the session management entity includes: The policy control entity sends, to the session management entity, the first PCC rule, a subscription identifier of the second event corresponding to the first PCC rule, and the subscription identifier of the first event. That the policy control entity sends the third PCC rule and/or the fourth PCC rule to the session management entity includes: The policy control entity sends, to the session management entity, the third PCC rule and the subscription identifier of the second event corresponding to the third PCC rule, and/or the policy control entity sends, to the session management entity, the fourth PCC rule and the subscription identifier of the first event corresponding to the fourth PCC rule.

Further, based on the foregoing solution, the event subscription method provided in this embodiment of this application further includes an unsubscription procedure. Descriptions are provided below.

Unsubscription from the first event is used as an example. After receiving an unsubscription request for the first event, the session management entity sends the subscription identifier of the first event and unsubscription indication information of the first event (which is referred to as indication information 3 for short below) to the policy control entity. Correspondingly, after receiving the subscription identifier of the first event and the indication information 3 from the session management entity, and updating the first PCC rule based on the subscription identifier of the first event and the indication information 3, to obtain a fifth PCC rule, the policy control entity sends the fifth PCC rule to the session management entity. The fifth PCC rule is obtained by deleting the indication information 1 from the first PCC rule. The session management entity receives the fifth PCC rule from the policy control entity, and detects the second event based on the fifth PCC rule. Optionally, if the relationship between the data description information of the second PCC rule and the event description information of the first event is shown in FIG. 9a, the unsubscription from the first event further includes: The policy control entity deletes the fourth PCC rule based on the subscription identifier of the first event and the indication information 3, and sends, to the session management entity, indication information indicating to delete the fourth PCC rule (which is referred to as indication information 5 for short below). Correspondingly, the session management entity receives the indication information 5 from the policy control entity, deletes, based on the indication information 5, the fourth PCC rule stored on the session management entity, and indicates the user plane function entity to delete a PDR and a FAR that are determined by the session management entity based on the fourth PCC rule.

Unsubscription from the second event is used as an example. After receiving an unsubscription request for the second event, the session management entity sends the subscription identifier of the second event and unsubscription indication information of the second event (which is referred to as indication information 4 for short below) to the policy control entity. Correspondingly, after receiving the subscription identifier of the second event and the indication information 4 from the session management entity, and updating the first PCC rule based on the subscription identifier of the second event and the indication information 4, to obtain a sixth PCC rule, the policy control entity sends the sixth PCC rule to the session management entity. The sixth PCC rule is obtained by deleting the indication information 2 from the first PCC rule. The session management entity receives the sixth PCC rule from the policy control entity, and detects the first event based on the sixth PCC rule. Optionally, if the relationship between the data description information of the second PCC rule and the event description information of the first event is shown in FIG. 9b, the unsubscription from the first event further includes: The policy control entity deletes the third PCC rule based on the subscription identifier of the second event and the indication information 4, and sends, to the session management entity, indication information indicating to delete the third PCC rule (which is referred to as indication information 6 for short below). Correspondingly, the session management entity receives the indication information 6 from the policy control entity, deletes, based on the indication information 6, the third PCC rule stored on the session management entity, and indicates the user plane function entity to delete a PDR and a FAR that are determined by the session management entity based on the third PCC rule.

The following uses an example in which the communication system in FIG. 1 is applied to the 5G network shown in FIG. 2 or FIG. 3 to describe the event subscription methods in FIG. 5 to FIG. 10.

It should be noted that names of messages between network elements, names of parameters in the messages, or the like in the following embodiments of this application are merely examples, and there may be other names in a specific implementation. This is not specifically limited in embodiments of this application.

Figure 11A:
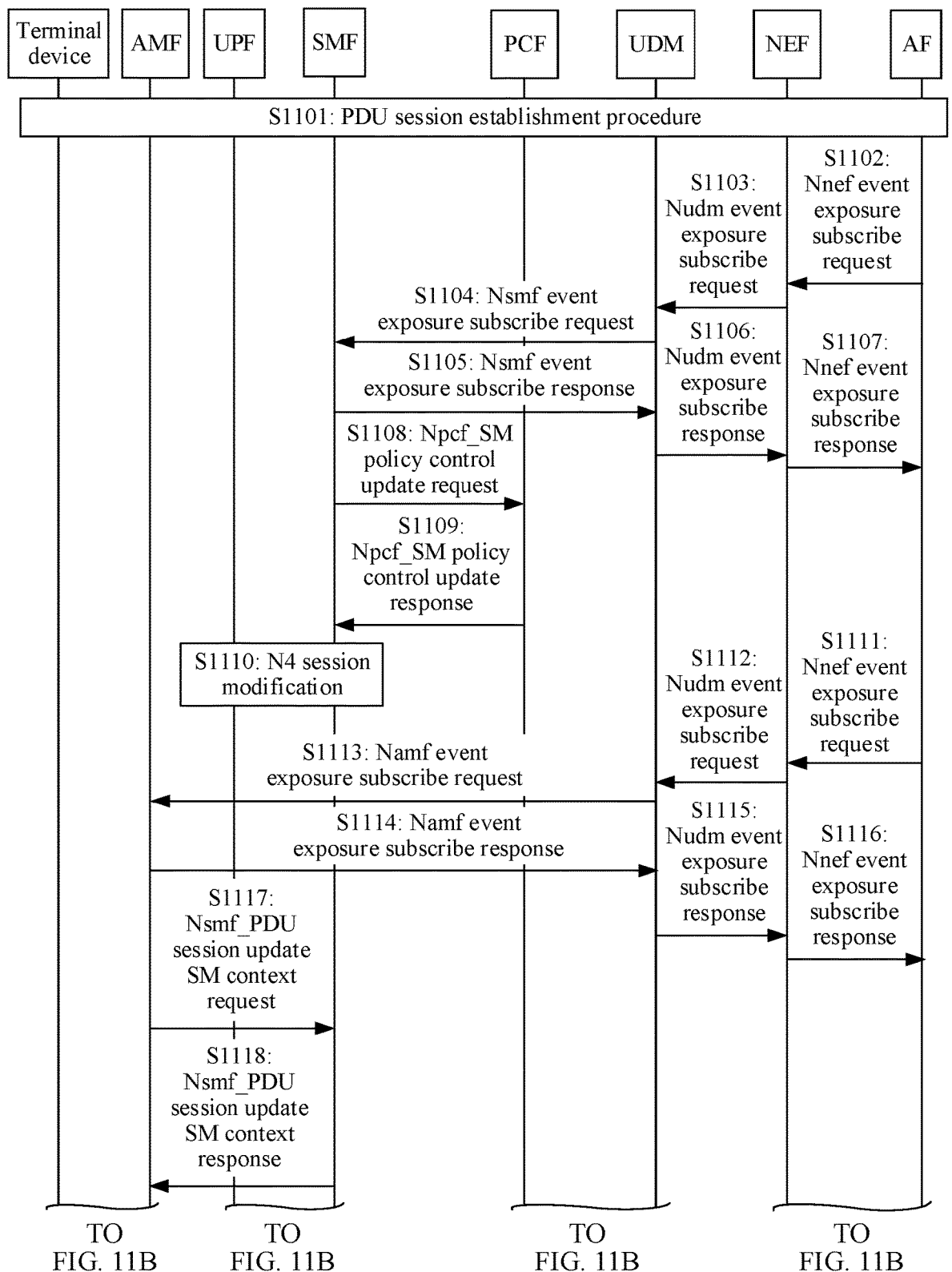
FIG. 11A and FIG. 11B are a first schematic flowchart of application of an event subscription method in a 5G network according to an embodiment of this application.
Figure 11B:
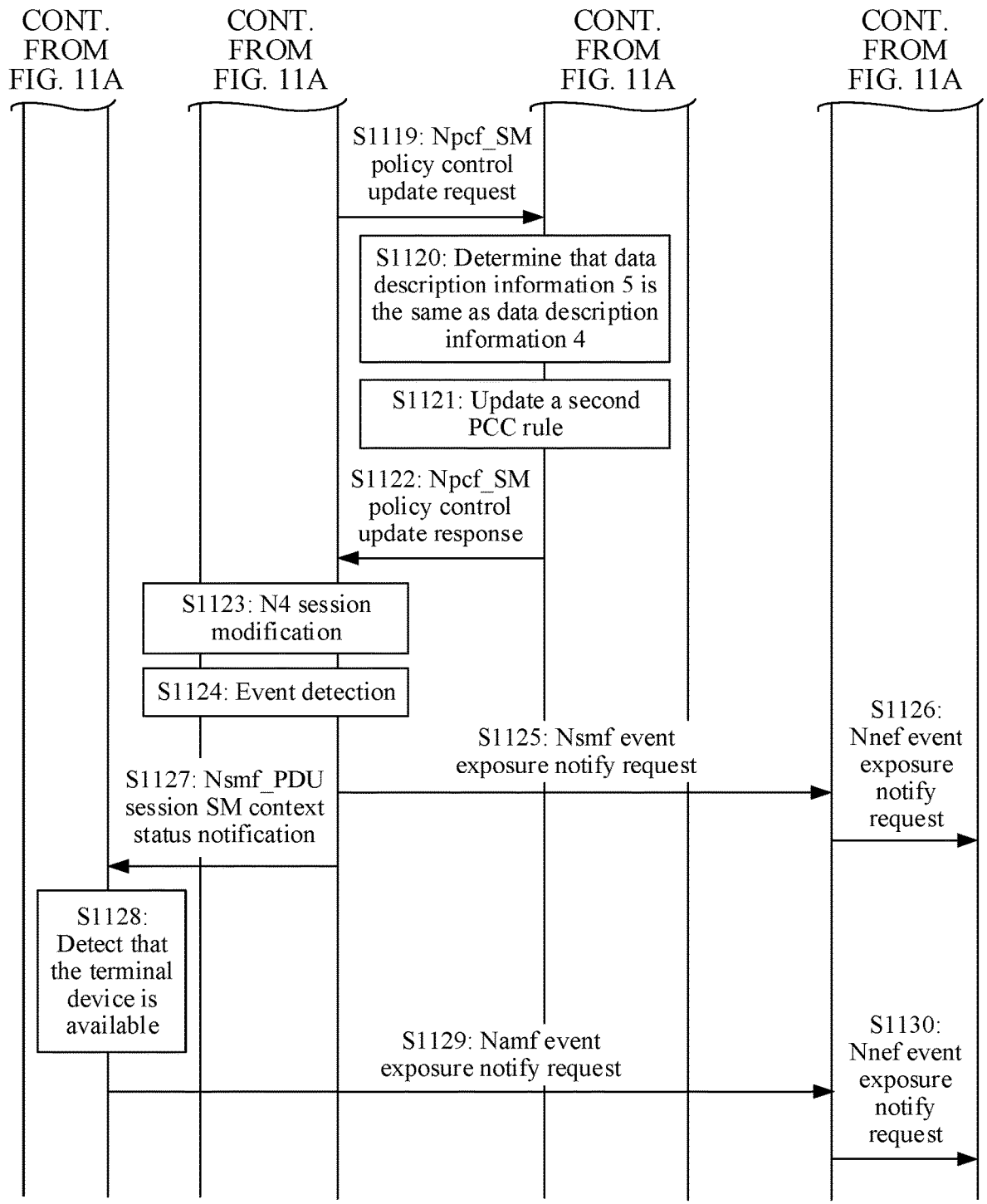

With reference to the event subscription method shown in FIG. 5, an example in which the communication system shown in FIG. 1 is applied to the 5G network shown in FIG. 2 or FIG. 3, the first event is a downlink data notification failure (DDN failure) event, and the second event is a downlink data delivery status (DDD status) event (to be specific, the DDD status event and the DDN failure event are subscribed to in sequence) is used. FIG. 11A and FIG. 11B show an event subscription method according to an embodiment of this application. Descriptions are provided below.

S1101: A terminal device accesses a network, and establishes a protocol data unit (PDU) session.

S1102: The AF sends an Nnef event exposure subscribe request message to an NEF.

Correspondingly, the NEF receives the Nnef_Event Exposure_Subscribe Request message from the AF. The Nnef_Event Exposure_Subscribe Request message is used to subscribe to a DDD status change.

The Nnef_Event Exposure_Subscribe Request message includes an event identifier (Event Id (DDD status)), an AF notification endpoint 1 used by the AF to receive an event notification, an external user identifier or an external user group identifier, data description information 4 (Traffic Descriptors 4), and a delivery status (including buffered, discarded, and/or transmitted) of subscription. The traffic descriptors 4 are used to identify a source address of downlink data, for example, are 3-tuple information for IP data. The AF notification endpoint 1 is an AF notification target address 1, or the AF notification endpoint 1 is an AF notification target address 1 and an AF notification correlation identifier 1 (AF Notification Correlation Id 1). When the AF allocates a same notification target address to a plurality of event notifications, AF notification correlation Ids may be used for distinguishing.

S1103: The NEF sends an Nudm event exposure subscribe requestmessage to a UDM. Correspondingly, the UDM receives the Nudm_Event Exposure_Subscribe Request message from the NEF. The Nudm_Event Exposure_Subscribe Request message is used to subscribe to a DDD status.

The Nudm_Event Exposure_Subscribe Request message includes an event identifier (Event Id (DDD status)), an NEF notification endpoint 1 used by the NEF to receive an event notification, an external user identifier or an external user group identifier, data description information 4 (Traffic Descriptors 4), and a delivery status (including buffered, discarded, and/or transmitted) of a subscription. The NEF notification endpoint 1 is an NEF notification target address 1, or the NEF notification endpoint 1 includes an NEF notification target address 1 and an NEF notification correlation identifier 1. When the NEF allocates a same notification target address to a plurality of event notifications, NEF notification correlation Ids may be used for distinguishing.

S1104: The UDM sends an Nsmf event exposure subscribe request message to an SMF with which the terminal device registers. Correspondingly, the SMF receives the Nsmf_Event Exposure_Subscribe Request message from the UDM. The Nsmf_Event Exposure_Subscribe Request message is used to subscribe to a DDD status.

The Nsmf_Event Exposure_Subscribe Request message includes an event identifier (Event Id (DDD status)), an internal user identifier or an internal user group identifier, traffic descriptors 4, and a delivery status (including buffered, discarded, and/or transmitted) of a subscription. The internal user identifier or the internal user group identifier is determined based on the external user identifier or the external user group identifier received in step S1103.

S1105: The SMF sends an Nsmf event exposure subscribe responsemessage to the UDM. Correspondingly, the UDM receives the Nsmf_Event Exposure_Subscribe Response message from the SMF.

The Nsmf_Event Exposure_Subscribe Response message includes an SMF subscription correlation identifier 1 (SMF Subscription Correlation Id 1) allocated by the SMF.

S1106: The UDM sends an Nudm event exposure subscribe response message to the NEF. Correspondingly, the UDM receives the Nudm_Event Exposure_Subscribe Response message from the SMF.

The Nudm_Event Exposure_Subscribe Response message includes a UDM subscription correlation identifier 1 allocated by the UDM.

S1107: The NEF sends an Nnef event exposure subscribe response message to the AF. Correspondingly, the AF receives the Nnef_Event Exposure_Subscribe Response message from the NEF.

The Nnef_Event Exposure_Subscribe Response message includes an NEF subscription correlation identifier 1 (NEF Subscription Correlation Id 1) allocated by the NEF.

S1108: When PCC is deployed, and a PCF provides a policy control request trigger with a value of DDN_DELIVERY_STATUS (which may also be represented as DDD_STATUS) to the SMF in a previous PDU session establishment procedure, the SMF sends an Npcf session management (SM) policy control update (Npcf_SMPolicyControl_Update) request message to the PCF. Correspondingly, the PCF receives the Npcf_SMPolicyControl_Update request message from the SMF.

The Npcf_SMPolicyControl_Update request message includes traffic descriptors 4, the policy control request trigger with the value of DDN_DELIVERY_STATUS, and a notification request type (including buffered, discarded, and/or transmitted). Optionally, the Npcf_SMPolicy Control_Update request message further includes a subscription identifier 1, and the subscription identifier 1 is used to identify that the request message is correlated with subscription to a DDD status event.

It should be noted that, in this embodiment of this application, the policy control request trigger with the value of DDN_DELIVERY_STATUS may also be referred to as subscription indication information of the DDD status event. This is uniformly described herein, and details are not described below again.

S1109: The PCF formulates a second PCC rule based on the traffic descriptors 4, and sends an Npcf_SMPolicyControl_Update response message to the SMF. Correspondingly, the SMF receives the Npcf_SMPolicyControl_Update response message from the PCF.

The Npcf_SMPolicyControl_Update response message includes the second PCC rule. The second PCC rule includes a filter template (where the template includes the traffic descriptors 4), downlink data delivery status control indication information (which is set based on the policy control request trigger with the value of DDN_DELIVERY_STATUS), the notification request type (including buffered, discarded and/or transmitted), and a high priority.

It should be noted that the downlink data delivery status control indication information in this embodiment of this application may correspond to the indication information 1 in the embodiment shown in FIG. 5. This is uniformly described herein, and details are not described below again.

Optionally, in embodiment this of this application, if the Npcf_SMPolicyControl_Update request message includes the subscription identifier 1, the Npcf_SMPolicyControl_Update response message further includes the subscription identifier 1. Further, the SMF may determine, based on the subscription identifier 1, that the second PCC rule is correlated with the subscription to the DDD status event. If the Npcf_SMPolicyControl_Update request message does not include the subscription identifier 1, the SMF determines, based on a request-acknowledgment message, a subscription correlation between the second PCC rule and the DDD status event. This is not specifically limited in this embodiment of this application.

S1110: Perform an N4 session modification procedure.

As an example, the SMF installs and executes the second PCC rule. When the notification request type included in the second PCC rule is buffered, and the SMF perceives that the terminal device is in an idle mode, the SMF formulates a PDR 1 and a correlated FAR 1 based on a PCC rule 1. The PDR 1 includes the filter template and the priority in the second PCC rule. An indication bit indicating a UPF to buffer data and a flag indicating the UPF to notify the SMF after the UPF buffers the first data packet that matches the PDR 1 are set in the FAR 1. Alternatively, when the notification request type included in the second PCC rule is discarded, after the SMF receives a notification, from the AMF, that the terminal device is unavailable, the SMF formulates a PDR 1 and a correlated FAR 1 based on the second PCC rule. The PDR 1 includes a filter template and a priority in a PCC rule 1, and a flag indicating a UPF to notify the SMF after the UPF discards the first data packet that matches the PDR 1 is set in the FAR 1.

S1111: The AF sends an Nnef_Event Exposure_Subscribe Request message to the NEF. Correspondingly, the NEF receives the Nnef_Event Exposure_Subscribe Request message from the AF. The Nnef_Event Exposure_Subscribe Request message is used to subscribe to availability after DDN failure.

The Nnef_Event Exposure_Subscribe Request message includes an event Id (availability after DDN Failure), an AF notification endpoint 2 used by the AF to receive an event notification, an external user identifier or an external user group identifier, and data description information 5 (Traffic Descriptors 5). Filters included in the traffic descriptors 5 and the traffic descriptors 4 are completely the same. The AF notification endpoint 2 is an AF notification target address 2, or the AF notification endpoint 2 is an AF notification target address 2 and an AF notification correlation identifier 2. When the AF allocates a same notification target address to a plurality of event notifications, AF notification correlation Ids may be used for distinguishing.

S1112: The NEF sends an Nudm_Event Exposure_Subscribe Request message to the UDM. Correspondingly, the UDM receives the Nudm_Event Exposure_Subscribe Request message from the NEF. The Nudm_Event Exposure_Subscribe Request message is used to subscribe to availability after DDN failure.

The Nudm_Event Exposure_Subscribe Request message includes an event identifier (Event Id (availability after DDN Failure)), an NEF notification endpoint 2 used by the NEF to receive an event notification, an external user identifier or an external user group identifier, and data description information 5 (Traffic Descriptors 5). The NEF notification endpoint 2 is an NEF notification target address 2, or the NEF notification endpoint 2 includes an NEF notification target address 2 and an NEF notification correlation identifier 2. When the NEF allocates a same notification target address to a plurality of event notifications, NEF notification correlation Ids may be used for distinguishing.

S1113: The UDM sends an Namf event exposure subscribe request message to the AMF with which the terminal device registers. Correspondingly, the AMF receives the Namf_Event Exposure_Subscribe Request message from the UDM. The Namf_Event Exposure_Subscribe Request message is used to subscribe to availability after DDN failure.

The Namf_Event Exposure_Subscribe Request message includes an event identifier (Event Id (availability after DDN Failure)), an NEF notification endpoint 2, an internal user identifier or an internal user group identifier, and traffic descriptors 5. The internal user identifier or the internal user group identifier is determined based on the external user identifier or the external user group identifier received in step S1113.

It should be noted that, in the embodiment of this application, if the Nudm_Event Exposure_Subscribe Request message in step S1112 includes the external user group identifier, the UDM needs to send, for each terminal device in a user group, the foregoing message to an AMF with which the terminal device registers. This is uniformly described herein, and details are not described below again.

S1114: The AMF sends an Namf event exposure subscribe response message to the UDM. Correspondingly, the UDM receives the Namf_Event Exposure_Subscribe Response message from the AMF.

The Namf_Event Exposure_Subscribe Response message includes an AMF subscription correlation identifier 2 (AMF Subscription Correlation Id 2) allocated by the AMF.

S1115: The UDM sends an Nudm event exposure subscribe response message to the NEF. Correspondingly, the UDM receives the Nudm_Event Exposure_Subscribe Response message from the SMF.

The Nudm_Event Exposure_Subscribe Response message includes a UDM subscription correlation identifier 2 (UDM Subscription Correlation Id 2) allocated by the UDM.

S1116: The NEF sends an Nnef event exposure subscribe response message to the AF. Correspondingly, the AF receives the Nnef_Event Exposure_Subscribe Response message from the NEF.

The Nnef_Event Exposure_Subscribe Response message includes an NEF subscription correlation identifier 2 (NEF Subscription Correlation Id 2) allocated by the NEF.

S1117: The AMF sends an Nsmf_PDU session update SM context request (Nsmf_PDUSession_UpdateSMContext Request) message to the SMF. Correspondingly, the SMF receives the Nsmf_PDUSession_UpdateSMContext Request message from the AMF.

The Nsmf_PDUSession_UpdateSMContext Request message includes an event identifier (Event Id (DDN Failure)), an NEF notification correlation Id 2, and traffic descriptors 5.

It should be noted that, in this embodiment of this application, the NEF notification correlation Id 2 may be considered as an event subscription correlation identifier used by the AMF to subscribe to a DDN failure event from the SMF. This is uniformly described herein, and details are not described below again.

S1118: The SMF sends an Nsmf_PDU session update SM context response (Nsmf_PDUSession_UpdateSMContext Response) message to the AMF. Correspondingly, the AMF receives the Nsmf_PDUSession_UpdateSMContext Response message from the SMF.

S1119: When PCC is deployed, and the PCF provides a policy control request trigger (Policy Control Request Trigger) with a value of DDN_FAILURE to the SMF in the previous PDU session establishment procedure, the SMF sends an Npcf_SM policy control update request message to the PCF. Correspondingly, the PCF receives the Npcf_SM-PolicyControl_Update request message from the SMF.

The Npcf_SMPolicyControl_Update request message includes traffic descriptors 5 and the policy control request trigger with the value of DDN_FAILURE. Optionally, the Npcf_SMPolicyControl_Update request message further includes a subscription identifier 2, and the subscription identifier 2 is used to identify that the request message is correlated with subscription to a DDN failure event.

It should be noted that, in this embodiment of this application, the policy control request trigger with the value of DDN_FAILURE may correspond to the subscription indication information of the first event in the embodiment shown in FIG. 5. This is uniformly described herein, and details are not described below again.

S1120: The PCF determines that the traffic descriptors 5 are the same as the traffic descriptors 4, that is, determines that data description information of the second PCC rule is the same as the traffic descriptors 5.

S1121: The PCF updates the second PCC rule to obtain a first PCC rule.

As an example, DDN failure notification control indication information (which is set based on the policy control request trigger with the value of DDN_FAILURE) is added to the second PCC rule. To be specific, the first PCC rule includes a filter template (including the traffic descriptors 4, namely, the descriptors 5), a high priority, the downlink data delivery status control indication information, a notification request type (including buffered, discarded, and/or transmitted), and the DDN failure notification control indication information.

It should be noted that, in this embodiment of this application, the first PCC rule may be understood as an updated second PCC rule. In other words, in this embodiment of this application, an identifier of the first PCC rule is the same as an identifier of the second PCC rule. This is uniformly described herein, and details are not described below again.

It should be noted that, in this embodiment of this application, the DDN failure notification control indication information may correspond to the indication information 2 in the embodiment shown in FIG. 5. This is uniformly described herein, and details are not described below again.

S1122: The PCF sends an Npcf_SMPolicyControl_Update response message to the SMF. Correspondingly, the SMF receives the Npcf_SMPolicyControl_Update response message from the PCF.

The Npcf_SMPolicyControl_Update response message includes the first PCC rule.

Optionally, in this embodiment of this application, if the Npcf_SMPolicyControl_Update request message includes the subscription identifier 2, the Npcf_SMPolicyControl_Update response message further includes the subscription identifier 2. Further, the SMF may determine, based on the subscription identifier 2, that the first PCC rule is correlated with the subscription to the DDD status event and the DDN failure event. If the Npcf_SMPolicyControl_Update request message does not include the subscription identifier 2, the SMF determines, based on a request-acknowledgment message, a subscription correlation between the first PCC rule and the DDD status event and the DDN failure event. This is not specifically limited in this embodiment of this application.

S1123: Perform an N4 session modification procedure.

As an example, the SMF updates the second PCC rule based on the first PCC rule. When the notification request type included in the first PCC rule is buffered, when the SMF perceives that the terminal device is in the idle mode, the SMF formulates a PDR 2 and a correlated FAR 2 based on the first PCC rule, or the SMF modifies, based on the first PCC rule, the PDR 1 and the correlated FAR 1 that are formulated on the SMF based on the second PCC rule, to obtain a PDR 2 and a correlated FAR 2. The PDR 2 includes the filter template and the priority in the first PCC rule. An indication bit indicating the UPF to buffer data and a flag indicating the UPF to notify the SMF after the UPF buffers the first data packet that matches the PDR 2 are set in the FAR 2. Alternatively, after the SMF receives, from the AMF, a notification that the terminal device is unavailable, the SMF formulates a PDR 2 and a correlated FAR 2 based on the first PCC rule, or the SMF modifies, based on the first PCC rule, the PDR 1 and the correlated FAR 1 that are formulated on the SMF based on the second PCC rule, to obtain a PDR 2 and a correlated FAR 2. The PDR 2 includes the filter template and the priority in the first PCC rule, and a flag indicating the UPF to notify the SMF after the UPF discards the first data packet that matches the PDR 2 is set in the FAR 2.

S1124: Perform event detection.

As an example, if the indication bit indicating the UPF to buffer the data and the flag indicating the UPF to notify the SMF after the UPF buffers the first data packet that matches the PDR 2 are set in the FAR 2, after buffering the first data packet that matches the PDR, the UPF notifies the SMF that the matched data packet is buffered, where a notification message includes an identifier of the PDR 2 and indication information indicating that the data packet is buffered. Alternatively, if the flag indicating the UPF to notify the SMF after the UPF discards the first data packet that matches the PDR 2 is set in the FAR 2, after discarding the first data packet that matches the PDR 2, the UPF notifies the SMF that the matched data packet is discarded, where a notification message includes an identifier of the PDR 2 and indication information indicating that the data packet is discarded.

In addition, when the notification request type included in the first PCC rule is transmitted, and the SMF detects that a PDU session changes to be in an active state, the SMF determines that a previously buffered data packet is transmitted.

Further, if the SMF detects the DDD status event (for example, the SMF receives indication information indicating that a data packet is buffered, or the SMF receives indication information indicating that a data packet is discarded, or the SMF detects that the PDU session changes to be in the active state), steps S1125 and S1126 continue to be performed. If the SMF detects the DDN failure event (for example, the SMF receives indication information indicating that a data packet is discarded, but does not subscribe to the DDD status event previously), steps S1127 to S1130 continue to be performed. If the SMF detects the DDN failure event and the DDD status event (for example, the SMF receives indication information indicating that a data packet is discarded and subscribes to the DDD status event previously, and a notification request type of the DDD status event is discarded), steps S1125 to S1130 continue to be performed.

S1125: The SMF determines, based on the identifier of the PDR 2, that the correlated DDD status event is subscribed to, and further, the SMF sends an Nsmf event exposure notify request message to the NEF. Correspondingly, the NEF receives the Nsmf_Event Exposure_Notify Request message from the SMF. The Nsmf_Event Exposure_Notify Request message is used to send a DDD status event report to the NEF.

The Nsmf_Event Exposure_Notify Request message includes an event Id (DDD status) and an NEF notification endpoint 1. If the SMF receives the indication information indicating that the data packet is buffered, the Nsmf_Event Exposure_Notify Request message further includes that a downlink data status is buffered. Alternatively, if the SMF receives the indication information indicating that the data packet is discarded, the Nsmf_Event Exposure_Notify Request message further includes that a downlink data status is discarded. Alternatively, if the SMF detects that the PDU session changes to be in the active state, the Nsmf_Event Exposure_Notify Request message further includes that a downlink data status is transmitted.

S1126: The NEF sends an Nnef event exposure notify request message to the AF. Correspondingly, the AF receives the Nnef_Event Exposure_Notify Request message from the NEF.

The Nnef_Event Exposure_Notify Request message includes an event Id (DDD status), an AF notification endpoint 1, and a downlink data status (including buffered, discarded, and/or transmitted).

S1127: The SMF determines, based on the identifier of the PDR 2, that the correlated DDN failure event is subscribed to, and further, the SMF sends an Nsmf_PDU session SM context status notify message to the AMF. Correspondingly, the AMF receives the Nsmf_PDUSession_SMContextStatusNotify message from the SMF. The Nsmf_PDUSession_SMContextStatusNotify message is used to notify the AMF of a downlink data notification failure.

The Nsmf_PDUSession_SMContextStatusNotify message includes an NEF notification correlation Id 2. If the terminal device is still unavailable after the AMF receives the Nsmf_PDUSession_SMContextStatusNotify message, the AMF sets a notify-on-available-after-DDN-failure flag.

It should be noted that, in this embodiment of this application, that the terminal device is unavailable may be understood as that downlink data to be sent to the terminal device cannot be successfully sent to the terminal device; and that the terminal device is available may be understood as that downlink data to be sent to the terminal device can be successfully sent to the terminal device. This is uniformly described herein, and details are not described below again.

S1128. The AMF detects that the terminal device is available, and determines, based on the Notify-on-available-DDN-failure flag, that a Notify-on-available-DDN-failure event report needs to be sent.

S1129: The AMF sends an Namf event exposure notify request message to the NEF.

Correspondingly, the NEF receives the Namf_Event Exposure_Notify Request message from the AMF. The Namf_Event Exposure_Notify Request message is used to send an availability after DDN failure event report to the NEF.

The Namf_Event Exposure_Notify Request message includes an event Id (availability after DDN Failure) and an NEF notification correlation Id 2.

S1130: The NEF sends an Nnef event exposure notify request message to the AF. Correspondingly, the AF receives the Nnef_Event Exposure_Notify Request message from the NEF.

The Nnef_Event Exposure_Notify Request message includes an event Id (availability after DDN Failure) and an AF notification endpoint 2.

It should be noted that, in the embodiment shown in FIG. 11A and FIG. 11B, an example in which the DDD status event is subscribed to first and then the DDN failure event is subscribed to is used. Certainly, alternatively, the DDN failure event may be subscribed to first, and then the DDD status event is subscribed to. Procedures are similar, and details are not described herein again.

It should be noted that, the embodiment shown in FIG. 11A and FIG. 11B is described with reference to the event subscription method in FIG. 5, or certainly, may be described with reference to the event subscription method in FIG. 6. For example, in step S1121, the PCF may delete the second PCC rule and formulate the first PCC rule at the same time, where a parameter of the first PCC rule is the same as a parameter of the first PCC rule in step S1120. The identifier of the first PCC rule may be the same as or different from the identifier of the second PCC rule. This is not specifically limited in this embodiment of this application.

According to the event subscription method provided in this embodiment of this application, after the PCF sends the first PCC rule to the SMF, the SMF can detect both the DDN failure event and the DDD status event based on the first PCC rule. This avoids a problem that when two events with same data description information are subscribed to, the UPF can obtain through matching only a PDR of one event, and consequently, the SMF can receive only one event notification, and the SMF can detect only one event in the conventional technology.

The actions of the SMF in steps S1101 to S1130 may be performed by the processor 401 in the communication apparatus 400 shown in FIG. 4 by invoking the application program code stored in the memory 403, to instruct the SMF to perform the actions. The actions of the PCF in steps S1101 to S1130 may be performed by the processor 401 in the communication apparatus 400 shown in FIG. 4 by invoking the application program code stored in the memory 403, to instruct the PCF to perform the actions. This is not limited in this embodiment.

Figure 12A:
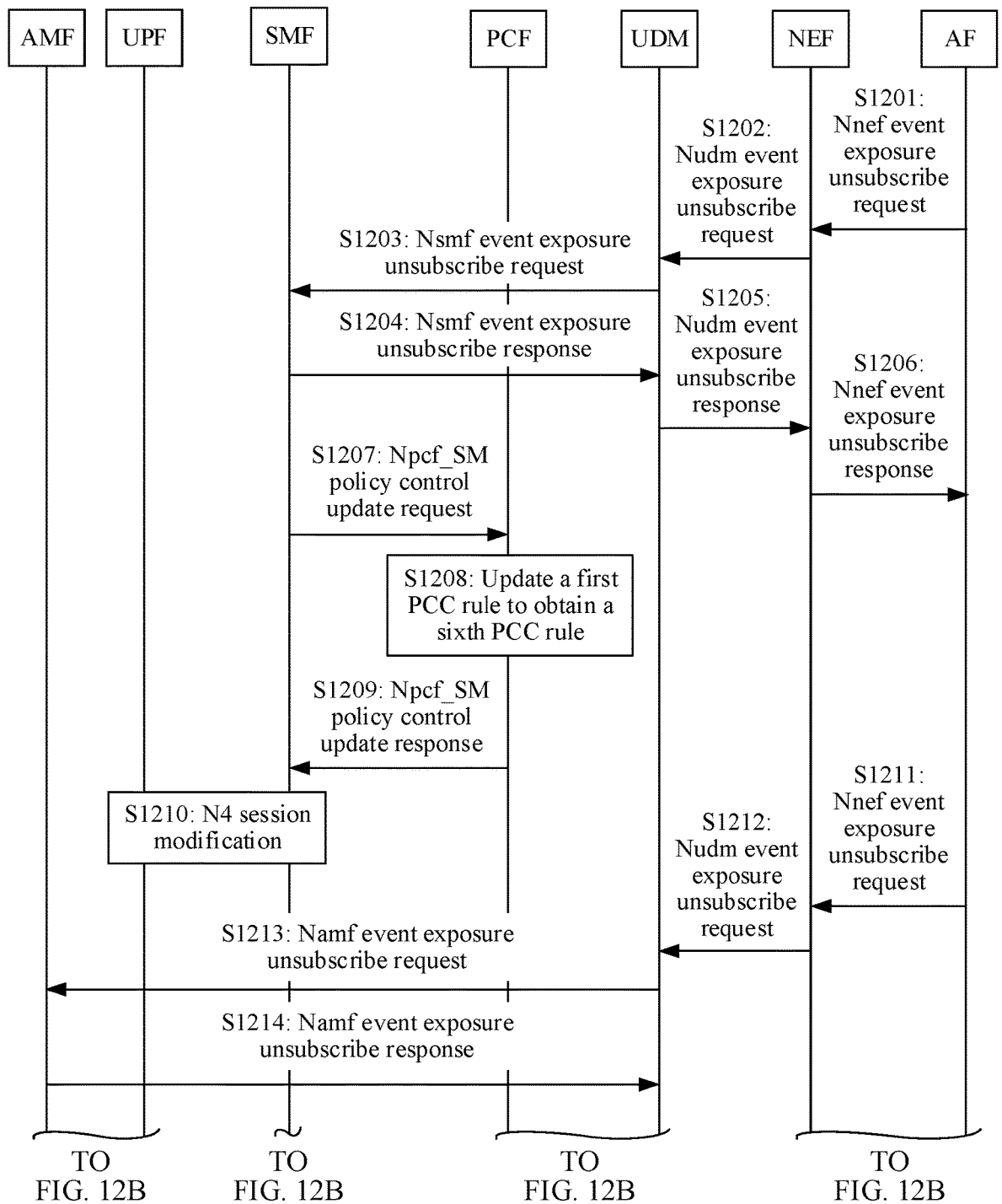
FIG. 12A and FIG. 12B are a second schematic flowchart of application of an event subscription method in a 5G network according to an embodiment of this application.
Figure 12B:
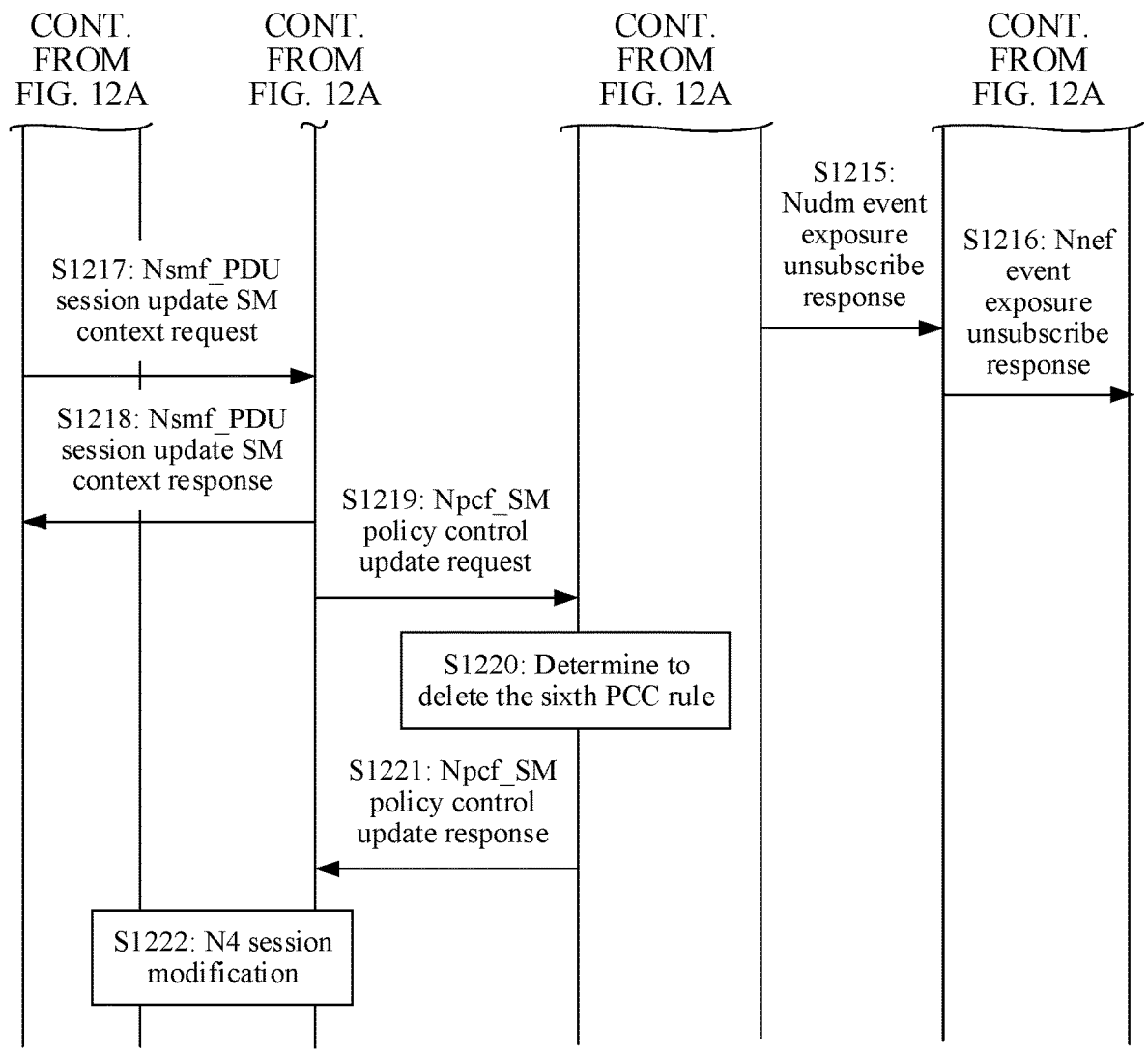

Optionally, an embodiment of this application further provides an unsubscription method based on the event subscription method shown in FIG. 11A and FIG. 11B. As shown in FIG. 12A and FIG. 12B, the following steps are included.

S1201: An AF sends an Nnef event exposure unsubscribe request message to an NEF. Correspondingly, the NEF receives the Nnef_Event Exposure_Unsubscribe Request message from the AF. The Nnef_Event Exposure_Unsubscribe Request message is used to unsubscribe from a DDD status change event.

The Nnef_Event Exposure_Unsubscribe Request message includes an NEF subscription correlation identifier 1.

S1202: The NEF sends an Nudm event exposure unsubscribe request message to a UDM. Correspondingly, the UDM receives the Nudm_Event Exposure_Unsubscribe Request message from the NEF. The Nudm_Event Exposure_Unsubscribe Request message is used to unsubscribe from a DDD status event.

The Nudm_Event Exposure_Unsubscribe Request message includes a UDM subscription correlation identifier 1.

S1203: The UDM sends an Nudm event exposure unsubscribe request message to an SMF. Correspondingly, the UDM receives the Nudm_Event Exposure_Unsubscribe Request message from the NEF. The Nudm_Event Exposure_Unsubscribe Request message is used to unsubscribe from the DDD status event.

The Nudm_Event Exposure_Unsubscribe Request message includes an SMF subscription correlation identifier 1.

S1204: The SMF deletes subscription to the DDD status event, and sends an Nudm_Event Exposure_Unsubscribe Response message to a PCF. Correspondingly, the PCF receives the Nudm_Event Exposure_Unsubscribe Response message from the SMF.

S1205: The PCF deletes subscription to the DDD status event, and sends an Nudm_Event Exposure_Unsubscribe Response message to the NEF. Correspondingly, the NEF receives the Nudm_Event Exposure_Unsubscribe Response message from the PCF.

S1206: The NEF deletes subscription to the DDD status change event, and sends an Nnef_Event Exposure_Unsubscribe Response message to the AF. Correspondingly, the AF receives the Nnef_Event Exposure_Unsubscribe Response message from the NEF.

S1207: The SMF sends an Npcf_SMPolicyControl_Update request message to the PCF. Correspondingly, the PCF receives the Npcf_SMPolicyControl_Update request message from the SMF.

The Npcf_SMPolicyControl_Update request message includes an identifier of a first PCC rule and DDD status unsubscribe indication information.

Optionally, if the Npcf_SMPolicyControl_Update request message in step S1108 in the embodiment shown in FIG. 11A and FIG. 11B includes the subscription identifier 1, the Npcf_SMPolicyControl_Update request message in step S1207 may further include the subscription identifier 1.

It should be noted that, in this embodiment of this application, the DDD status unsubscribe indication information may correspond to the indication information 4 in the embodiment shown in FIG. 5. This is uniformly described herein, and details are not described below again.

S1208: The PCF determines the corresponding first PCC rule based on the identifier of the first PCC rule or the subscription identifier 1, and updates the first PCC rule based on the DDD status unsubscribe indication information, to obtain a sixth PCC rule.

The sixth PCC rule is obtained by deleting indication information 1 and a notification request type (including buffered, discarded, and/or transmitted) from the first PCC rule. In other words, compared with the first PCC rule, the sixth PCC rule does not include the indication information 1 or the notification request type (including buffered, discarded, and/or transmitted), but still includes indication information 2.

It should be noted that, in this embodiment of this application, the sixth PCC rule may be understood as an updated first PCC rule. In other words, in this embodiment of this application, an identifier of the sixth PCC rule is the same as the identifier of the first PCC rule. This is uniformly described herein, and details are not described below again.

S1209: The PCF sends an Npcf_SMPolicyControl_Update response message to the SMF. Correspondingly, the SMF receives the Npcf_SMPolicyControl_Update response message from the PCF.

The Npcf_SMPolicyControl_Update response message includes the sixth PCC rule.

S1210: Perform an N4 session modification procedure.

As an example, the SMF updates the first PCC rule based on the sixth PCC rule, and determines to monitor only a DDN failure event. If the SMF has previously sent, to a UPF, a FAR in which an indication bit indicating the UPF to buffer data and a flag indicating the UPF to notify the SMF after the UPF buffers the first data packet that matches a PDR are set, the SMF indicates the UPF to delete the foregoing indication from the FAR. After the SMF receives, from the AMF, a notification that a terminal device is unavailable, the SMF formulates a FAR, and sets, in the FAR, a flag indicating the UPF to notify the SMF after the UPF discards the first data packet that matches a PDR. For a subsequent procedure in which the SMF monitors the DDN failure event, refer to the conventional technology. Details are not described herein.

S1211: The AF sends an Nnef_Event Exposure_Unsubscribe Request message to the NEF. Correspondingly, the NEF receives the Nnef_Event Exposure_Unsubscribe Request message from the AF. The Nnef_Event Exposure_Unsubscribe Request message is used to unsubscribe from an availability after DDN failure event.

The Nnef_Event Exposure_Unsubscribe Request message includes an NEF subscription correlation identifier 2.

S1212: The NEF sends an Nudm_Event Exposure_Unsubscribe Request message to the UDM. Correspondingly, the UDM receives the Nudm_Event Exposure_Unsubscribe Request message from the NEF. The Nudm_Event Exposure_Unsubscribe Request message is used to unsubscribe from the availability after DDN failure event.

The Nudm_Event Exposure_Unsubscribe Request message includes a UDM subscription correlation identifier 2.

S1213: The UDM sends an Namf_Event Exposure_Unsubscribe Request message to the AMF. Correspondingly, the AMF receives the Namf_Event Exposure_Unsubscribe Request message from the UDM. The Namf_Event Exposure_Unsubscribe Request message is used to unsubscribe from the availability after DDN failure event.

The Namf_Event Exposure_Unsubscribe Request message includes an AMF subscription correlation identifier 2.

S1214: The AMF deletes subscription to the availability after DDN failure event, and sends an Namf_Event Exposure_Unsubscribe Response message to the UDM. Correspondingly, the UDM receives the Namf_Event Exposure_Unsubscribe Response message from the AMF.

S1215: The UDM deletes subscription to the availability after DDN failure event, and sends an Nudm_Event Exposure_Unsubscribe Response message to the NEF. Correspondingly, the NEF receives the Nudm_Event Exposure_Unsubscribe Response message from the UDM.

S1216: The NEF deletes subscription to the availability after DDN failure event, and sends an Nnef_Event Exposure_Unsubscribe Response message to the AF. Correspondingly, the AF receives the Nnef_Event Exposure_Unsubscribe Response message from the NEF.

S1217: The AMF sends an Nsmf_PDUSession_UpdateSMContext Request message to the SMF. Correspondingly, the SMF receives the Nsmf_PDUSession_UpdateSMContext Request message from the AMF.

The Nsmf_PDUSession_UpdateSMContext Request message includes an NEF notification correlation identifier 2 and DDN failure unsubscribe indication information.

It should be noted that, in this embodiment of this application, the DDN failure unsubscribe indication information may correspond to the indication information 3 in the embodiment shown in FIG. 5. This is uniformly described herein, and details are not described below again.

S1218: The SMF sends an Nsmf_PDUSession_UpdateSMContext Response message to the AMF. Correspondingly, the AMF receives the Nsmf_PDUSession_UpdateSMContext Response message from the SMF.

S1219: The SMF sends an Npcf_SMPolicyControl_Update request message to the PCF. Correspondingly, the PCF receives the Npcf_SMPolicyControl_Update request message from the SMF.

The Npcf_SMPolicyControl_Update request message includes an identifier of the sixth PCC rule and the DDN failure unsubscribe indication information.

Optionally, if the Npcf_SMPolicyControl_Update request message in step S1119 in the embodiment shown in FIG.

11A and FIG. 11B includes the subscription identifier 2, the Npcf_SMPolicyControl_Update request message in step S1219 may further include the subscription identifier 2.

S1220: The PCF determines the corresponding sixth PCC rule based on the identifier of the sixth PCC rule or the subscription identifier 2, and determines, based on the DDN Failure unsubscribed indication information, to delete the sixth PCC rule.

S1221: The PCF sends an Npcf_SMPolicyControl_Update response message to the SMF. Correspondingly, the SMF receives the Npcf_SMPolicyControl_Update response message from the PCF.

The Npcf_SMPolicyControl_Update response message includes indication information indicating to delete the sixth PCC rule.

S1222: Perform an N4 session modification procedure.

As an example, the SMF deletes the sixth PCC rule, and stops monitoring the DDN failure event. If the SMF has previously sent, to the UPF, a FAR in which a flag indicating the UPF to notify the SMF after the UPF discards the first data packet that matches a PDR is set, the SMF indicates the UPF to delete the PDR and the correlated FAR.

It should be noted that, in the embodiment shown in FIG. 12A and FIG. 12B, an example in which the DDD status event is unsubscribed from first and then the DDN failure event is unsubscribed from is used. Certainly, alternatively, the DDN failure event may be unsubscribed from first, and then the DDD status event is unsubscribed from. Procedures are similar, and details are not described herein again.

It should be noted that, step S1208 in the embodiment shown in FIG. 12A and FIG. 12B is described by using an update of a PCC rule as an example. Certainly, alternatively, the PCF may delete the original first PCC rule, and re-formulate a sixth PCC rule. An identifier of the sixth PCC rule may be the same as or different from the identifier of the first PCC rule. This is not specifically limited in this embodiment of this application.

In this case, an unsubscription procedure based on the event subscription method in FIG. 11A and FIG. 11B ends.

The actions of the SMF in steps S1201 to S1222 may be performed by the processor 401 in the communication apparatus 400 shown in FIG. 4 by invoking the application program code stored in the memory 403, to instruct the SMF to perform the actions. The actions of the PCF in steps S1201 to S1222 may be performed by the processor 401 in the communication apparatus 400 shown in FIG. 4 by invoking the application program code stored in the memory 403, to instruct the PCF to perform the actions. This is not limited in this embodiment.

Figure 13:
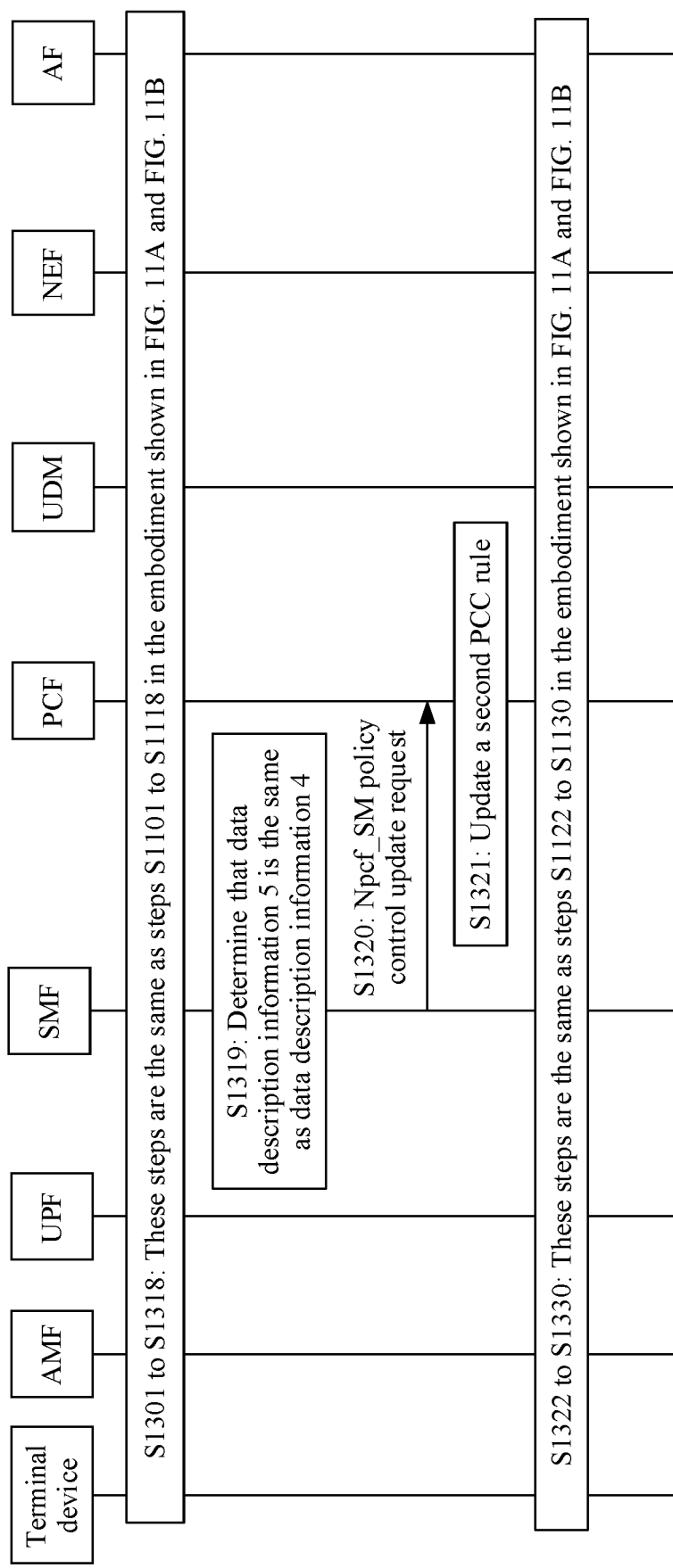
FIG. 13 is a third schematic flowchart of application of an event subscription method in a 5G network according to an embodiment of this application.

With reference to the event subscription method shown in FIG. 7, an example in which the communication system shown in FIG. 1 is applied to the 5G network shown in FIG. 2 or FIG. 3, the first event is a downlink data notification failure (DDN failure) event, and the second event is a downlink data delivery status (DDD status) event (to be specific, the DDD status event and the DDN failure event are subscribed to in sequence) is used. FIG. 13 shows an event subscription method according to an embodiment of this application. Descriptions are provided below.

S1301 to S1318: These steps are the same as steps S1101 to S1118 in the embodiment shown in FIG. 11A and FIG. 11B. Details are not described herein again.

S1319: The SMF determines that the traffic descriptors 5 are the same as the traffic descriptors 4, that is, determines that data description information of the second PCC rule is the same as the traffic descriptors 5.

S1320: The SMF sends an Npcf_SMPolicyControl_Update request message to the PCF. Correspondingly, the PCF receives the Npcf_SMPolicyControl_Update request message from the SMF.

The Npcf_SMPolicyControl_Update request message includes an identifier of the second PCC rule and a policy control request trigger with a value of DDN_FAILURE. Optionally, the Npcf_SMPolicyControl_Update request message further includes a subscription identifier 2, and the subscription identifier 2 is used to identify that the request message is correlated with subscription to a DDN failure event.

It should be noted that, in this embodiment of this application, the policy control request trigger with the value of DDN_FAILURE may correspond to the subscription indication information of the first event in the embodiment shown in FIG. 7. This is uniformly described herein, and details are not described below again.

S1321: The PCF updates the second PCC rule to obtain a first PCC rule.

As example, DDN failure notification control indication information (which is set based on the policy control request trigger with the value of DDN_FAILURE) is added to the second PCC rule. To be specific, the first PCC rule includes a filter template (including the traffic descriptors 4, namely, the descriptors 5), a high priority, downlink data delivery status control indication information, a notification request type (including buffered, discarded, and/or transmitted), and the DDN failure notification control indication information.

It should be noted that, in this embodiment of this application, the first PCC rule may be understood as an updated second PCC rule. In other words, in this embodiment of this application, an identifier of the first PCC rule is the same as an identifier of the second PCC rule. This is uniformly described herein, and details are not described below again.

It should be noted that, in this embodiment of this application, the DDN failure notification control indication information may correspond to the indication information 2 in the embodiment shown in FIG. 7. This is uniformly described herein, and details are not described below again.

S1322 to S1330: These steps are the same as steps S1122 to S1130 in the embodiment shown in FIG. 11A and FIG. 11B. Details are not described herein again.

It should be noted that, in the embodiment shown in FIG. 11A and FIG. 11B, an example in which the DDD status event is subscribed to first and then the DDN failure event is subscribed to is used. Certainly, alternatively, the DDN failure event may be subscribed to first, and then the DDD status event is subscribed to. Procedures are similar, and details are not described herein again.

It should be noted that, the embodiment shown in FIG. 13 is described with reference to the event subscription method in FIG. 7, Certainly, in step S1321, the PCF may delete the second PCC rule and formulate the first PCC rule at the same time, where a parameter of the first PCC rule is the same as a parameter of the first PCC rule in step S1321. The identifier of the first PCC rule may be the same as or different from the identifier of the second PCC rule. This is not specifically limited in this embodiment of this application.

Based on the event subscription method provided in this embodiment of this application, after the PCF sends the first PCC rule to the SMF, the SMF can detect both the DDN failure event and the DDD status event based on the first PCC rule. This avoids a problem that when two events with same data description information are subscribed to, the UPF can obtain through matching only a PDR of one event, and consequently, the SMF can receive only one event notification, and the SMF can detect only one event in the conventional technology.

The actions of the SMF in steps S1301 to S1330 may be performed by the processor 401 in the communication apparatus 400 shown in FIG. 4 by invoking the application program code stored in the memory 403, to instruct the SMF to perform the actions. The actions of the PCF in steps S1301 to S1330 may be performed by the processor 401 in the communication apparatus 400 shown in FIG. 4 by invoking the application program code stored in the memory 403, to instruct the PCF to perform the actions. This is not limited in this embodiment.

Optionally, the unsubscription method shown in FIG. 12A and FIG. 12B is also applicable to unsubscription based on the event subscription method shown in FIG. 13, and the unsubscription based on the event subscription method shown in FIG. 13 is not described in detail again in this embodiment of this application.

Figure 14:
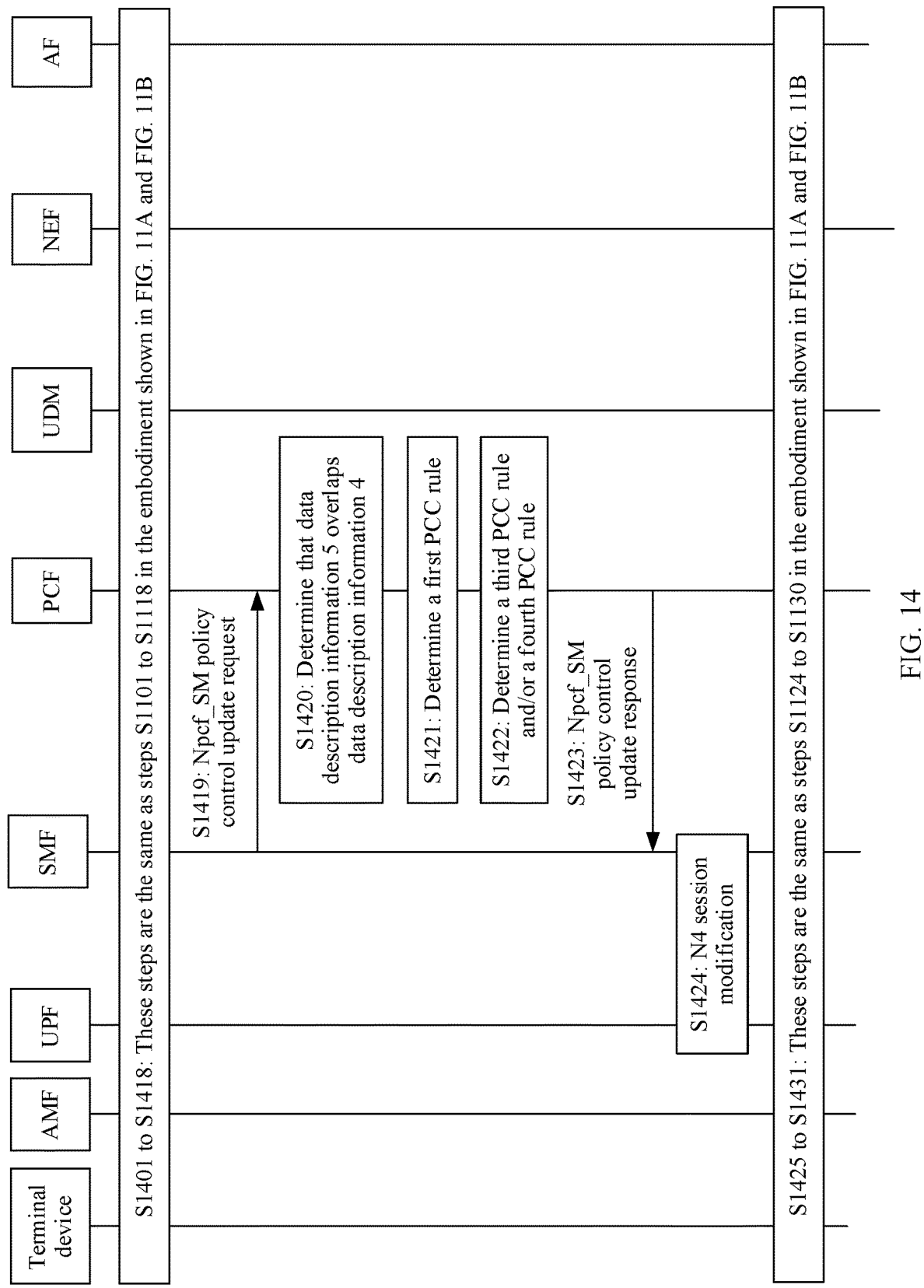
FIG. 14 is a fourth schematic flowchart of application of an event subscription method in a 5G network according to an embodiment of this application.

With reference to the event subscription method shown in FIG. 8A and FIG. 8B, an example in which the communication system shown in FIG. 1 is applied to the 5G network shown in FIG. 2 or FIG. 3, the first event is a downlink data notification failure (DDN failure) event, and the second event is a downlink data delivery status (DDD status) event (to be specific, the DDD status event and the DDN failure event are subscribed to in sequence) is used. FIG. 14 shows an event subscription method according to an embodiment of this application. Descriptions are provided below.

S1401 to S1418: These steps are the same as steps S1101 to S1118 in the embodiment shown in FIG. 11A and FIG. 11B. Details are not described herein again.

S1419: When PCC is deployed, and the PCF provides a policy control request trigger with a value of DDN_FAILURE to the SMF in the previous PDU session establishment procedure, the SMF sends an Npcf_SM policy control update request message to the PCF. Correspondingly, the PCF receives the Npcf_SMPolicyControl_Update request message from the SMF.

The Npcf_SMPolicyControl_Update request message includes traffic descriptors 5 and the policy control request trigger with the value of DDN_FAILURE. Optionally, the Npcf_SMPolicyControl_Update request message further includes a subscription identifier 2, and the subscription identifier 2 is used to identify that the request message is correlated with subscription to a DDN failure event.

It should be noted that, in this embodiment of this application, the policy control request trigger with the value of DDN_FAILURE may correspond to the subscription indication information of the first event in the embodiment shown in FIG. 8A and FIG. 8B. This is uniformly described herein, and details are not described below again.

S1420: The PCF determines that the traffic descriptors 5 overlap the traffic descriptors 4, that is, data description information of the second PCC rule overlaps the traffic descriptors 5.

S1421: The PCF determines a first PCC rule based on the traffic descriptors 5 and the policy control request trigger of DDN_FAILURE.

A filter template in the first PCC rule includes overlapping information in the traffic descriptors 5 and the traffic descriptors 4 (which is referred to as data description information 1 for short below), a high priority, DDN failure notification control indication information (which is set based on the policy control request trigger with the value of DDN_FAILURE), downlink data delivery status control indication information, and a notification request type (including buffered, discarded, and/or transmitted). For a specific implementation of step S1421, refer to step S804 in the embodiment shown in FIG. 8A and FIG. 8B. Details are not described herein again.

It should be noted that, the downlink data delivery status control indication information in this embodiment of this application may correspond to the indication information 1 in the embodiment shown in FIG. 8A and FIG. 8B, and the DDN failure notification control indication information in this embodiment of this application may correspond to the indication information 2 in the embodiment shown in FIG. 8A and FIG. 8B. This is uniformly described herein, and details are not described below again.

S1422: The PCF determines a third PCC rule and/or a fourth PCC rule based on the traffic descriptors 5 and the policy control request trigger of DDN_FAILURE.

A filter template in the third PCC rule includes information that is in the traffic descriptors 4 and that is other than the overlapping information in the traffic descriptors 5 and the traffic descriptors 4 (which is referred to as data description information 2 for short below), a high priority, downlink data delivery status control indication information, and a notification request type (including buffered, discarded, and/or transmitted).

A filter template in the fourth PCC rule includes information that is in the traffic descriptors 5 and that is other than the overlapping information in the traffic descriptors 5 and the traffic descriptors 4 (which is referred to as data description information 3 for short below), a high priority, and the DDN failure notification control indication information.

For a specific implementation of step S1422, refer to step S805 in the embodiment shown in FIG. 8A and FIG. 8B. Details are not described herein again.

S1423: The PCF sends an Npcf_SMPolicyControl_Update response message to the SMF. Correspondingly, the SMF receives the Npcf_SMPolicyControl_Update response message from the PCF.

The Npcf_SMPolicyControl_Update response message includes the first PCC rule and the third PCC rule and/or the fourth PCC rule.

Optionally, in this embodiment of this application, if the Npcf_SMPolicyControl_Update request message includes the subscription identifier 2, the Npcf_SMPolicyControl_Update response message further includes the subscription identifier 1 and the subscription identifier 2 that correspond to the first PCC rule and the subscription identifier 1 corresponding to the third PCC rule and/or the subscription identifier 2 corresponding to the fourth PCC rule. Further, the SMF may determine, based on the subscription identifier 2 and the subscription identifier 1, that the first PCC rule is correlated with the subscription to the DDD status event and the DDN failure event. The SMF may determine, based on the subscription identifier 1, a subscription correlation between the third PCC rule and the DDD status event, and the SMF may determine, based on the subscription identifier 2, a subscription correlation between the fourth PCC rule and the DDN Failure event. Certainly, the SMF may learn, in another manner, of the events correlated with the first PCC rule and the third PCC rule and/or the fourth PCC rule. This is not specifically limited in this embodiment of this application.

S1424: Perform an N4 session modification procedure.

As an example, the SMF determines, based on the first PCC rule, to monitor the DDD status event and the DDN failure event. The SMF determines, based on the third PCC rule, to monitor the DDD status event, and/or the SMF determines, based on the fourth PCC rule, to monitor the DDN failure event. A specific process of formulating a PDR and a FAR based on a PCC rule is similar to that in the embodiment shown in FIG. 11A and FIG. 11B, and details are not described herein again.

S1425 to S1431: These steps are the same as steps S1124 to S1130 in the embodiment shown in FIG. 11A and FIG. 11B. Details are not described herein again.

It should be noted that, in the embodiment shown in FIG. 14, an example in which the DDD status event is subscribed to first and then the DDN failure event is subscribed to is used. Certainly, alternatively, the DDN failure event may be subscribed to first, and then the DDD status event is subscribed to. Procedures are similar, and details are not described herein again.

Based on the event subscription method provided in this embodiment of this application, after the PCF sends the first PCC rule to the SMF, the SMF can detect both the DDN failure event and the DDD status event based on the first PCC rule. This avoids a problem that when two events with overlapping data description information are subscribed to, a user plane function entity may obtain through matching only a PDR of one event, and consequently, the SMF can receive only one event notification, and the SMF can detect only one event in the conventional technology.

The actions of the SMF in steps S1401 to S1431 may be performed by the processor 401 in the communication apparatus 400 shown in FIG. 4 by invoking the application program code stored in the memory 403, to instruct the SMF to perform the actions. The actions of the PCF in steps S1401 to S1431 may be performed by the processor 401 in the communication apparatus 400 shown in FIG. 4 by invoking the application program code stored in the memory 403, to instruct the PCF to perform the actions. This is not limited in this embodiment.

Figure 15:
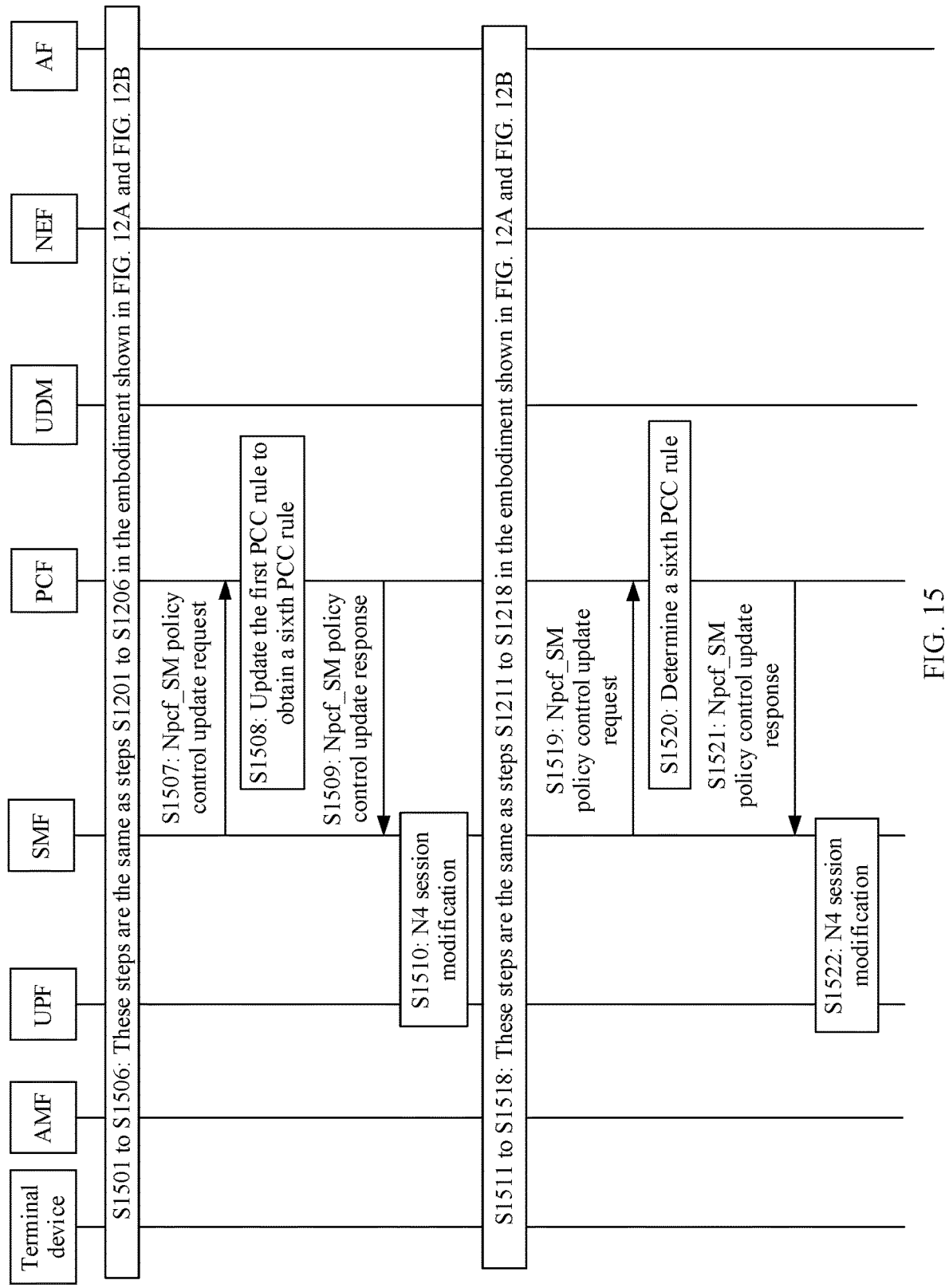
FIG. 15 is a fifth schematic flowchart of application of an event subscription method in a 5G network according to an embodiment of this application.

Optionally, an embodiment of this application further provides an unsubscription method based on the event subscription method shown in FIG. 14. As shown in FIG. 15, the following steps are included.

S1501 to S1506: These steps are the same as steps S1201 to S1206 in the embodiment shown in FIG. 12A and FIG. 12B. Details are not described herein again.

S1507: The SMF sends an Npcf_SMPolicyControl_Update request message to the PCF. Correspondingly, the PCF receives the Npcf_SMPolicyControl_Update request message from the SMF.

In a possible implementation, the Npcf_SMPolicyControl_Update request message includes an identifier of a first PCC rule and DDD status unsubscribe indication information. Optionally, if the SMF obtains a third PCC rule, the Npcf_SMPolicyControl_Update request message further includes an identifier of the third PCC rule.

In another possible implementation, the Npcf_SMPolicyControl_Update request message includes a subscription identifier 1 and DDD status unsubscribe indication information.

It should be noted that, in this embodiment of this application, the DDD status unsubscribe indication information may correspond to the indication information 4 in the embodiment shown in FIG. 8A and FIG. 8B. This is uniformly described herein, and details are not described below again.

S1508: The PCF updates the first PCC rule to obtain a sixth PCC rule.

The sixth PCC rule is obtained by deleting indication information 1 and a notification request type (including buffered, discarded, and/or transmitted) from the first PCC rule. In other words, compared with the first PCC rule, the sixth PCC rule does not include the indication information 1 or the notification request type (including buffered, discarded, and/or transmitted), but still includes indication information 2.

It should be noted that, in this embodiment of this application, the sixth PCC rule may be understood as an updated first PCC rule. In other words, in this embodiment of this application, an identifier of the sixth PCC rule is the same as the identifier of the first PCC rule. This is uniformly described herein, and details are not described below again.

In a possible implementation, the PCF determines the first PCC rule based on the identifier of the first PCC rule, and then the PCF updates the first PCC rule based on the DDD status unsubscribe indication information, to obtain the sixth PCC rule. In addition, if the Npcf_SMPolicyControl_Update request message further includes an identifier of the third PCC rule, the PCF deletes the third PCC rule.

In another possible implementation, the PCF determines the first PCC rule based on the subscription identifier 1, and then the PCF updates the first PCC rule based on the DDD status unsubscribe indication information, to obtain the sixth PCC rule. Optionally, the PCF determines the third PCC rule based on the subscription identifier 1, and then the PCF deletes the third PCC rule.

S1509: The PCF sends an Npcf_SMPolicyControl_Update response message to the SMF. Correspondingly, the SMF receives the Npcf_SMPolicyControl_Update response message from the PCF.

The Npcf_SMPolicyControl_Update response message includes the sixth PCC rule.

Optionally, if the PCF determines to delete the third PCC rule, the Npcf_SMPolicyControl_Update response message further includes indication information indicating to delete the third PCC rule.

S1510: Perform an N4 session modification procedure.

As an example, the SMF updates the first PCC rule based on the sixth PCC rule, and determines to monitor only a DDN failure event. If the SMF has previously sent, to a UPF, a FAR in which an indication bit indicating the UPF to buffer data and a flag indicating the UPF to notify the SMF after the UPF buffers the first data packet that matches a PDR are set, the SMF indicates to delete the foregoing indication from the FAR. After the SMF receives, from the AMF, a notification that a terminal device is unavailable, the SMF formulates a FAR, and sets, in the FAR, a flag indicating the UPF to notify the SMF after the UPF discards the first data packet that matches a PDR. For a subsequent procedure in which the SMF monitors the DDN failure event, refer to the conventional technology. Details are not described herein.

In addition, if the Npcf_SMPolicyControl_Update response message further includes the indication information indicating to delete the third PCC rule, the SMF deletes the third PCC rule and stops monitoring the DDD status event. If the SMF has previously sent, to the UPF, a PDR and a FAR that are determined based on the third PCC rule, the SMF indicates the UPF to delete the PDR and the FAR that are determined based on the third PCC rule.

S1511 to S1518: These steps are the same as steps S1211 to S1218 in the embodiment shown in FIG. 12A and FIG. 12B. Details are not described herein again.

S1519: The SMF sends an Npcf_SMPolicyControl_Update request message to the PCF. Correspondingly, the PCF receives the Npcf_SMPolicyControl_Update request message from the SMF.

In a possible implementation, the Npcf_SMPolicyControl_Update request message includes an identifier of the sixth PCC rule and DDN failure unsubscribe indication information. Optionally, if the SMF obtains a fourth PCC rule, the Npcf_SMPolicyControl_Update request message further includes an identifier of the fourth PCC rule.

In another possible implementation, the Npcf_SMPolicyControl_Update request message includes a subscription identifier 2 and DDN failure unsubscribe indication information.

It should be noted that, in this embodiment of this application, the DDN failure unsubscribe indication information may correspond to the indication information 3 in the embodiment shown in FIG. 8A and FIG. 8B. This is uniformly described herein, and details are not described below again.

S1520: The PCF determines the corresponding sixth PCC rule based on the identifier of the sixth PCC rule or the subscription identifier 2, and determines, based on the DDN Failure unsubscribed indication information, to delete the sixth PCC rule.

Optionally, if the Npcf_SMPolicyControl_Update request message further includes an identifier of the fourth PCC rule, the PCF further deletes the fourth PCC rule. Alternatively, if the PCF further determines the fourth PCC rule based on the subscription identifier 2, the PCF deletes the fourth PCC rule.

S1521: The PCF sends an Npcf_SMPolicyControl_Update response message to the SMF. Correspondingly, the SMF receives the Npcf_SMPolicyControl_Update response message from the PCF.

The Npcf_SMPolicyControl_Update response message includes indication information indicating to delete the sixth PCC rule.

Optionally, if the PCF determines to delete the fourth PCC rule, the Npcf_SMPolicyControl_Update response message further includes indication information indicating to delete the fourth PCC rule.

S1522: Perform an N4 session modification procedure.

As an example, the SMF deletes the sixth PCC rule, and stops monitoring the DDN failure event. If the SMF has previously sent, to the UPF, a FAR in which a flag indicating the UPF to notify the SMF after the UPF discards the first data packet that matches a PDR is set, the SMF indicates the UPF to delete the PDR corresponding to the sixth PCC rule and the FAR correlated with the PDR.

In addition, if the Npcf_SMPolicyControl_Update response message further includes the indication information indicating to delete the fourth PCC rule, the SMF deletes the fourth PCC rule and stops monitoring the DDN failure event. If the SMF has previously sent, to the UPF, a PDR and a FAR that are determined based on the fourth PCC rule, the SMF indicates the UPF to delete the PDR and the FAR that are determined based on the fourth PCC rule.

It should be noted that, in the embodiment shown in FIG. 15, an example in which the DDD status event is unsubscribed from first and then the DDN failure event is unsubscribed from is used. Certainly, alternatively, the DDN failure event may be unsubscribed from first, and then the DDD status event is unsubscribed from. Procedures are similar, and details are not described herein again.

It should be noted that, step S1508 in the embodiment shown in FIG. 15 is described by using an update of a PCC rule as an example. Certainly, alternatively, the PCF may delete the original first PCC rule, and re-formulate a sixth PCC rule. An identifier of the sixth PCC rule may be the same as or different from the identifier of the first PCC rule. This is not specifically limited in this embodiment of this application.

In this case, an unsubscription procedure based on the event subscription method in FIG. 14 ends.

The actions of the SMF in steps S1501 to S1522 may be performed by the processor 401 in the communication apparatus 400 shown in FIG. 4 by invoking the application program code stored in the memory 403, to instruct the SMF to perform the actions. The actions of the PCF in steps S1201 to S1522 may be performed by the processor 401 in the communication apparatus 400 shown in FIG. 4 by invoking the application program code stored in the memory 403, to instruct the PCF to perform the actions. This is not limited in this embodiment.

Figure 16:
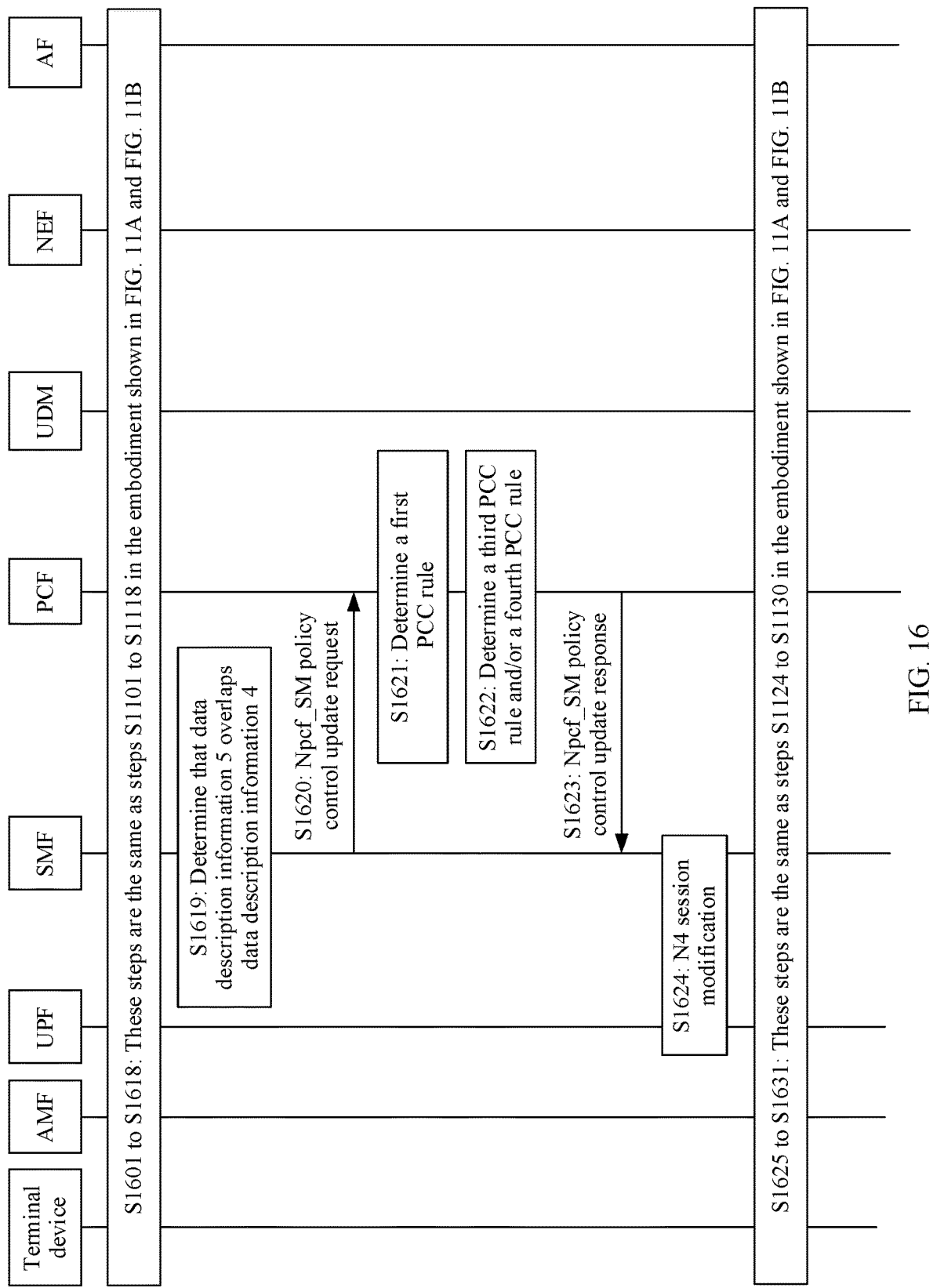
FIG. 16 is a sixth schematic flowchart of application of an event subscription method in a 5G network according to an embodiment of this application.

With reference to the event subscription method shown in FIG. 10, an example in which the communication system shown in FIG. 1 is applied to the 5G network shown in FIG. 2 or FIG. 3, the first event is a downlink data notification failure (DDN failure) event, and the second event is a downlink data delivery status (DDD status) event (to be specific, the DDD status event and the DDN failure event are subscribed to in sequence) is used. FIG. 16 shows an event subscription method according to an embodiment of this application. Descriptions are provided below.

S1601 to S1618: These steps are the same as steps S1101 to S1118 in the embodiment shown in FIG. 11A and FIG. 11B. Details are not described herein again.

S1619: The SMF determines that the traffic descriptors 5 overlap the traffic descriptors 4, that is, data description information of the second PCC rule overlaps the traffic descriptors 5. S1620: The SMF sends an Npcf_SMPolicyControl_Update request message to the PCF. Correspondingly, the PCF receives the Npcf_SMPolicyControl_Update request message from the SMF.

The Npcf_SMPolicyControl_Update request message includes a correspondence between data description information 1, a policy control request trigger with a value of DDN_FAILURE, and downlink data delivery status control indication information. Optionally, the correspondence includes an identifier of the second PCC rule. For related descriptions of the data description information 3, refer to the embodiment shown in FIG. 10. Details are not described herein again.

In addition, the Npcf_SMPolicyControl_Update request message further includes a correspondence between data description information 2 and downlink data delivery status control indication information, and/or a correspondence between the data description information 3 and DDN failure indication information. Optionally, the correspondence includes the identifier of the second PCC rule. For related descriptions of the data description information 2 and the data description information 3, refer to the embodiment shown in FIG. 10. Details are not described herein again.

It should be noted that, the downlink data delivery status control indication information in this embodiment of this application may correspond to the indication information 1 in the embodiment shown in FIG. 10, and the DDN failure notification control indication information in this embodiment of this application may correspond to the indication information 2 in the embodiment shown in FIG. 10. This is uniformly described herein, and details are not described below again.

It should be noted that, in this embodiment of this application, the policy control request trigger of DDN_FAILURE may correspond to the subscription indication information of the first event in the embodiment shown in FIG. 10. This is uniformly described herein, and details are not described below again.

S1621: The PCF determines a first PCC rule based on the correspondence between the data description information 1, the policy control request trigger of DDN_FAILURE, and the downlink data delivery status control indication information.

A filter template in the first PCC rule includes the data description information 1, a high priority, the DDN failure notification control indication information (which is set based on the policy control request trigger with the value of DDN_FAILURE), the downlink data delivery status control indication information, and a notification request type (including buffered, discarded, and/or transmitted). For a specific implementation of step S1621, refer to step S1004 in the embodiment shown in FIG. 10. Details are not described herein again.

S1622: The PCF determines a third PCC rule based on the correspondence between the data description information 2 and the downlink data delivery status control indication information, and/or the PCF determines a fourth PCC rule based on the correspondence between the data description information 3 and the DDN failure indication information.

A filter template in the third PCC rule includes the data description information 2, a high priority, the downlink data delivery status control indication information, and a notification request type (including buffered, discarded, and/or transmitted). A filter template in the fourth PCC rule includes the data description information 3, a high priority, and the DDN failure notification control indication information. For a specific implementation of step S1622, refer to step S1006 in the embodiment shown in FIG. 10. Details are not described herein again.

S1623: The PCF sends an Npcf_SMPolicyControl_Update response message to the SMF. Correspondingly, the SMF receives the Npcf_SMPolicyControl_Update response message from the PCF.

S1624: Perform an N4 session modification procedure.

For related descriptions of S1623 and S1624, refer to step S1423 and S1424 in the embodiment shown in FIG. 14. Details are not described herein again.

S1625 to S1631: These steps are the same as steps S1124 to S1130 in the embodiment shown in FIG. 11A and FIG. 11B. Details are not described herein again.

It should be noted that, in the embodiment shown in FIG. 16, an example in which the DDD status event is subscribed to first and then the DDN failure event is subscribed to is used. Certainly, alternatively, the DDN failure event may be subscribed to first, and then the DDD status event is subscribed to. Procedures are similar, and details are not described herein again.

Based on the event subscription method provided in this embodiment of this application, after the PCF sends the first PCC rule to the SMF, the SMF can detect both the DDN failure event and the DDD status event based on the first PCC rule. This avoids a problem that when two events with overlapping data description information are subscribed to, a user plane function entity may obtain through matching only a PDR of one event, and consequently, the SMF can receive only one event notification, and the SMF can detect only one event in the conventional technology.

The actions of the SMF in steps S1601 to S1631 may be performed by the processor 401 in the communication apparatus 400 shown in FIG. 4 by invoking the application program code stored in the memory 403, to instruct the SMF to perform the actions. The actions of the PCF in steps S1601 to S1631 may be performed by the processor 401 in the communication apparatus 400 shown in FIG. 4 by invoking the application program code stored in the memory 403, to instruct the PCF to perform the actions. This is not limited in this embodiment.

Optionally, the unsubscription method shown in FIG. 15 is also applicable to unsubscription based on the event subscription method shown in FIG. 16, and the unsubscription based on the event subscription method shown in FIG. 16 is not described in detail again in this embodiment of this application.

It may be understood that, in the embodiments shown in FIG. 5 to FIG. 16, the methods and/or steps implemented by the policy control entity may alternatively be implemented by a component (for example, a chip or a circuit) that can be used in the policy control entity, and the methods and/or steps implemented by the session management entity may alternatively be implemented by a component (for example, a chip or a circuit) that can be used in the session management entity.

The foregoing mainly describes the solutions provided in embodiments of this application from a perspective of interaction between network elements. Correspondingly, an embodiment of this application further provides a communication apparatus. The communication apparatus may be the policy control entity in the foregoing method embodiments, or an apparatus including the foregoing policy control entity, or a component that can be used in the policy control entity; or the communication apparatus may be the session management entity in the foregoing method embodiments, or an apparatus including the foregoing session management entity, or a component that can be used in the session management entity. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 17:
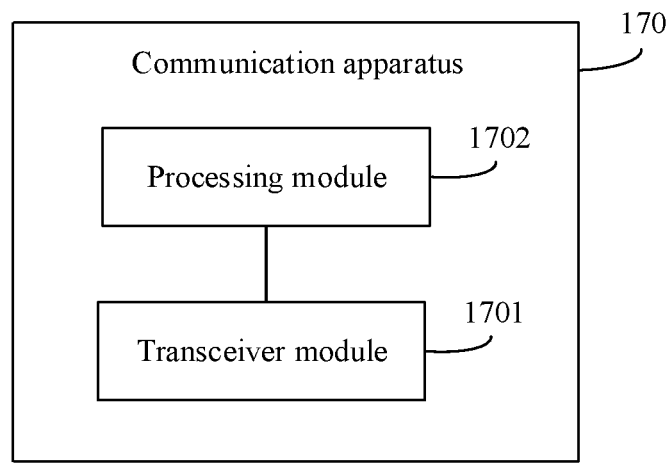
FIG. 17 is a schematic diagram of a structure of another communication apparatus according to an embodiment of this application.

FIG. 17 is a schematic diagram of a structure of a communication apparatus 170. The communication apparatus 170 includes a transceiver module 1701 and a processing module 1702. The communication apparatus 170 may be the policy control entity or the session management entity in the foregoing method embodiments. The transceiver module 1701 may also be referred to as a transceiver unit, and is configured to implement a sending function and/or a receiving function performed by the policy control entity or the session management entity in any one of the foregoing method embodiments. The transceiver module 1701 may include a transceiver circuit, a transceiver machine, a transceiver, or a communication interface. In some possible implementations, the transceiver module 1701 includes a sending module and a receiving module, respectively configured to implement the sending function and the receiving performed by the policy control entity or the session management entity in any one of the foregoing method embodiments. The processing module 1702 may be configured to implement a processing function performed by the policy control entity or the session management entity in any one of the foregoing method embodiments. The processing module 1702 may be, for example, a processor.

In this embodiment, the communication apparatus 170 is presented in a form of function modules obtained through division in an integrated manner. The "module" herein may be an ASIC, a circuit, a processor that executes one or more software or firmware programs, a memory, an integrated logic circuit, and/or another component capable of providing the foregoing functions. In a simple embodiment, a person skilled in the art may figure out that the communication apparatus 170 may be in a form of the communication apparatus 400 shown in FIG. 4.

For example, the processor 401 in the communication apparatus 400 shown in FIG. 4 may invoke the computer-executable instructions stored in the memory 403, to enable the communication apparatus 400 to perform the event subscription method in the foregoing method embodiments.

As an example, the functions/implementation processes of the transceiver module 1701 and the processing module 1702 in FIG. 17 may be implemented by the processor 401 in the communication apparatus 400 shown in FIG. 4 by invoking the computer-executable instructions stored in the memory 403. Alternatively, the function/an implementation process of the processing module 1702 in FIG. 17 may be implemented by the processor 401 in the communication apparatus 400 shown in FIG. 4 by invoking the computer-executable instructions stored in the memory 403; and the function/an implementation process of the transceiver module 1701 in FIG. 17 may be implemented by using the communication interface 404 in the communication apparatus 400 shown in FIG. 4.

The communication apparatus 170 provided in this embodiment can perform the foregoing event subscription method. Therefore, for a technical effect that can be achieved by the communication apparatus 170, refer to the foregoing method embodiments. Details are not described herein again.

Optionally, an embodiment of this application provides a computer-readable storage medium. The computer-readable storage medium stores instructions. When the instructions are run on a computer, the computer is enabled to perform the method performed by the policy control entity or the session management entity in any one of the foregoing method embodiments.

Optionally, an embodiment of this application provides a computer program product including instructions. When the computer program product runs on a computer, the computer is enabled to perform the method performed by the policy control entity or the session management entity in any one of the foregoing method embodiments.

It should be noted that one or more of the foregoing modules or units may be implemented by software, hardware, or a combination thereof. When any one of the foregoing modules or units is implemented by software, the software exists in a form of a computer program instruction, and is stored in the memory. The processor may be configured to execute the program instruction and implement the foregoing method procedure. The processor may be built into a SoC (system-on-a-chip) or an ASIC, or may be an independent semiconductor chip. In addition to a core for executing software instructions to perform operations or processing, the processor may further include a necessary hardware accelerator, for example, a field programmable gate array (FPGA), a PLD (programmable logic device), or a logic circuit that implements a special-purpose logic operation.

When the foregoing modules or units are implemented by hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a communication apparatus (where for example, the communication apparatus may be a chip or a chip system). The communication apparatus includes a processor, configured to implement the method in any one of the foregoing method embodiments. In a possible implementation, the communication apparatus further includes a memory. The memory is configured to store necessary program instructions and data. The processor may invoke program code stored in the memory, to indicate the communication apparatus to perform the method in any one of the foregoing method embodiments. Certainly, the communication apparatus may not include a memory. When the communication apparatus is the chip system, the communication device may include a chip, or may include a chip and another discrete component. This is not specifically limited in this embodiment of this application.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to embodiments, in a process of implementing this application that claims protection, a person skilled in the art may understand and implement another variation of the disclosed embodiments by viewing the accompanying drawings, the disclosed content, and the appended claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and the accompanying drawings are merely example descriptions of this application defined by the appended claims, and are considered as any of or all modifications, variations, combinations or equivalents that cover the scope of this application. It is clearly that a person skilled in the art can make various modifications and variations to this application without departing from the spirit and scope of this application. In this way, this application is intended to cover these modifications and variations of this application provided that they fall within the scope of the claims of this application and their equivalent technologies.

What is claimed is:

1. An event subscription method, comprising:
   receiving, by a policy control entity of a communication system, information about a first event from a session management entity of the communication system, wherein the information about the first event comprises subscription indication information of the first event and first data description information of the first event;
   determining, by the policy control entity, that second data description information of a second policy and charging control (PCC) rule is the same as the first data description information of the first event, wherein the second data description information of the second PCC rule is data description information of a second event, and the second PCC rule comprises second indication information indicating to detect the second event;
   updating, by the policy control entity based on the first subscription indication information of the first event, the second PCC rule to obtain a first PCC rule, wherein the first PCC rule comprises the second indication information indicating to detect the second event and first indication information indicating to detect the first event; and
   sending, by the policy control entity, the first PCC rule to the session management entity.

2. The method according to claim 1, the method further comprising:
   receiving, by the policy control entity, an identifier of the first PCC rule and unsubscription indication information of the first event from the session management entity;
   updating, by the policy control entity based on the identifier of the first PCC rule and the unsubscription indication information of the first event, the first PCC rule to obtain a fifth PCC rule, wherein the fifth PCC rule is obtained by deleting the first indication information indicating to detect the first event from the first PCC rule; and
   sending, by the policy control entity, the fifth PCC rule to the session management entity.

3. The method according to claim 1, the method further comprising:
   receiving, by the policy control entity, an identifier of the first PCC rule and unsubscription indication information of the second event from the session management entity;
   updating, by the policy control entity based on the identifier of the first PCC rule and the unsubscription indication information of the second event, the first PCC rule to obtain a sixth PCC rule, wherein the sixth PCC rule is obtained by deleting the second indication information indicating to detect the second event from the first PCC rule; and
   sending, by the policy control entity, the sixth PCC rule to the session management entity.

4. The method according to claim 1, wherein the first event is a downlink data notification failure event.

5. The method according to claim 1, wherein the first event is a downlink data delivery status event.

6. The method according to claim 1, further comprises:
   receiving, by the session management entity, the first PCC rule from the policy control entity; and
   detecting, by the session management entity, the first event and the second event based on the first PCC rule.

7. The method according to claim 6, wherein detecting, by the session management entity, the first event and the second event based on the first PCC rule comprises:
   determining, by the session management entity based on the first PCC rule, a first packet detection rule (PDR) and a first forwarding action rule (FAR) correlated with the first PDR, wherein the first FAR is determined based on at least part of the following information: the indication information indicating to detect the first event or the indication information indicating to detect the second event;
   sending, by the session management entity, the first PDR and the first FAR to a user plane function entity;
   receiving, by the session management entity from the user plane function entity, an identifier of the first PDR and a downlink data status that is reported based on the first FAR; and
   sending, by the session management entity based on the identifier of the first PDR and the downlink data status that is reported based on the first FAR, one or more notifications comprising at least one of a first notification message to a subscription entity of the first event or a second notification message to a subscription entity of the second event, wherein the first notification message is used to notify the first event, and the second notification message is used to notify the second event.

8. The method according to claim 7, wherein the first FAR is set with a first flag indicating the user plane function entity to notify the session management entity after the user plane function entity discards the first data packet that matches the first PDR; and
   the downlink data status that is reported based on the first FAR comprises: the first data packet that matches the first PDR is discarded.

9. A policy control entity, comprising:
   a processor; and
   a non-transitory computer-readable storage medium configured to store a program, comprising instructions that, when executed by the processor, cause the policy control entity to perform the operations:
   receiving information about a first event from a session management entity, wherein the information about the first event comprises subscription indication information of the first event and first data description information of the first event;
   determining that second data description information of a second policy and charging control (PCC) rule is the same as the first data description information of the first event, wherein the second data description information of the second PCC rule is data description information of a second event, and the second PCC rule comprises second indication information indicating to detect the second event;

updating, based on the subscription indication information of the first event, the second PCC rule to obtain a first PCC rule, wherein the first PCC rule comprises the second indication information indicating to detect the second event and first indication information indicating to detect the first event; and sending the first PCC rule to the session management entity.

10. The policy control entity according to claim 9, wherein the program further comprises instructions that, when executed by the processor, cause the policy control entity to perform:

receiving an identifier of the first PCC rule and unsubscription indication information of the first event from the session management entity;

updating, based on the identifier of the first PCC rule and the unsubscription indication information of the first event, the first PCC rule to obtain a fifth PCC rule, wherein the fifth PCC rule is obtained by deleting the first indication information indicating to detect the first event from the first PCC rule; and sending the fifth PCC rule to the session management entity.

11. The policy control entity according to claim 9, wherein the program further comprises instructions that, when executed by the processor, cause the policy control entity to perform:

receiving an identifier of the first PCC rule and unsubscription indication information of the second event from the session management entity;

updating, based on the identifier of the first PCC rule and the unsubscription indication information of the second event, the first PCC rule to obtain a sixth PCC rule, wherein the sixth PCC rule is obtained by deleting the second indication information indicating to detect the second event from the first PCC rule; and sending the sixth PCC rule to the session management entity.

12. The policy control entity according to claim 9, wherein the first event is a downlink data notification failure event.

13. The policy control entity according to claim 9, wherein the first event is a downlink data delivery status event.

14. A communication system, comprising a policy control entity and a session management entity, wherein the policy control entity is configured to receive information about a first event from the session management entity, wherein the information about the first event comprises subscription indication information of the first event and first data description information of the first event;

the policy control entity is further configured to determine that second data description information of a second policy and charging control (PCC) rule is the same as the first data description information of the first event, wherein the second data description information of the second PCC rule is data description information of a second event, and the second PCC rule comprises second indication information indicating to detect the second event;

the policy control entity is further configured to update, based on the subscription indication information of the first event, the second PCC rule to obtain a first PCC rule, and send the first PCC rule to the session management entity, wherein the first PCC rule comprises the second indication information indicating to detect the second event and first indication information indicating to detect the first event; and the session management entity is configured to receive the first PCC rule from the policy control entity, and detect the first event and the second event based on the first PCC rule.

15. The communication system according to claim 14, wherein the communication system further comprises a user plane function entity; and that the session management entity is configured to detect the first event and the second event based on the first PCC rule comprises:

determine, based on the first PCC rule, a first packet detection rule (PDR) and a first forwarding action rule (FAR) correlated with the first PDR, and send the first PDR and the first FAR to the user plane function entity, wherein the first FAR is determined based on at least part of the following information: the first indication information indicating to detect the first event or the second indication information indicating to detect the second event;

the user plane function entity is configured to receive the first PDR and the first FAR from the session management entity, and after successfully performing data matching based on the first PDR, send, to the user plane function entity, an identifier of the first PDR and a downlink data status that is reported based on the first FAR; and the session management entity is further configured to:

receive, from the user plane function entity, the identifier of the first PDR and the downlink data status that is reported based on the first FAR; and send, based on the identifier of the first PDR and the downlink data status that is reported based on the first FAR, one or more notification messages that comprise at least one of a first notification message to a subscription entity of the first event or a second notification message to a subscription entity of the second event, wherein the first notification message is used to notify the first event, and the second notification message is used to notify the second event.

16. The communication system according to claim 14, wherein the first FAR is set with a first flag indicating the user plane function entity to notify the session management entity after the user plane function entity discards the first data packet that matches the first PDR; and the downlink data status that is reported based on the first FAR comprises: the first data packet that matches the first PDR is discarded.

17. The communication system according to claim 14, wherein the first event is a downlink data notification failure event; or the first event is a downlink data delivery status event.

18. A non-transitory storage medium comprising instructions which, when executed by a computer, cause the computer to:

receive information about a first event from a session management entity, wherein the information about the first event comprises subscription indication information of the first event and first data description information of the first event;

determine that second data description information of a second policy and charging control (PCC) rule is the same as the first data description information of the first event, wherein the second data description information of the second PCC rule is data description information of a second event, and the second PCC rule comprises second indication information indicating to detect the second event;

update, based on the subscription indication information of the first event, the second PCC rule to obtain a first PCC rule, wherein the first PCC rule comprises the second indication information indicating to detect the second event and first indication information indicating to detect the first event; and send the first PCC rule to the session management entity.

19. The non-transitory storage medium according to claim 18, wherein when the instructions are executed by the computer, the instructions further cause the computer to:

receive an identifier of the first PCC rule and unsubscription indication information of the first event from the session management entity;

update, based on the identifier of the first PCC rule and the unsubscription indication information of the first event, the first PCC rule to obtain a fifth PCC rule, wherein the fifth PCC rule is obtained by deleting the first indication information indicating to detect the first event from the first PCC rule; and send the fifth PCC rule to the session management entity.

20. The non-transitory storage medium according to claim 18, wherein the first event is a downlink data notification failure event; or the first event is a downlink data delivery status event.

* * * * *